US011289960B2

(12) United States Patent
Ohori et al.

(10) Patent No.: US 11,289,960 B2
(45) Date of Patent: Mar. 29, 2022

(54) MOTOR AND BRUSHLESS WIPER MOTOR

(71) Applicant: MITSUBA Corporation, Gunma (JP)

(72) Inventors: Ryo Ohori, Gunma (JP); Naoki Shioda, Gunma (JP); Gensaku Yamakami, Gunma (JP)

(73) Assignee: MITSUBA Corporation, Gunma (JP)

( * ) Notice: Subject to any disclaimer, the term of this patent is extended or adjusted under 35 U.S.C. 154(b) by 99 days.

(21) Appl. No.: 16/632,370

(22) PCT Filed: Jun. 26, 2018

(86) PCT No.: PCT/JP2018/024195
§ 371 (c)(1),
(2) Date: Jan. 19, 2020

(87) PCT Pub. No.: WO2019/017161
PCT Pub. Date: Jan. 24, 2019

(65) Prior Publication Data
US 2020/0227960 A1 Jul. 16, 2020

(30) Foreign Application Priority Data
Jul. 20, 2017 (JP) .............................. JP2017-141167
Jul. 20, 2017 (JP) .............................. JP2017-141168
(Continued)

(51) Int. Cl.
*H02K 1/27* (2006.01)
*H02K 21/16* (2006.01)
(Continued)

(52) U.S. Cl.
CPC ............. *H02K 1/278* (2013.01); *H02K 21/16* (2013.01); *B60S 1/08* (2013.01); *H02K 29/03* (2013.01)

(58) Field of Classification Search
CPC ........ H02K 1/278; H02K 21/16; H02K 29/03; H02K 2213/03; B60S 1/08
See application file for complete search history.

(56) References Cited

U.S. PATENT DOCUMENTS

2016/0241096 A1 8/2016 Mueller
2016/0254713 A1* 9/2016 Yamaguchi ............ H02K 21/14
310/156.38
2018/0097413 A1* 4/2018 Sun .......................... H02K 1/28

FOREIGN PATENT DOCUMENTS

CN 101895161 11/2010
CN 206164237 5/2017
(Continued)

OTHER PUBLICATIONS

Machine Translation, Kikuchi, JP-2002262533-A, Sep. 2002. (Year: 2002).*
(Continued)

*Primary Examiner* — Thomas Truong
(74) *Attorney, Agent, or Firm* — JCIPRNET

(57) ABSTRACT

A motor and a brushless wiper motor are provided. The motor (2) includes: a stator (8); coils (24); a shaft (31); a rotor core (32); magnets (33) which are disposed on an outer peripheral surface (32b) of the rotor core (32) and a radial thickness of which at end portions (33s) on both sides in the circumferential direction around the rotation axis is smaller than a radial thickness in a circumferential intermediate portion; and salient poles (35) that are formed between magnets (33) adjacent in the circumferential direction of the outer peripheral surface (32b) of the rotor core (32) and protrude radially outward from the end portions (33s) of the magnets (33) in the circumferential direction. The width dimensions of the salient poles (35) in the radial direction being set to 40° or less in a form of an electrical angle.

4 Claims, 42 Drawing Sheets

(30) Foreign Application Priority Data

Jun. 14, 2018 (JP) .............................. JP2018-113644
Jun. 14, 2018 (JP) .............................. JP2018-113645

(51) Int. Cl.
*H02K 1/278* (2022.01)
*B60S 1/08* (2006.01)
*H02K 29/03* (2006.01)

(56) References Cited

FOREIGN PATENT DOCUMENTS

| | | |
|---|---|---|
| EP | 0143693 | 6/1985 |
| JP | 2000333391 | 11/2000 |
| JP | 2002101629 | 4/2002 |
| JP | 2002262533 | 9/2002 |
| JP | 2002262533 A * | 9/2002 |
| JP | 2004048970 | 2/2004 |
| JP | 2009225607 | 10/2009 |
| JP | 2012235671 | 11/2012 |
| JP | 2013236455 | 11/2013 |
| JP | 2014155372 | 8/2014 |
| JP | 2015122842 | 7/2015 |
| JP | 2016042763 | 3/2016 |
| JP | 2016063728 | 4/2016 |
| JP | 2016134931 | 7/2016 |
| JP | 2016214081 | 12/2016 |
| WO | 2007074036 | 7/2007 |
| WO | 2013108726 | 7/2013 |
| WO | 2013150652 | 10/2013 |
| WO | 2014167645 | 10/2014 |
| WO | 2015011747 | 1/2015 |

OTHER PUBLICATIONS

"International Search Report (Form PCT/ISA/210) of PCT/JP2018/024195", dated Sep. 18, 2018, with English translation thereof, pp. 1-4.
"Search Report of Europe Counterpart Application", dated Mar. 4, 2021, p. 1-p. 14.
"Office Action of Europe Counterpart Application", dated Sep. 29, 2021, p. 1-p. 9.
Office Action of China Counterpart Application, with English translation thereof, dated May 7, 2021, pp. 1-15.
"Office Action of China Counterpart Application", dated Oct. 9, 2021, with English translation thereof, p. 1-p. 13.
"Office Action of Japan Counterpart Application", dated Jan. 18, 2022, with English translation thereof, p. 1-p. 10.
"Office Action of China Counterpart Application", dated Jan. 6, 2022, with English translation thereof, p. 1-p. 11.

* cited by examiner

MOTOR AND BRUSHLESS WIPER MOTOR

CROSS-REFERENCE TO RELATED APPLICATION

This application is a 371 application of the international PCT application serial no. PCT/JP2018/024195, filed on Jun. 26, 2018, which claims the priority benefit of Japan application no. 2017-141167, filed on Jul. 20, 2017, no 2017-141168, filed on Jul. 20, 2017, 2018-113644, filed on Jun. 14, 2018 and no. 2018-113645, filed on Jun. 14, 2018. The entirety of each of the above-mentioned patent applications is hereby incorporated by reference herein and made a part of this specification.

BACKGROUND OF THE INVENTION

Technical Field

The present invention relates to a motor and a brushless wiper motor.

Description of Related Art

A brushless motor (hereinafter, simply referred to as "motor") includes a stator having teeth around which a coil is wound, and a rotor arranged on the radial inner side of the stator in a rotatable manner. In the stator, an interlinkage magnetic flux is formed by supplying power to the coil. The rotor has a rotary shaft, a rotor core that is substantially cylindrical and fixed to the rotary shaft by external fitting, and permanent magnets arranged in the rotor core. Besides, a magnetic attractive force or repulsive force is generated between the interlinkage magnetic flux formed in the stator and the permanent magnets disposed in the rotor core, which causes the rotor to rotate continuously.

Here, the method of disposing the permanent magnets on the rotor is roughly divided into two types. One is a permanent magnet embedding method (IPM: Interior Permanent Magnet) in which a plurality of slits is formed in a rotor core, and the permanent magnets are disposed in the slits.

In addition, another method of disposing the permanent magnets on the rotor is disposing the permanent magnets on the outer peripheral surface of the rotor core (SPM: Surface Permanent Magnet) (for example, see patent literature 1).

LITERATURE OF RELATED ART

Patent Literature

[Patent literature 1] Japanese Patent Laid-Open No. 2016-214081

SUMMARY

Problems to be Solved

Meanwhile, when the motor mentioned above is used for, for example, a wiper motor for an automobile and the like, both high-speed rotation and high torque may be required.

In a motor adopting the SPM method, if the current supply is advanced and widened, high-speed rotation can be achieved. The widening of the current supply means that the supply timings of the currents of three phases alternately supplied are overlapped with each other and can be widened to 120° or more. In this way, high-speed rotation of the motor can be achieved by using a weak field generated by advance angle energization and wide angle energization.

In a motor adopting the SPM method, it is necessary to increase the amount of magnets in order to achieve high torque, which may increase magnet cost.

In contrast, as for a motor adopting the IPM method, when the current supply is advanced and widened, reluctance torque is generated, but it does not lead to high speed rotation. This is because in the motor adopting the IPM method, inductance of a d-axis being the direction of the magnetic flux in the magnetic pole of the permanent magnets and a q-axis magnetically orthogonal to the d-axis is high. Thus, even if the current supply is advanced and widened to weaken the field, the motor speed is not easily increased.

Therefore, the present invention provides a motor and a brushless wiper motor capable of achieving high-speed rotation and high torque while suppressing an increase in cost.

Means to Solve the Problems

The present invention adopts the following approach in order to solve the above problems.

That is, according to a first aspect of the present invention, a motor includes: a stator that includes a stator core being ring-shaped and a plurality of teeth that protrudes radially inward from an inner peripheral surface of the stator core; coils wound around the teeth; a shaft that rotates around a rotation axis on a radial inner side of the stator core; a rotor core that is fixed to the shaft and takes the rotation axis as a radial center; magnets which are disposed on an outer peripheral surface of the rotor core and the radial thickness of which at end portions on both sides in a circumferential direction around the rotation axis is smaller than a radial thickness at a circumferential intermediate portion; and salient poles that are formed between magnets adjacent in the circumferential direction of the outer peripheral surface of the rotor core and protrude radially outward from the end portions of the magnets in the circumferential direction. The width dimensions of the salient poles at end portions in the radial outer side is set to 40° or less in a form of an electrical angle, and a ratio between a number of magnetic poles of the magnets and a number of the teeth is set to 2:3.

According to such a configuration, it is possible to reduce the inductance value in the d-axis direction by disposing ferrite magnets on the outer peripheral surface of the rotor core. In addition, by using ferrite magnets instead of rare earth magnets, an increase in cost due to an increase in the magnet usage can be suppressed even if the radial dimensions of the magnets are increased.

In addition, by setting the thickness of the ferrite magnets at end portions in the circumferential direction smaller than the thickness at the intermediate portions in the circumferential direction, and making the salient poles protrude radially outward from the ferrite magnets, the magnetic fluxes are concentrated on the salient poles, and the demagnetizing field is accordingly not prone to act on the end portions of the ferrite magnets.

Besides, by setting the electrical angle of the salient poles to 40° or less and reducing the width dimension of the salient poles in the circumferential direction, the inductance value in the q-axis direction can be reduced, and the demagnetizing field can be suppressed.

In this way, it is possible to increase the torque of the motor and suppress torque ripple and cogging. Further, in such a motor, high speed rotation can be achieved by performing advance angle energization and wide angle energization.

According to a second aspect of the present invention, the motor according to the first aspect of the present invention includes: a stator that includes a stator core being ring-shaped and a plurality of teeth that protrudes radially inward from an inner peripheral surface of the stator core; coils wound around the teeth; a shaft that rotates around a rotation axis on a radial inner side of the stator core; a rotor core that is fixed to the shaft and takes the rotation axis as a radial center; magnets which are disposed on an outer peripheral surface of the rotor core and a radial thickness of which at end portions on both sides in a circumferential direction around the rotation axis is smaller than a radial thickness at a circumferential intermediate portion; and salient poles that are formed between magnets adjacent in the circumferential direction of the outer peripheral surface of the rotor core and protrude radially outward from the circumferential end portions of the magnets. Concave-convex fitting portions for fitting the salient poles and the magnets are respectively arranged on a salient pole side facing surface of the salient poles, that faces the circumferential end portions of the magnets on both sides in the circumferential direction, and on a magnet side facing surface of the magnets facing the salient pole side facing surface in a manner avoiding portions corresponding to the end portions of the salient poles on a radial outer side.

According to such a configuration, by arranging bond magnets on the outer peripheral surface of the rotor core, the inductance value in the d-axis direction can be reduced. In addition, the salient poles and magnets are fitted by concave and convex arranged on both side surfaces of the salient poles in circumferential direction, and on the facing surfaces of the bond magnets that face the both side surfaces in the circumferential direction respectively in a manner avoiding portions corresponding to the end portions of the salient poles on the radial outer side. Consequently, a centrifugal force acts on the magnets by the rotation of the rotor, and the magnets are prevented from scattering from the rotor core. Furthermore, for example, magnetic flux leakage at end portions in the magnets (portions overlapping with the convex portions) can be reduced as compared with, for example, a case in which convex portions are arranged on end surfaces of the salient poles in the radial outer side and scattering of the magnets is prevented by the convex portions.

In addition, the proportion of salient poles on the outer peripheral surface of the rotor can be reduced as much as possible. As a result, the cogging torque can be reduced.

Furthermore, by using bond magnets, the concave-convex fitting portions can be easily formed. Additionally, the bond magnets are mixed with a resin in addition to a magnetic material. Therefore, even when the radial dimensions of the magnets are increased, an increase in mass due to an increase in the magnet usage can be suppressed as compared with magnets obtained by sintering the same magnetic material.

Besides, the magnetic flux of the magnets can be concentrated on the salient poles by making the salient poles protrude radially outward from end portions of the magnets in the circumferential direction. Consequently, the demagnetizing field is not prone to act on the end portions of the magnets.

According to a third aspect of the present invention, in the motor according to the second aspect of the present invention, it is preferable that concave-convex fitting portions are respectively arranged only on the salient poles and the magnets at both end portions in a rotation axis direction avoiding a center portion in the rotation axis direction.

According to such a configuration, the magnets can be prevented from scattering from the rotor core, and the volume of the magnets on the inner side in the rotation axis direction in which the magnetic flux easily passes can be set large. Consequently, the effective magnetic flux of the magnets can be increased as much as possible. The number of positions where complex concave-convex fitting portions are formed on the salient poles or permanent magnets can be minimized.

According to a fourth aspect of the present invention, in the motor according to any one of the first to third aspects of the present invention, it is preferable that the concave-convex fitting portions are arranged only on the salient poles and the magnets at both end portions in a rotation axis direction avoiding a center portion in the rotation axis direction.

Thus, if the salient pole has a trapezoid shaped in which a base portion of the salient pole on the radial inner side has a large width dimension and a front end portion on the radial outer side has a small width dimension, the end portions on both sides in the circumferential direction of the ferrite magnets disposed between the salient poles adjacent in the circumferential direction become thinner. As a result, demagnetization is prone to occur. Additionally, if the salient pole has a trapezoid shape in which the base portion of the salient pole has a large width dimension and the front end portion has a small width dimension, the magnetic flux density is prone to saturate at the salient poles. In contrast, by forming the facing surfaces of the salient poles parallel to each other on both sides of the salient poles in the circumferential direction, demagnetization is not prone to occur and saturation of magnetic flux density can be suppressed.

According to a fifth aspect of the present invention, in the motor according to the first aspect or the fourth aspect of the present invention, the width dimension of the salient poles in the circumferential direction at end portions on the radial outer side may be set to 20° or more in a form of an electrical angle θ.

In this way, the magnetic fluxes are concentrated on the salient poles by securing the width dimensions of the salient poles in the radial direction to 20° or more in the form of an electrical angle. Consequently, the effect that the demagnetizing field is not prone to act on the end portions of the ferrite magnets can be reliably obtained. In addition, a high reluctance torque can be obtained by setting the electrical angle θ of the salient poles to 20° or more and 40° or less.

According to a sixth aspect of the present invention, in the motor according to any one of the first to fifth aspects of the present invention, one groove is formed on an end surface of the salient poles on the radial outer side along the rotation axis direction, and the groove may be formed in a manner that a groove width in the circumferential direction gradually decreases toward the radial inner side.

According to such a configuration, by having a groove in the end surfaces of the salient poles in the radial outer side, the gap between the end surfaces and the teeth is made non-uniform when viewed from the entire end faces of the salient poles in the radial outer side. As a result, it is possible to suppress a rapid increase in the magnetic flux density generated in the teeth before and after the salient poles pass between the teeth during rotation of the rotor. Consequently, rapid torque fluctuation of the rotor can be reduced, and torque ripple can be lowered.

Here, by forming a groove on the salient poles, the magnetic flux concentrated on the salient poles is slightly reduced. Consequently, by restricting the depth of the groove, the magnetic flux can be concentrated on the salient poles as much as possible, and a high reluctance torque can be ensured.

According to an eighth aspect of the present invention, in the motor according to any one of the first to seventh aspects of the present invention, the magnetization orientation of the magnets may be parallel orientation.

According to such a configuration, the cogging of the motor can be suppressed and a high magnetic flux density can be obtained.

According to a ninth aspect of the present invention, a brushless wiper motor includes the motor according to any one of the first to eighth aspects of the present invention.

According to such a configuration, by using the ferrite magnets, it is possible to increase the rotation speed and torque of the brushless wiper motor and suppress torque ripple and cogging while suppressing an increase in cost.

Effect

According to the present invention, it is possible to increase the rotation speed and torque while suppressing an increase in cost.

DESCRIPTION OF THE EMBODIMENTS

Hereinafter, a motor and a brushless wiper motor according to embodiments of the present invention are described with reference to the drawings.

First Embodiment (Wiper Motor)

Figure 1:
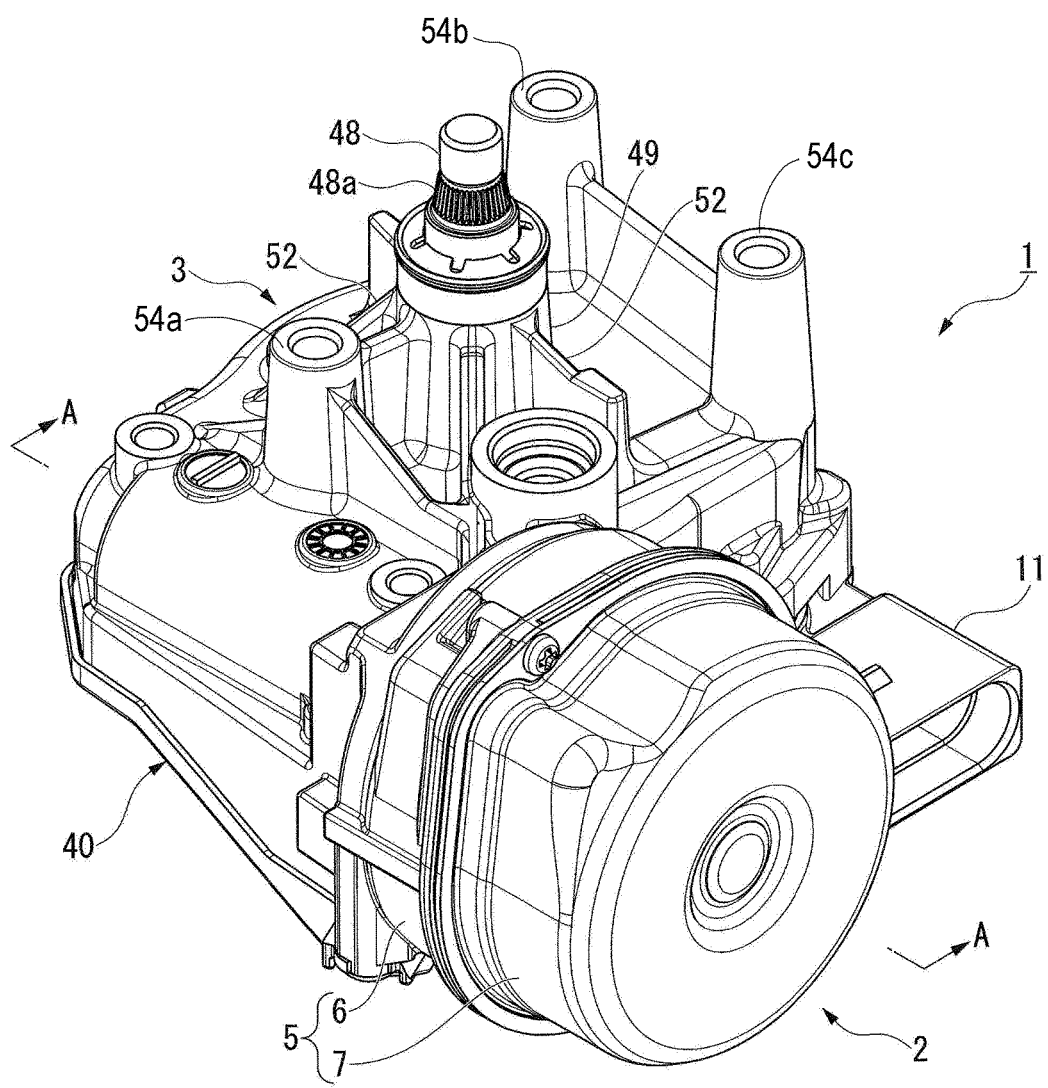
FIG. 1 is a perspective view of a wiper motor according to a first embodiment of the present invention.
Figure 2:
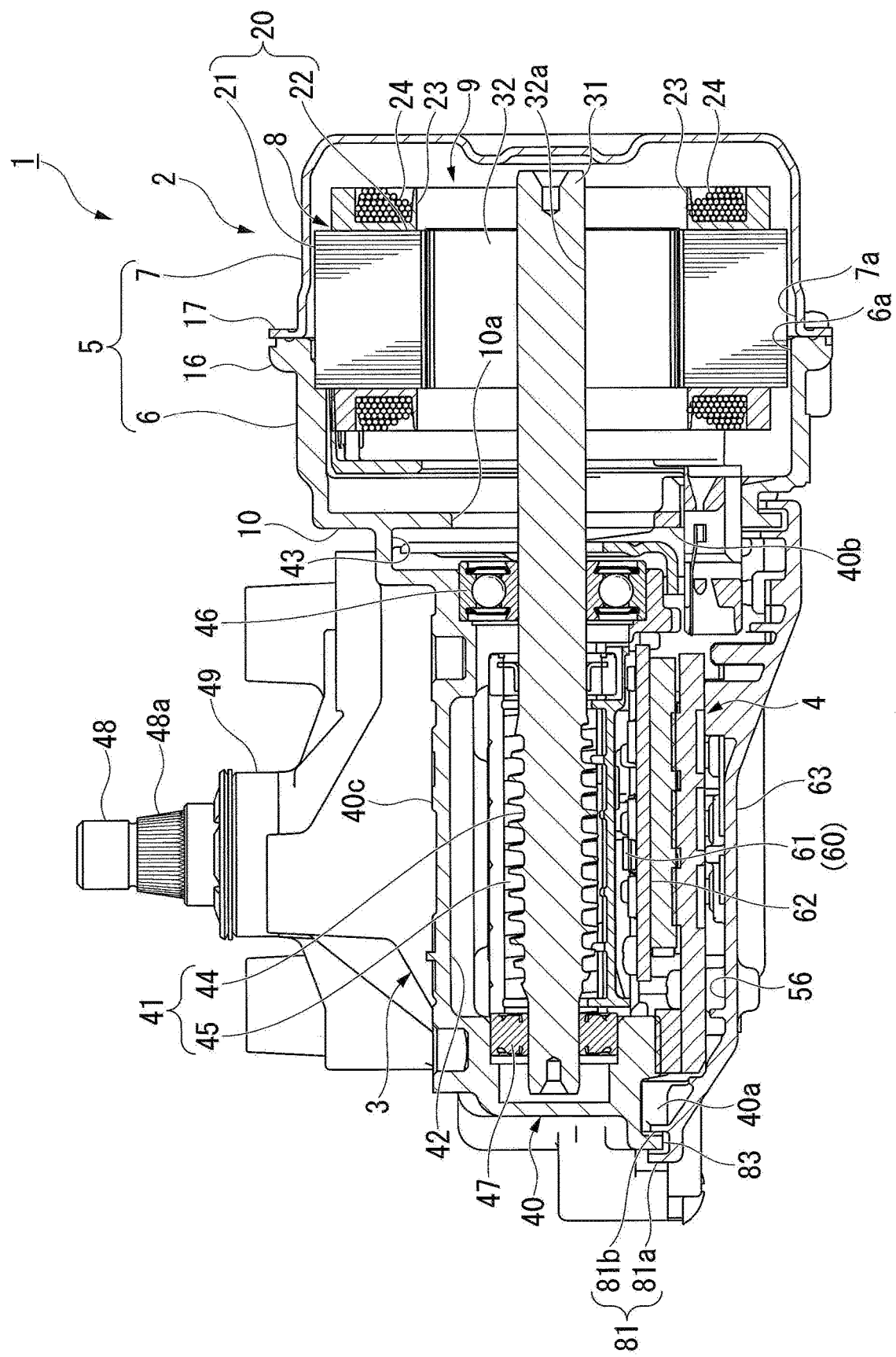
FIG. 2 is a cross-sectional view of the wiper motor according to the first embodiment of the present invention, the cross-sectional view taken along an A-A line in FIG. 1.

FIG. 1 is a perspective view of a wiper motor 1. FIG. 2 is a cross-sectional view taken along a line A-A of FIG. 1.

As shown in FIG. 1 and FIG. 2, the wiper motor (brushless wiper motor) 1 serves as, for example, a drive source for a wiper mounted on a vehicle. The wiper motor 1 includes a motor unit (motor) 2, a deceleration unit 3 for decelerating and outputting the rotation of the motor unit 2, and a controller unit 4 for performing drive control of the motor unit 2.

Moreover, in the following description, an axial direction indicates the rotary axis direction of a shaft 31 of the motor unit 2, a circumferential direction indicates the circumferential direction of the shaft 31, and a radial direction indicates the radial direction of the shaft 31.

(Motor Unit)

The motor unit 2 includes a motor case 5, a stator 8 being substantially cylindrical and accommodated in the motor case 5, and a rotor 9 disposed on the radial inner side of the stator 8 and rotatable with respect to the stator 8. The motor unit 2 is a so-called brushless motor that does not require a brush when supplying electric power to the stator 8.

(Motor Case)

The motor case 5 is made of a material with excellent heat dissipation properties, such as an aluminum die cast. The motor case 5 consists of a first motor case 6 and a second motor case 7 that are configured to be dividable in the axial direction. The first motor case 6 and the second motor case 7 are each formed in a bottomed tubular shape.

The first motor case 6 is molded integrally with a gear case 40 in a manner that a bottom 10 is joined to the gear case 40 of the deceleration unit 3. A through hole 10a that allows the shaft 31 of the rotor 9 to be inserted therethrough is formed at substantially the center in the radial direction of the bottom 10.

In addition, an outer flange portion 16 is formed at an opening 6a of the first motor case 6 so as to protrude radially outward. An outer flange portion 17 protruding radially outward is formed at an opening 7a of the second motor case 7. The motor case 5 having an internal space is formed by abutting the outer flange portions 16 and 17 together. Besides, in the inner space of the motor case 5, the stator 8 is arranged in a manner of being fitted into the first motor case 6 and the second motor case 6.

(Stator)

Figure 3:
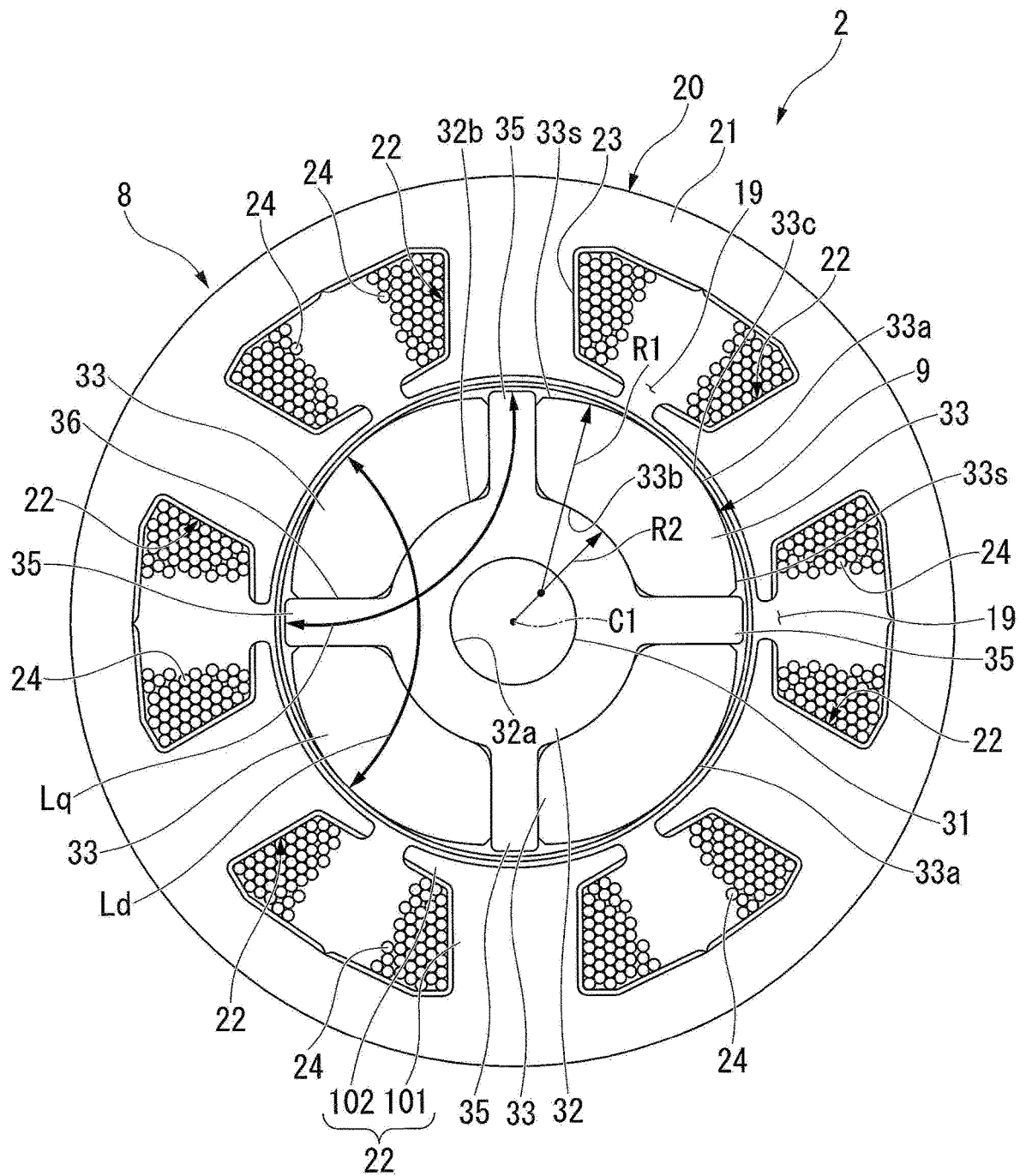
FIG. 3 is a plan view in which a stator and a rotor according to the first embodiment of the present invention are viewed from an axial direction.

FIG. 3 is a plan view of the stator 8 and the rotor 9 as viewed from the axial direction.

As shown in FIG. 2 and FIG. 3, the stator 8 has a stator core 20 in which a core portion 21 being tubular and having a substantially circular cross-sectional shape along the radial direction and a plurality (for example, six in the first embodiment) of teeth 22 protruding radially inward from the core portion 21 are integrally molded.

The stator core 20 is formed by laminating a plurality of metal plates in the axial direction. Moreover, the stator core 20 is not limited to being formed by laminating a plurality of metal plates in the axial direction, and may also be formed, for example, by press molding soft magnetic powder.

A tooth body 101 and collar portions 102 are integrated to form a tooth 22. The tooth body 101 protrudes along the radial direction from the inner peripheral surface of the core portion 21. The collar portions 102 extends along the circumferential direction from the radial inner side end of the tooth body 101. The collar portions 102 are formed so as to extend from the tooth body 101 toward both sides in the circumferential direction. Besides, slots 19 are formed between the collar portions 102 adjacent in the circumferential direction.

In addition, the inner peripheral surface of the core portion 21 and the teeth 22 are covered with an insulator 23 made of resin. Coils 24 are wound around the teeth 22 from above the insulator 23. Each coil 24 generates a magnetic field for rotating the rotor 9 by power supply from the controller unit 4.

(Rotor)

The rotor 9 is rotatably arranged on the radial inner side of the stator 8 through a minute gap. The rotor 9 includes the shaft 31 formed integrally with a worm shaft 44 (see FIG. 2) constituting the deceleration unit 3, a rotor core 32 that is externally fixed to the shaft 31 and has a substantially cylindrical shape taking the shaft 31 as a shaft center C1, and four magnets 33 arranged on the outer peripheral surface of the rotor core 32. Thus, in the motor unit 2, the ratio between the number of magnetic poles of the magnets 33 and the number of the slots 19 (teeth 22) is 4:6.

The rotor core 32 is formed by laminating a plurality of metal plates in the axial direction. Moreover, the rotor core 32 is not limited to being formed by laminating a plurality of metal plates in the axial direction, and may also be formed, for example, by press molding soft magnetic powder.

Besides, a through hole 32a penetrating in the axial direction is formed at substantially the center in the radial direction of the rotor core 32. The shaft 31 is press-fitted into the through hole 32a. Moreover, the shaft 31 may be inserted into the through hole 32a, and the rotor core 32 may be externally fixed to the shaft 31 using an adhesive or the like.

Furthermore, four salient poles 35 are arranged at equal intervals in the circumferential direction on an outer peripheral surface 32b of the rotor core 32. The salient poles 35 are formed so as to protrude radially outward and extend in the entire axial direction of the rotor core 32. Additionally, round chamfered portions 35a are formed on the radial outer side of the salient poles 35 and at the corners on both sides in the circumferential direction.

At the outer peripheral surface 32b of the rotor core 32 formed in this way, magnet storage portions 36 are respectively formed between two salient poles 35 adjacent in the circumferential direction. The magnets 33 are respectively disposed in the magnet storage portions 36 and are fixed to the rotor core 32 by, for example, an adhesive or the like.

Figure 4:
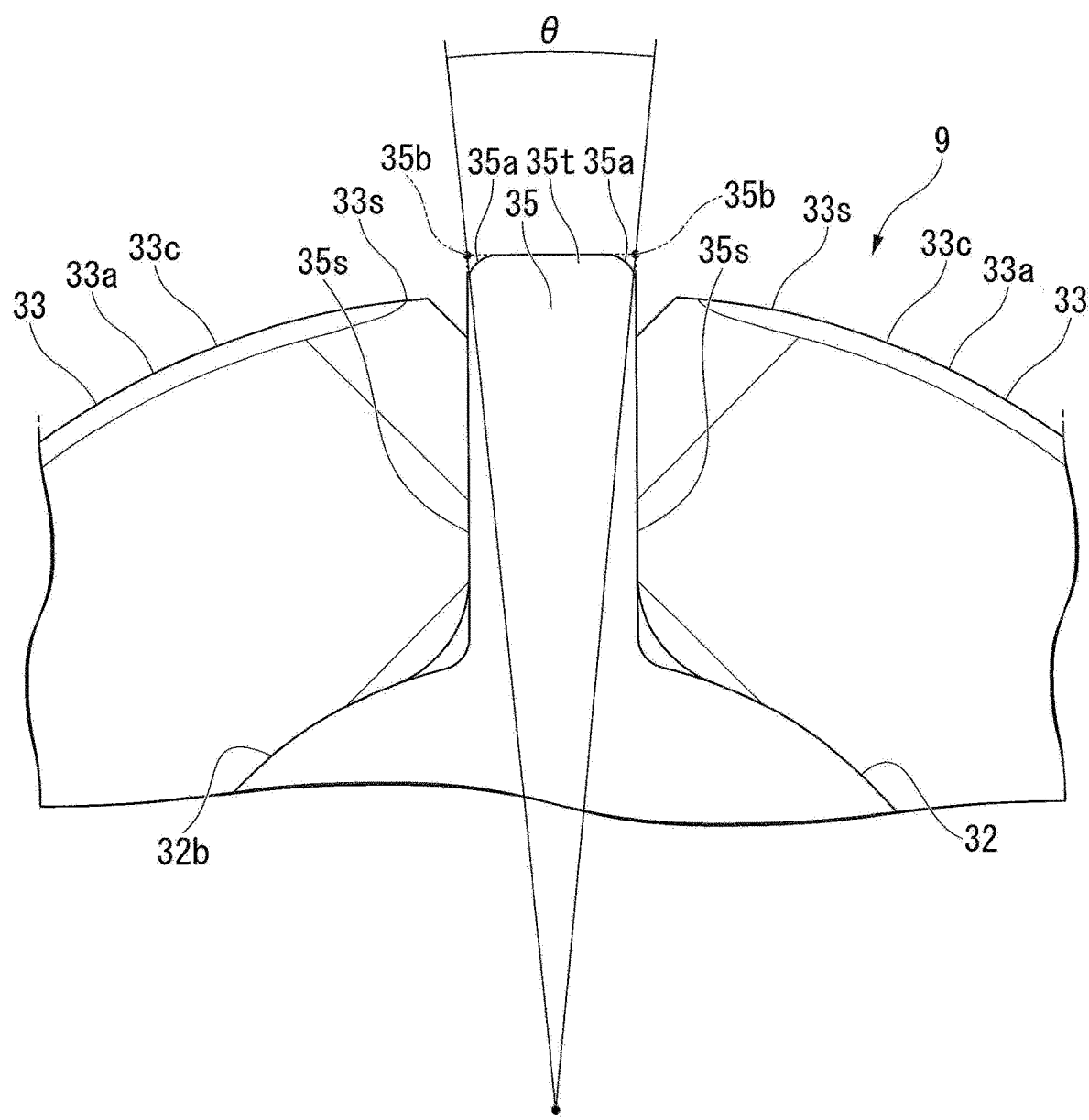
FIG. 4 is an enlarged view of the rotor in FIG. 3.

FIG. 4 is an enlarged view of the rotor 9 shown in FIG. 3.

As shown in FIG. 3 and FIG. 4, the magnets 33 are formed in a manner that the radial thickness at end portions 33s on both sides in the circumferential direction around the shaft center C1 of the shaft 31 is smaller than the radial thickness at circumferential intermediate portions 33c. That is, as shown in detail in FIG. 3, in the magnets 33, the radius of curvature R1 of the outer peripheral surface 33a on the radial outer side is set to be smaller than the radius of curvature R2 of the inner peripheral surface 33b of the magnets 33 on the radial inner side. Thus, the minute gap between the outer peripheral surface 33a of the magnets 33 on the radial outer side and the inner peripheral surface of the teeth 22 is the smallest in the circumferential central portion of the magnets 33, and gradually increases when getting away from the circumferential central portion in the circumferential direction.

In addition, the magnets 33 are ferrite magnets. Further, the magnets 33 are magnetized so that the magnetization (magnetic field) is oriented in parallel along the thickness direction. Besides, the magnets 33 are arranged so that the magnetic poles are alternately arranged in the circumferential direction. Besides, the salient poles 35 of the rotor core 32 are located between the magnets 33 adjacent in the circumferential direction, that is, at the boundary (polar boundary) of the magnetic poles.

The width dimension in the circumferential direction of the salient poles 35 at the radial outer end portions 35t is set, in the form of an electrical angle θ, to 20° or more and 40° or less.

Moreover, the width dimension in the circumferential direction of the salient poles 35 at the radial outer end portions 35t refers to the width dimension between both corners 35b in the circumferential direction when the round chamfered portions 35a are not formed on the salient poles 35. In the following description, the width dimension in the circumferential direction of the salient poles 35 at the radial outer end portions 35t is simply referred to as the width dimension of the salient poles 35 in the radial direction.

Furthermore, it is preferable that the facing surfaces 35s of the salient poles 35 that faces the circumferential end portions 33s of the magnets 33 are formed parallel to each other on both sides of the salient poles 35 in the circumferential direction.

In addition, by forming the magnets 33 as described above, the maximum outer diameter of the magnets 33 and the maximum outer diameter of the salient poles 35 are the same dimension, and the salient poles 35 protrude radially outward from the circumferential end portions 33s of the magnets 33.

(Deceleration Unit)

Returning to FIG. 1 and FIG. 2, the deceleration unit 3 includes the gear case 40 to which the motor case 5 is attached, and a worm deceleration mechanism 41 accommodated in the gear case 40. The gear case 40 is made of a material with excellent heat dissipation properties, such as an aluminum die cast, and is formed in a box shape having an opening 40a on one surface. The gear case 40 has a gear housing portion 42 for housing the worm deceleration mechanism 41 therein. In addition, on a side wall 40b of the gear case 40, an opening 43 for communicating the through hole 10a of the first motor case 6 and the gear housing portion 42 is formed at a position where the first motor case 6 is integrally molded.

In addition, three fixing brackets 54a, 54b, 54c are integrally molded on the side wall 40b of the gear case 40. These fixing brackets 54a, 54b, 54c are configured to fix the wiper motor 1 to a vehicle body (not shown) or the like. These three fixing brackets 54a, 54b, 54c are arranged at substantially equal intervals in the circumferential direction so as to avoid the motor unit 2. An anti-vibration rubber 55 is attached to each of the fixing brackets 54a, 54b, 54c, and is configured to prevent vibration during driving of the wiper motor 1 from being transmitted to the vehicle body (not shown).

Besides, a bearing boss 49 being substantially cylindrical is mounted on a bottom wall 40c of the gear case 40 so as to project therefrom. The bearing boss 49 is configured to rotatably support an output shaft 48 of the worm deceleration mechanism 41, and a sliding bearing (not shown) is arranged on the inner peripheral surface. Further, an O-ring (not shown) is mounted on the inner peripheral edge at the front end of the bearing boss 49. Accordingly, dust or water is prevented from entering the inside from the outside via the bearing boss 49. In addition, a plurality of ribs 52 is disposed on the outer peripheral surface of the bearing boss 49, and thereby the rigidity of the bearing boss 49 is secured.

The worm deceleration mechanism 41 accommodated in the gear accommodating portion 42 is composed of a worm shaft 44 and a worm wheel 45 engaged with the worm shaft 44. The worm shaft 44 is arranged coaxially with the shaft 31 of the motor unit 2. Besides, two end portions of the worm shaft 44 are rotatably supported by bearings 46 and 47 arranged at the gear case 40. The end portion of the worm shaft 44 at the motor unit 2 side protrudes to the opening 43 of the gear case 40 through the bearing 46. The protruding end portion of the worm shaft 44 and the end portion of the shaft 31 of the motor unit 2 are joined with each other. Accordingly, the worm shaft 44 is integrated with the shaft 31. Moreover, the worm shaft 44 and the shaft 31 may be integrally formed by molding a worm shaft portion and a rotary shaft portion from one base material.

In the worm wheel 45 engaged with the worm shaft 44, the output shaft 48 is disposed at the radial center of the worm wheel 45. The output shaft 48 is arranged coaxially with the rotary shaft direction of the worm wheel 45. Besides, the output shaft 48 protrudes to the outside of the gear case 40 through the bearing boss 49 of the gear case 40. A spline 48a that can be connected to an electrical component (not shown) is formed at the protruding front end of the output shaft 48.

In addition, at the radial center of the warm wheel 45, a sensor magnet (not shown) is disposed on the side opposite to the side where the output shaft 48 protrudes. The sensor magnet constitutes one of a rotation position detector 60 for detecting the rotation position of the worm wheel 45. A magnetic detection element 61 that constitutes the other of the rotation position detector 60 is disposed in the controller unit 4 disposed facing the worm wheel 45 on the sensor magnet side (the opening 40a side of the gear case 40) of the worm wheel 45.

(Controller Unit)

The controller unit 4 for controlling the drive of the motor unit 2 includes a controller board 62 on which the magnetic detection element 61 is mounted, and a cover 63 arranged to close the opening 40a of the gear case 40. Besides, the controller board 62 is disposed facing the sensor magnet side (the opening 40a side of the gear case 40) of the worm wheel 45.

The controller board 62 is obtained by forming a plurality of conductive patterns (not shown) on a so-called epoxy board. Terminal portions of the coils 24 drawn from the stator core 20 of the motor unit 2 are connected to the controller board 62. Besides, a terminal (not shown) of a connector 11 arranged on the cover 63 is electrically connected to the controller board 62. Besides, a power module (not shown) composed of, in addition to the magnetic detection element 61, switching elements such as an FET (Field Effect Transistor) for controlling the current supplied to the coils 24 is mounted on the controller board 62. Furthermore, a capacitor (not shown) for smoothing the voltage applied to the controller board 62 is mounted on the controller board 62.

The cover 63 for covering the controller board 62 configured as above is formed of resin. Additionally, the cover 63 is formed protruding slightly outward. The inner surface side of the cover 63 is set as a controller housing portion 56 for housing the controller board 62 and the like.

In addition, the connector 11 is integrally molded on the outer periphery of the cover 63. The connector 11 is formed to be capable of being fitted with a connector extending from an external power source (not shown). The controller board 62 is electrically connected to a terminal (not shown) of the connector 11. Accordingly, the power from the external power source is supplied to the controller board 62.

Besides, a fitting portion 81 fitted with the end portion of the side wall 40b of the gear case 40 is formed in a protruding manner at the opening edge of the cover 63. The fitting portion 81 is composed of two walls 81a and 81b along the opening edge of the cover 63. The end portion of the side wall 40b of the gear case 40 is inserted (fitted) between the two walls 81a and 81b. As a result, a labyrinth portion 83 is formed between the gear case 40 and the cover 63. Dust or water is prevented by the labyrinth 83 from entering from the space between the gear case 40 and the cover 63. Moreover, the gear case 40 and the cover 63 are fixed by fastening a bolt (not shown).

(Operation of Wiper Motor)

Next, the operation of the wiper motor 1 is described.

In the wiper motor 1, the power supplied to the controller board 62 via the connector 11 is selectively supplied to each coil 24 of the motor unit 2 via the power module (not shown). Here, the controller board 62 performs advance angle energization and wide angle energization with an electrical angle θ of 121° to 180° to the coils 24. In addition, the controller board 62 applies a drive current having fifth-order harmonic superimposed thereon to the coils 24.

Then, a predetermined interlinkage magnetic flux is formed in the stator 8 (teeth 22), and a magnetic attractive force or repulsive force is generated between the interlinkage magnetic flux and the effective magnetic flux formed by the magnets 33 of the rotor 9, which causes the rotor 9 to rotate continuously.

When the rotor 9 is rotated, the worm shaft 44 integrated with the shaft 31 is rotated, and the worm wheel 45 engaged with the worm shaft 44 is further rotated. Then, the output shaft 48 connected to the worm wheel 45 rotates to drive a desired electrical component.

In addition, the rotation position detection result of the worm wheel 45 detected by the magnetic detection element 61 mounted on the controller board 62 is output as a signal to an external device (not shown). The external device (not shown) controls the switching timing of the switching elements or the like of the power module (not shown) and the drive of the motor unit 2 based on the rotation position detection signal of the worm wheel 45. Moreover, the drive signal output of the power module and the drive control of the motor unit 2 may also be performed by the controller unit 4.

(Actions and Effects of the Rotor)

Next, actions and effects of the rotor 9 are described with reference to FIGS. 5 to 16.

The motor unit 2 is a so-called SPM (Surface Permanent Magnet) motor in which the magnets 33 are arranged on the outer peripheral surface 32b of the rotor core 32. Therefore, the inductance value in the d-axis direction can be reduced. Here, in the rotor 9, in order to further reduce the inductance value in the d-axis direction, it is necessary to increase the radial dimension of the magnets 33. In the first embodiment, the magnets 33 are made of ferrite magnets. Accordingly, even if the radial dimension of the magnets 33 is increased and the amount of magnets used is increased, the increase in cost can be significantly suppressed as compared with the case of rare earth magnet.

Here, the four salient poles 35 disposed on the outer peripheral surface 32b of the rotor core 32 have a width dimension in the circumferential direction set, in the form of an electrical angle θ, to 20° or more and 40° or less. Thus, the inductance value in the q-axis direction can be reduced by setting the width dimension of the salient poles 35 in the circumferential direction to 40° or less in the form of an electrical angle θ. Accordingly, the demagnetizing field can be suppressed and a high reluctance torque can be obtained. More specific description is given below.

Figure 5:
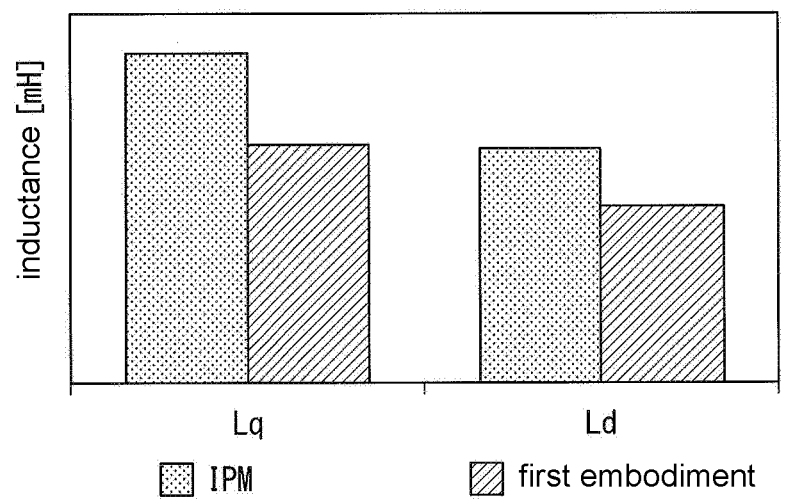
FIG. 5 is a graph showing inductances of a q-axis and a d-axis of the rotor according to the first embodiment of the present invention.

FIG. 5 is a graph showing the inductances Lq and Ld [mH] of the q-axis and the d-axis of the rotor 9. FIG. 5 compares the rotor 9 of the first embodiment with a rotor having a conventional structure. Moreover, the conventional structure herein is a structure of a rotor for a so-called IPM (Interior Permanent Magnet) motor in which permanent magnets are arranged in a plurality of slits formed on the rotor core.

As shown in FIG. 5, it can be confirmed that the rotor 9 of the first embodiment has a smaller inductance value on both the q-axis and the d-axis than the conventional structure.

Figure 6:
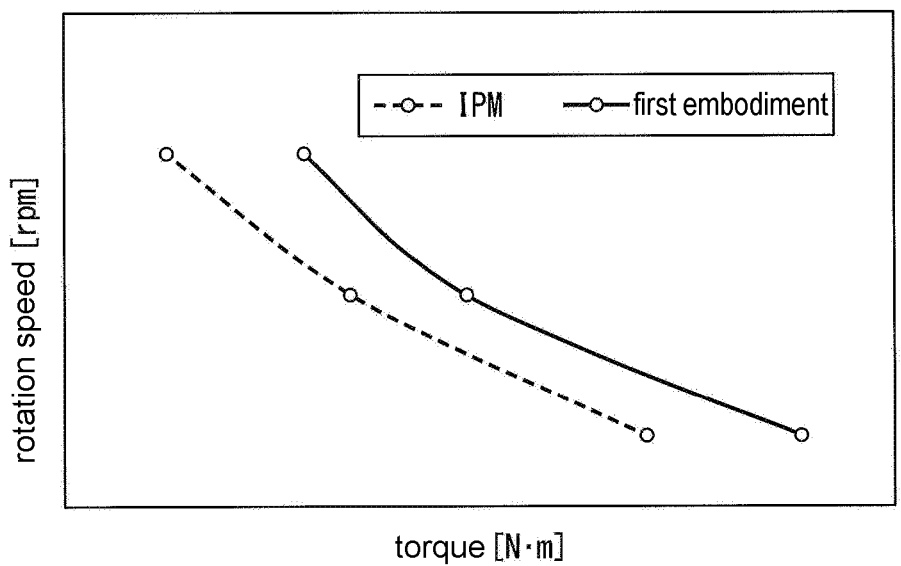
FIG. 6 is a graph showing the relationship between torque and rotation speed when advance angle energization and wide angle energization are performed on the rotor according to the first embodiment of the present invention.

FIG. 6 is a graph showing a change in the rotation speed of the rotor 9 with the vertical axis set as the rotation speed [rpm] of the rotor 9 and the horizontal axis set as the torque [N·m] of the rotor 9. More specifically, FIG. 6 is a graph showing the relationship between the torque [N·m] and the rotation speed [rpm] when the rotor 9 is subjected to advance energization and wide angle energization. FIG. 6 compares the rotor 9 of the first embodiment with a conventional rotor having the IPM structure.

As shown in FIG. 6, it can be confirmed that the rotor 9 of the first embodiment generates higher torque and higher rotation speed than the conventional structure.

Figure 7:
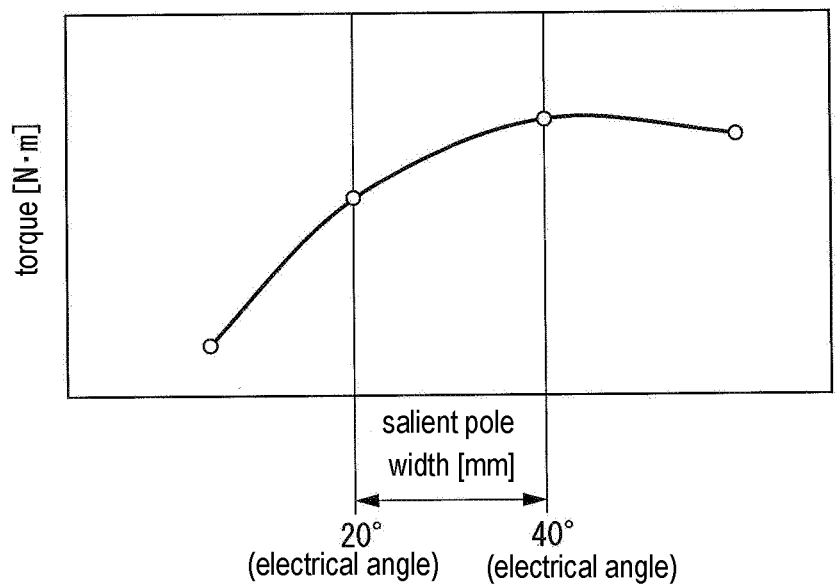
FIG. 7 is a graph showing a torque generated in the rotor when width dimensions of salient poles according to the first embodiment of the present invention are varied.

FIG. 7 is a graph showing a change in the torque of the rotor 9 with the vertical axis set as the torque [N·m] of the rotor 9 and the horizontal axis set as the salient pole width [mm] of the salient poles 35 arranged in the rotor core 32. More specifically, FIG. 7 is a graph showing the torque generated in the rotor 9 of the first embodiment when the width dimensions (electrical angle θ) of the salient poles 35 in the circumferential direction are varied.

Figure 8:
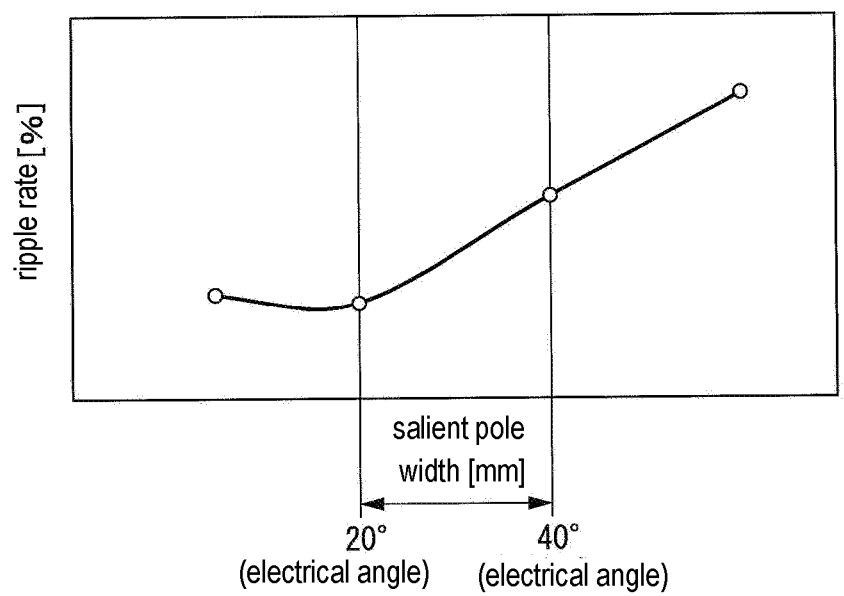
FIG. 8 is a graph showing a ripple rate generated in the rotor when the width dimensions of the salient poles according to the first embodiment of the present invention are varied.

FIG. 8 is a graph showing a change in the ripple rate of the rotor 9 with the vertical axis set as the ripple rate [%] of the rotor 9 and the horizontal axis set as the salient pole width [mm] of the salient poles 35 in the rotor core 32. More specifically, FIG. 8 is a graph showing a ripple rate generated in the rotor 9 of the first embodiment when the width dimensions of the salient poles 35 are varied.

Figure 9:
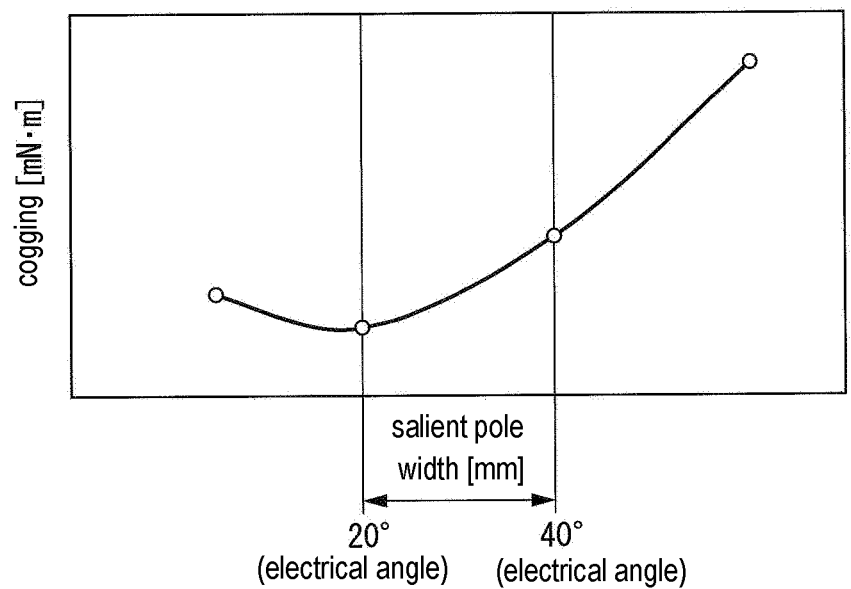
FIG. 9 is a graph showing cogging that occurs in the rotor when the width dimensions of the salient poles in the first embodiment of the present invention are varied.

FIG. 9 is a graph showing a change in cogging of the rotor 9 with the vertical axis set as the cogging [mN·m] of the rotor 9 and the horizontal axis set as the salient pole width [mm] of the salient poles 35 in the rotor core 32. More specifically, FIG. 9 is a graph showing the cogging generated in the rotor 9 of the first embodiment when the width dimensions of the salient poles 35 are varied.

As shown in FIGS. 7 to 9, in the rotor 9 of the first embodiment, it can be confirmed that a high reluctance torque is obtained when the width dimension of the salient poles 35 in the circumferential direction is 3 mm (electrical angle θ=20°) to 5 mm (electrical angle θ=40°). In addition, it can be confirmed that the ripple rate and the cogging can be suppressed in the above case.

In addition, by making the salient poles 35 protrude radially outward from the circumferential end portions 33s of the magnets 33, the magnetic fluxes are concentrated on the salient poles 35. In this way, the demagnetizing field is not prone to act on the end portions 33s of the magnets 33. More specific description is given below.

Figure 10:
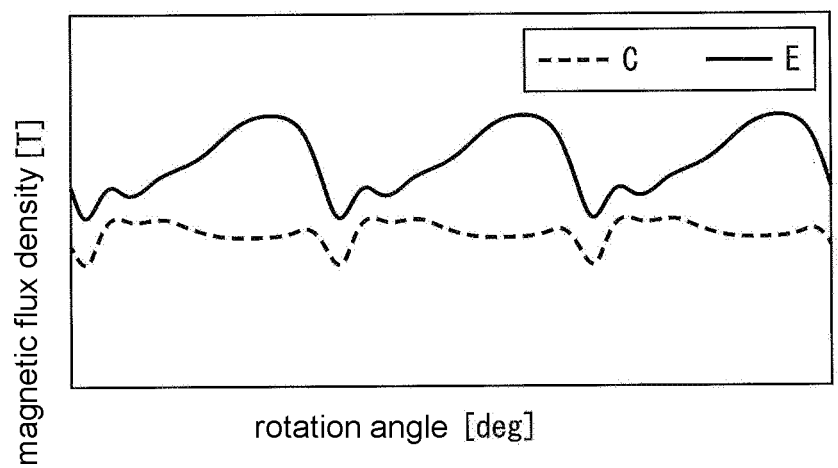
FIG. 10 is a graph showing the magnetic flux density at circumferential end portions in the magnets of the rotor according to the first embodiment of the present invention.

FIG. 10 is a graph showing a change in the magnetic flux density at the circumferential end portions 33s of the magnets 33 with the vertical axis set as the magnetic flux density [T] at the circumferential end portions 33s of the magnets 33 in the rotor 9, and the horizontal axis set as the rotation angle [deg] of the rotor 9. More specifically, FIG. 10 is a graph showing the magnetic flux density [T] at the circumferential end portions 33s of the magnets 33 in the rotor 9. FIG. 10 compares the case in which the salient poles 35 protrude radially outward from the circumferential end portions 33s of the magnets 33 (indicated by reference numeral E in FIG.

10) and the case in which the salient poles 35 do not protrude radially outward from the circumferential end portions 33s of the magnets 33 (indicated by reference numeral C in FIG. 10).

As shown in FIG. 10, it can be confirmed that compared with the case in which the salient poles 35 do not protrude radially outward from the circumferential end portions 33s of the magnets 33, when the salient poles 35 protrude radially outward from the circumferential end portions 33s of the magnets 33, the magnetic flux density is high and demagnetization is not prone to occur.

Figure 11:
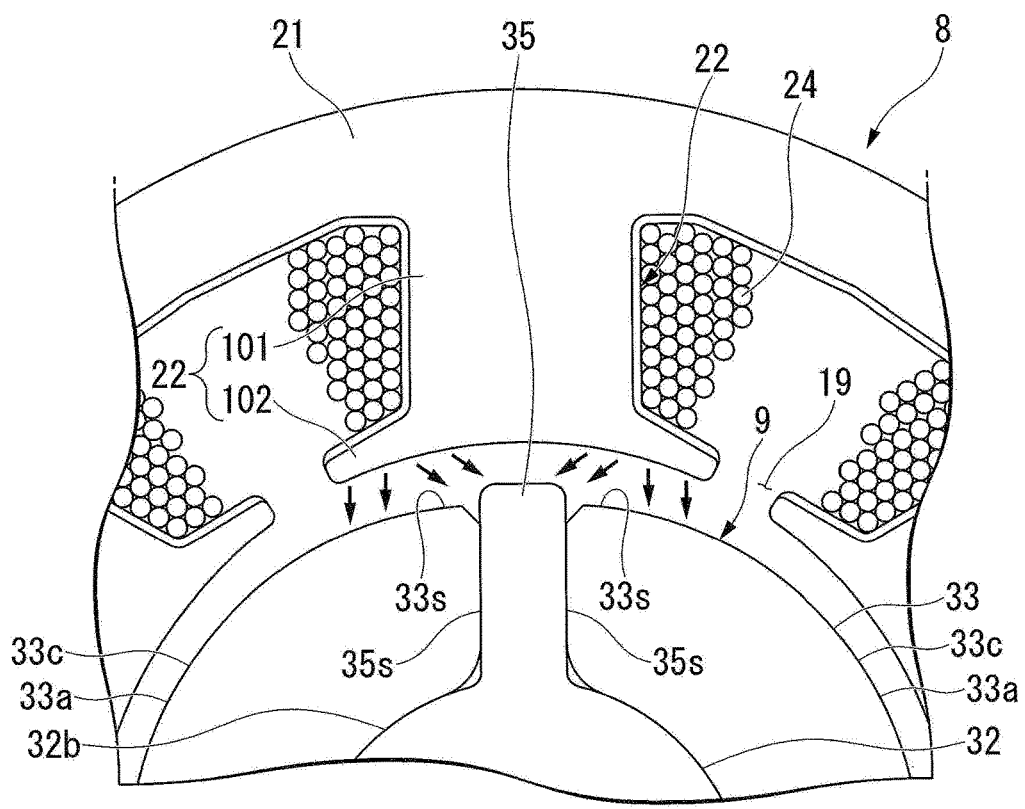
FIG. 11 is a diagram showing the direction of magnetic flux around the salient poles when the salient poles according to the first embodiment of the present invention protrude radially outward from circumferential end portions of the magnets.
Figure 12:
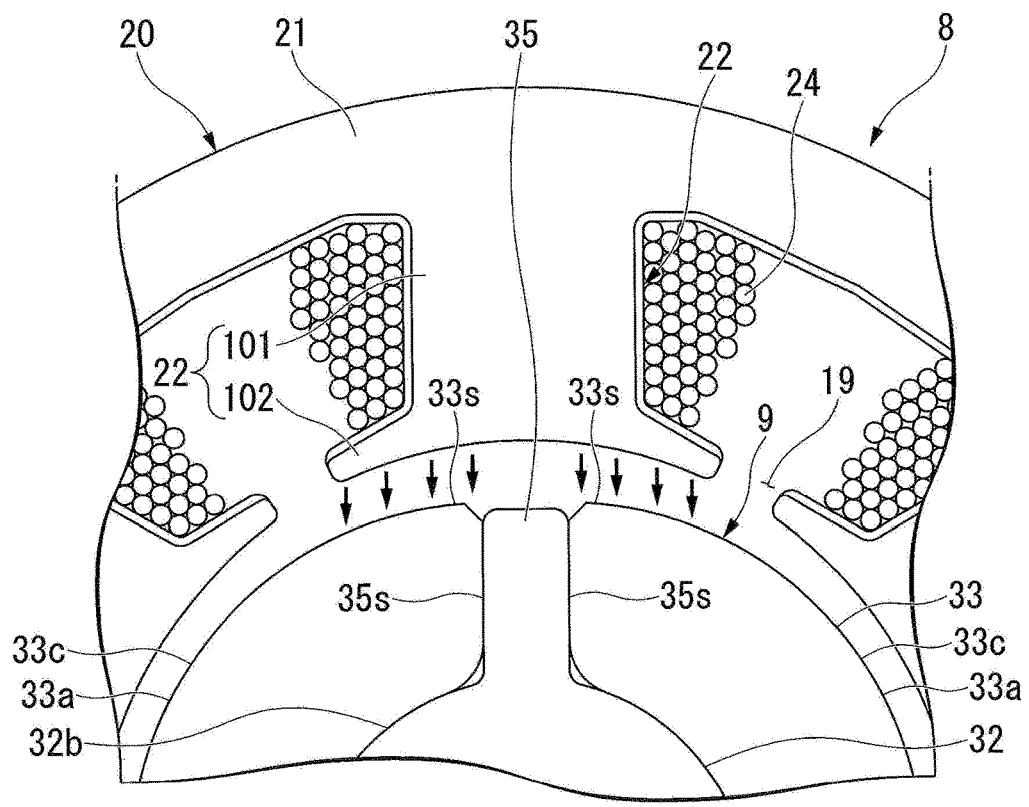
FIG. 12 is a diagram showing the direction of magnetic flux around the salient poles when the salient poles according to the first embodiment of the present invention do not protrude radially outward from circumferential end portions of the magnets.

FIG. 11 and FIG. 12 are diagrams showing the directions of the magnetic flux around the salient poles 35. FIG. 11 and FIG. 12 compare the case in which the salient poles 35 protrude radially outward from the circumferential end portions 33s of the magnetics 33 (FIG. 11) and the case in which the salient poles 35 do not protrude radially outward from the circumferential end portions 33s of the magnetics 33 (FIG. 12).

Compared with the case in which the salient poles 35 do not protrude radially outward from the circumferential end portions 33s of the magnets 33 as shown in FIG. 12, it can be confirmed that concentration of the magnetic flux on the end portions 33s of the magnets 33 is suppressed and the magnetic flux is concentrated on the salient poles 35 when the salient poles 35 protrude radially outward from the circumferential end portions 33s of the magnets 33 as shown in FIG. 11.

In addition, the facing surfaces 35s of the salient poles 35, that faces the circumferential end portions 33s of the magnets 33, are formed parallel to each other on both sides in the circumferential direction. Here, if the salient pole 35 has a trapezoid shape in which a base portion of the salient pole 35 on the radial inner side has a large width dimension and a front end portion on the radial outer side has a small width dimension, the end portions 33s on both sides in the circumferential direction of the magnets 33 disposed between the salient poles 35 adjacent to each other in the circumferential direction become thinner. As a result, demagnetization of the magnets 33 is prone to occur. Additionally, if the salient pole 35 has a trapezoid shape in which the base portion of the salient pole 35 has a small width dimension and the front end portion has a large width dimension, the magnetic flux density is prone to saturate at the salient poles 35. In contrast, by forming the facing surfaces 35s of the salient poles 35 parallel to each other on both sides of the salient poles 35 in the circumferential direction, demagnetization is not prone to occur and the saturation of magnetic flux density can be suppressed.

Besides, the magnets 33 are magnetized in parallel orientation. Thereby, cogging can be suppressed and high magnetic flux density can be obtained.

Figure 13:
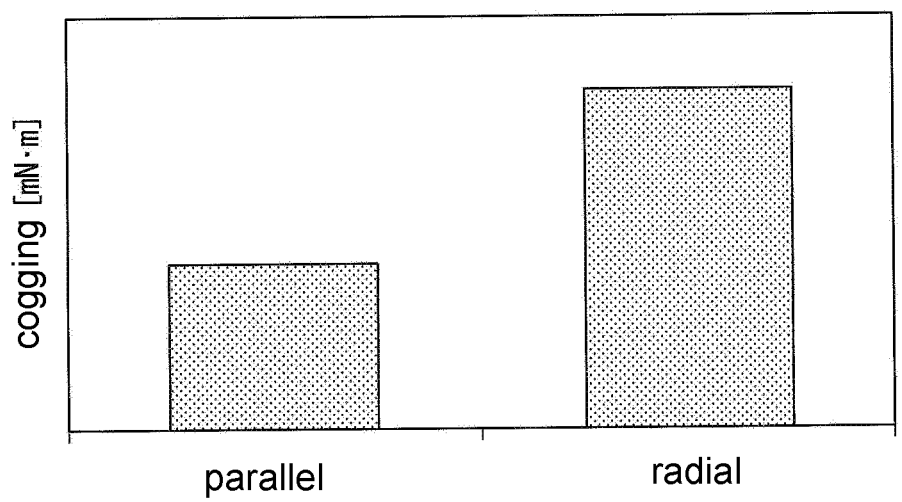
FIG. 13 is a graph showing cogging generated in the rotor when the orientation of the magnets according to the first embodiment of the present invention is set to parallel orientation and radial orientation, respectively.
Figure 14:
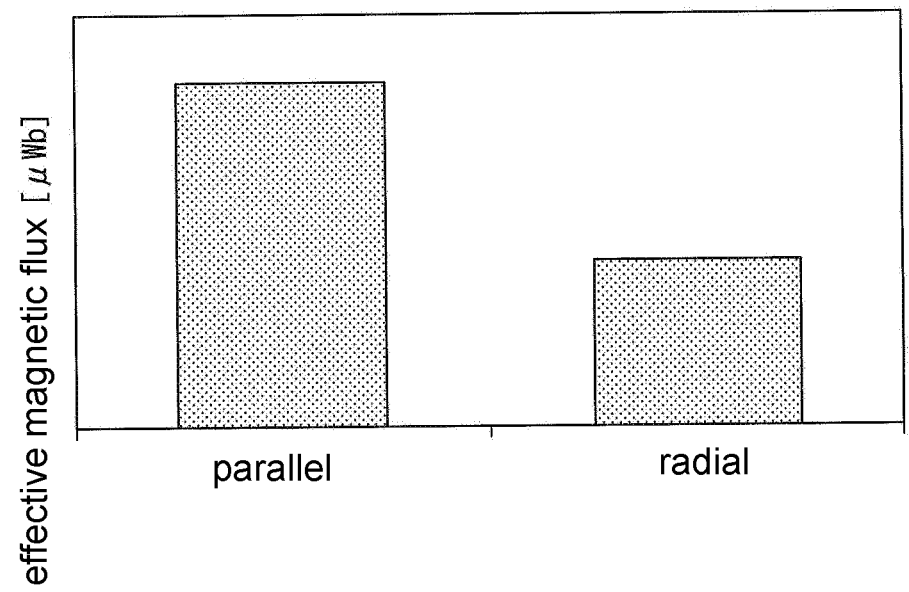
FIG. 14 is a graph showing effective magnetic flux generated in the rotor when the orientation of the magnets according to the first embodiment of the present invention is set to parallel orientation and radial orientation, respectively.

FIG. 13 is a graph showing the cogging [mN·m] generated in the rotor 9 of the first embodiment when the magnetization orientation of the magnets 33 is set to parallel orientation and radial orientation, respectively. FIG. 14 is a graph showing the effective magnetic flux [μWb] generated in the rotor 9 of the first embodiment when the magnetization orientation of the magnets 33 is set to parallel orientation and radial orientation, respectively.

As shown in FIG. 13 and FIG. 14, it can be confirmed that the cogging is suppressed and the effective magnetic flux is increased by setting the magnetization orientation of the magnets 33 to parallel orientation.

Figure 15:
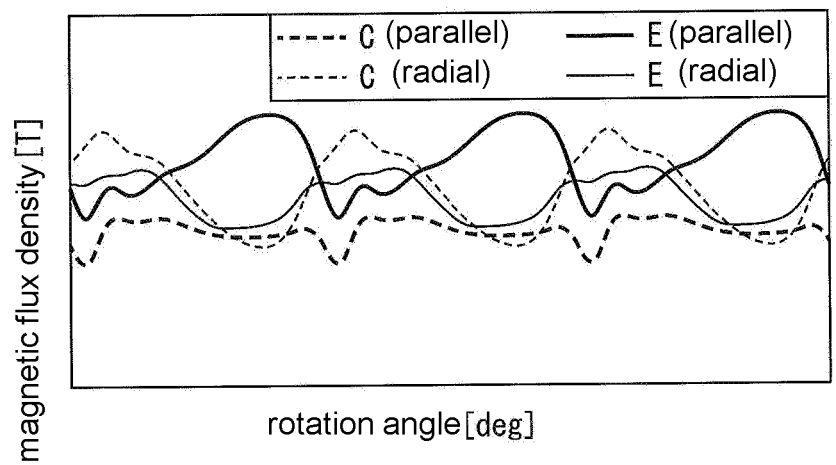
FIG. 15 is a graph showing magnetic flux density at circumferential end portions of the magnets of the rotor according to the first embodiment of the present invention.

FIG. 15 is a graph showing a change in the magnetic flux density at the circumferential end portions 33s of the magnets 33 with the vertical axis set as the magnetic flux density [T] at the circumferential end portions 33s of the magnets 33 in the rotor 9 and the horizontal axis set as the rotation angle [deg] of the rotor 9. More specifically, FIG. 15 is a graph showing the magnetic flux density [T] at the circumferential end portions 33s of the magnets 33 in the rotor 9. FIG. 15 compares the cases in which the magnetization orientation of the magnets 33 is set to parallel orientation and radial orientation respectively when the salient poles 35 protrude radially outward from the circumferential end portions 33s of the magnets 33 (indicated by reference numeral E in FIG. 15), and when the salient poles 35 do not protrude radially outward from the circumferential end portions 33s of the magnets 33 (indicated by reference numeral C in FIG. 15).

Figure 16:
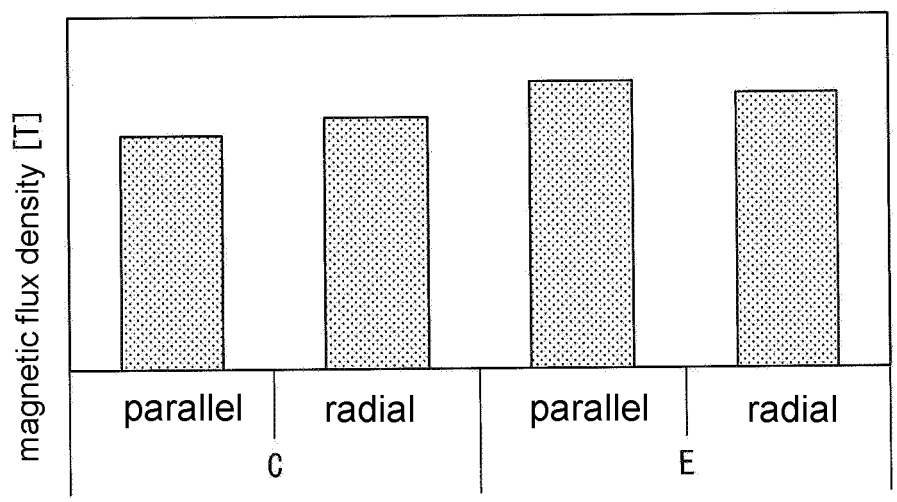
FIG. 16 is a graph showing the minimum value of the magnetic flux density when the orientation of the magnets according to the first embodiment of the present invention is set to parallel orientation and radial orientation, respectively.

FIG. 16 compares the minimum value (MIN) of the magnetic flux density in the cases that the magnetization orientation of the magnets 33 is set to parallel orientation and radial orientation respectively when the salient poles 35 protrude radially outward from the circumferential end portions 33s of the magnets 33 (indicated by reference numeral E in FIG. 16) and when the salient poles 35 do not protrude radially outward from the circumferential end portions 33s of the magnets 33 (indicated by reference numeral C in FIG. 16).

As shown in FIG. 15 and FIG. 16, the demagnetizing field can be effectively suppressed by making the salient poles 35 protrude radially outward from the circumferential end portions 33s of the magnets 33 and setting the magnetizing orientation of the magnets 33 to parallel orientation.

As described above, the motor unit 2 and the wiper motor 1 according to the above first embodiment include the stator 8 that has the stator core 20 being ring-shaped and a plurality of teeth 22 that protrudes radially inward from the inner peripheral surface of the stator core 20, and the coils 24 wound around the teeth 22. Additionally, the motor unit 2 and the wiper motor 1 include the shaft 31 that rotates around the rotary axis on the radial inner side of the stator core 20, the rotor core 32 that is secured to the shaft 31 and takes the rotary axis as the radial center, and the magnets 33. The magnets 33 are disposed on the outer peripheral surface 32b of the rotor core 32, and the radial thickness of the magnets 33 at end portions 33s on both sides in the circumferential direction around the rotary axis is smaller than the radial thickness at circumferential intermediate portions. In addition, the motor unit 2 and the wiper motor 1 include the salient poles 35 that are formed between the magnets 33 adjacent in the circumferential direction of the outer peripheral surface 32b of the rotor core 32 so as to further protrude radially outward than the circumferential end portions 33s of the magnets 33. The width dimensions of the salient poles 35 in the radial direction is set to 40° or less in the form of an electrical angle. The ratio between the number of magnetic poles of the magnets 33 and the number of teeth 22 is 2:3.

According to the above configuration, it is possible to reduce the inductance value in the d-axis direction by disposing the magnets 33 on the outer peripheral surface of the rotor core 32. In addition, by using the magnets 33 instead of rare earth magnets, an increase in cost due to an increase in the magnets usage can be suppressed even if the radial dimensions of the magnets are increased.

In addition, by making the salient poles 35 protrude radially outward from the circumferential end portions 33s of the magnets 33, the magnetic fluxes are concentrated on the salient poles 35, and thus the demagnetizing field is not prone to act on the end portions 33s of the magnets 33.

Besides, by setting the electrical angle θ of the salient poles 35 to 40° or less and reducing the width dimension of the salient poles 35 in the circumferential direction, the inductance value in the q-axis direction can be reduced. As a result, the demagnetizing field of the rotor core 32 can be suppressed.

Furthermore, the radial thickness at the end portions 33s of the magnets 33 on both sides in the circumferential direction is made smaller than the thickness at the circumferential intermediate portions 33c. Thereby, concentration of the magnetic flux on the end portions 33s of the magnets 33 is suppressed and the magnetic fluxes are concentrated on the salient poles 35, which also make it hard for the demagnetizing field to act on the end portions 33s of the magnets 33.

In this way, it is possible to increase the torque of the motor unit 2 and suppress torque ripple and cogging. In addition, in the above motor unit 2, high speed rotation can be achieved by performing advance angle energization and wide angle energization. Therefore, the increase in the cost can be suppressed and high speed rotation and high torque can be achieved.

In addition, in the motor unit 2, the facing surfaces 35s of the salient poles 35 that faces the circumferential end portions 33s of the magnets 33 on both sides in the circumferential direction, are formed parallel to each other.

According to the above configuration, demagnetization is not prone to occur and the saturation of the magnetic flux density can be suppressed.

Besides, in the motor unit 2, the width dimensions of the salient poles 35 in the radial direction are set to 20° or more in the form of an electrical angle θ.

According to the above configuration, the electrical angle θ of the salient poles 35 is set to 20° or more, and the width dimensions in the radial direction can be secured to a certain value or above. Consequently, by concentrating the magnetic fluxes on the salient poles 35, an effect that the demagnetizing field is not prone to act on the end portions 33s of the magnets 33 can be reliably obtained. In addition, a high reluctance torque can be obtained by setting the electrical angle θ of the salient poles 35 to 20° or more and 40° or less.

Furthermore, in the motor unit 2, since the magnetization direction of the magnets 33 is in parallel, the cogging of the motor unit 2 can be suppressed and a high magnetic flux density can be obtained.

A Variation Example of the First Embodiment

Figure 17:
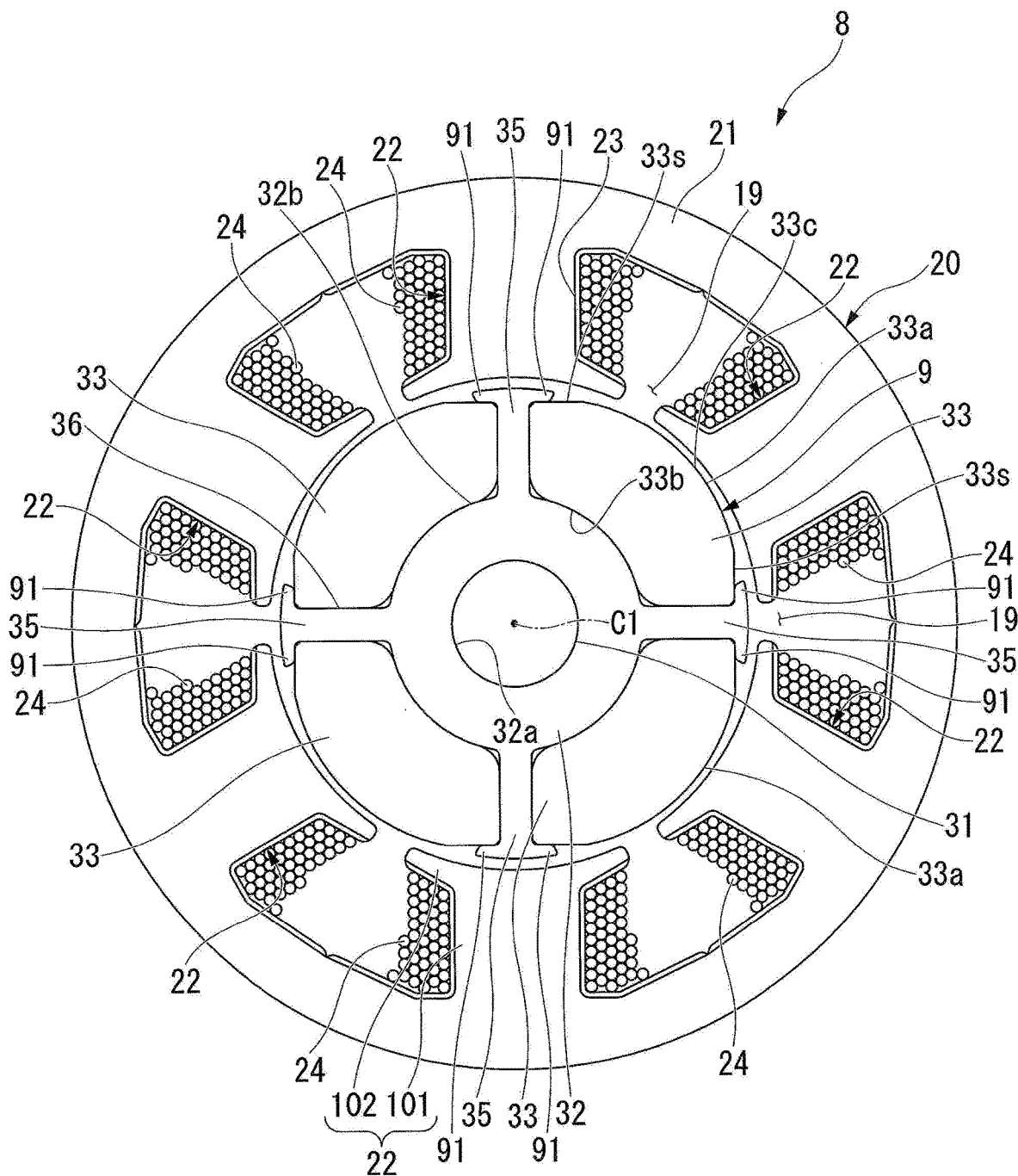
FIG. 17 is a plan view of the stator and the rotor in a variation example according to the first embodiment of the present invention as viewed from the axial direction.
Figure 18:
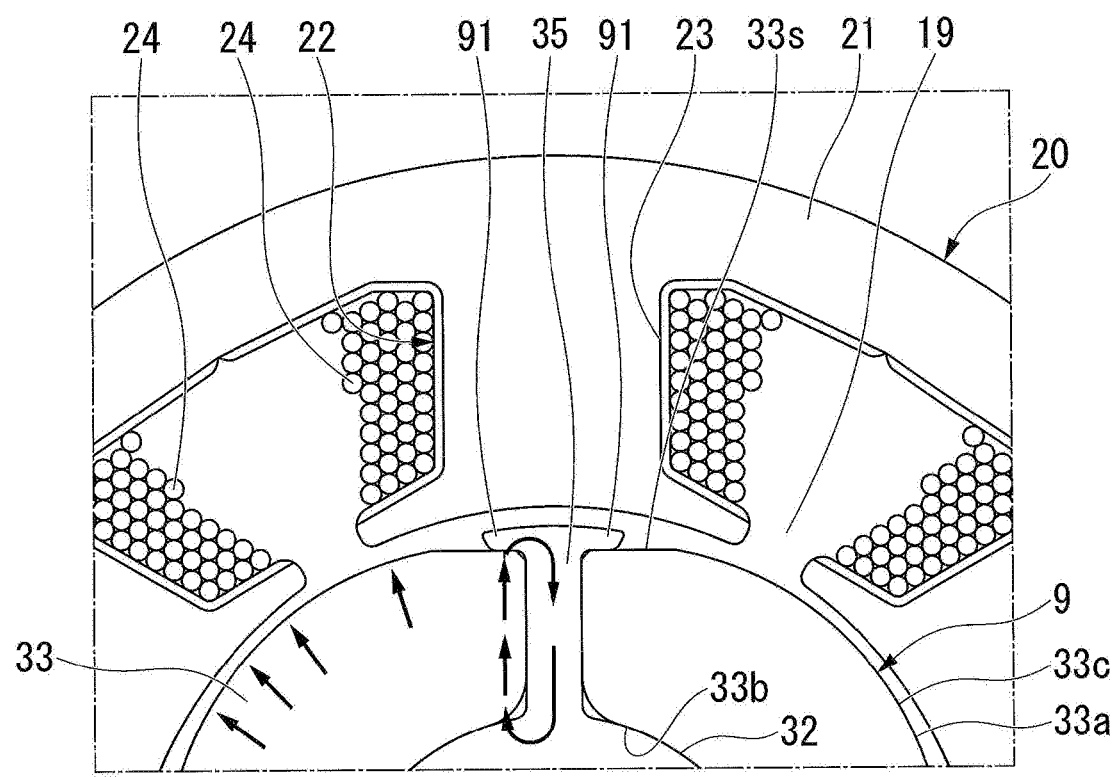
FIG. 18 is an explanatory diagram showing a flow of magnetic flux to the salient poles in a variation example according to the first embodiment of the present invention.

Next, a variation example of the first embodiment is described based on FIG. 17 and FIG. 18.

FIG. 17 is a plan view in which the stator 8 and the rotor 9 according to a variation example of the first embodiment are viewed from the axial direction. FIG. 17 corresponds to FIG. 3 of the first embodiment described above.

As shown in FIG. 17 and FIG. 18, in the variation example, convex portions 91 extending in the circumferential direction are formed in the end portions 35t on the radial outer sides of the salient poles 35, which is different from the salient poles 35 of the first embodiment in which the convex portions 91 are not formed.

More specifically, the convex portions 91 of the salient poles 35 protrude from the end portions 35t of the salient poles 35 along the circumferential direction so as to cover the end portions 33s of the magnets 33 from the radial outer side. As a result, the movement of the magnets 33 in the radial direction with respect to the salient poles 35 is restricted. Therefore, the magnets 33 are prevented from being scattered from the rotor core 32 by a centrifugal force acting on the magnets 33 during rotation of the rotor 9.

FIG. 18 is an explanatory diagram showing the flow of the magnetic flux to the salient poles 35 in the variation example of the first embodiment.

Meanwhile, as shown by the arrow in FIG. 18, when the end portions 33s of the magnets 33 are covered by the convex portions 91 of the salient poles 35, the magnetic flux of the end portions 33s of the magnets 33 may pass through the convex portions 91 and leak to the salient poles 35. In this case, the effective magnetic flux toward the teeth 22 of the magnets 33 decreases. Furthermore, on the outer peripheral surface of the rotor 9, the proportion of the salient poles 35 is increased, which may increase cogging. Therefore, the second embodiment described below is effective.

Second Embodiment

Next, the second embodiment of the present invention is described with reference to FIGS. 19 to 21. Moreover, the same aspects as those in the first embodiment are described with the same reference numerals (the same applies to the following embodiments and variation examples).

Figure 19:
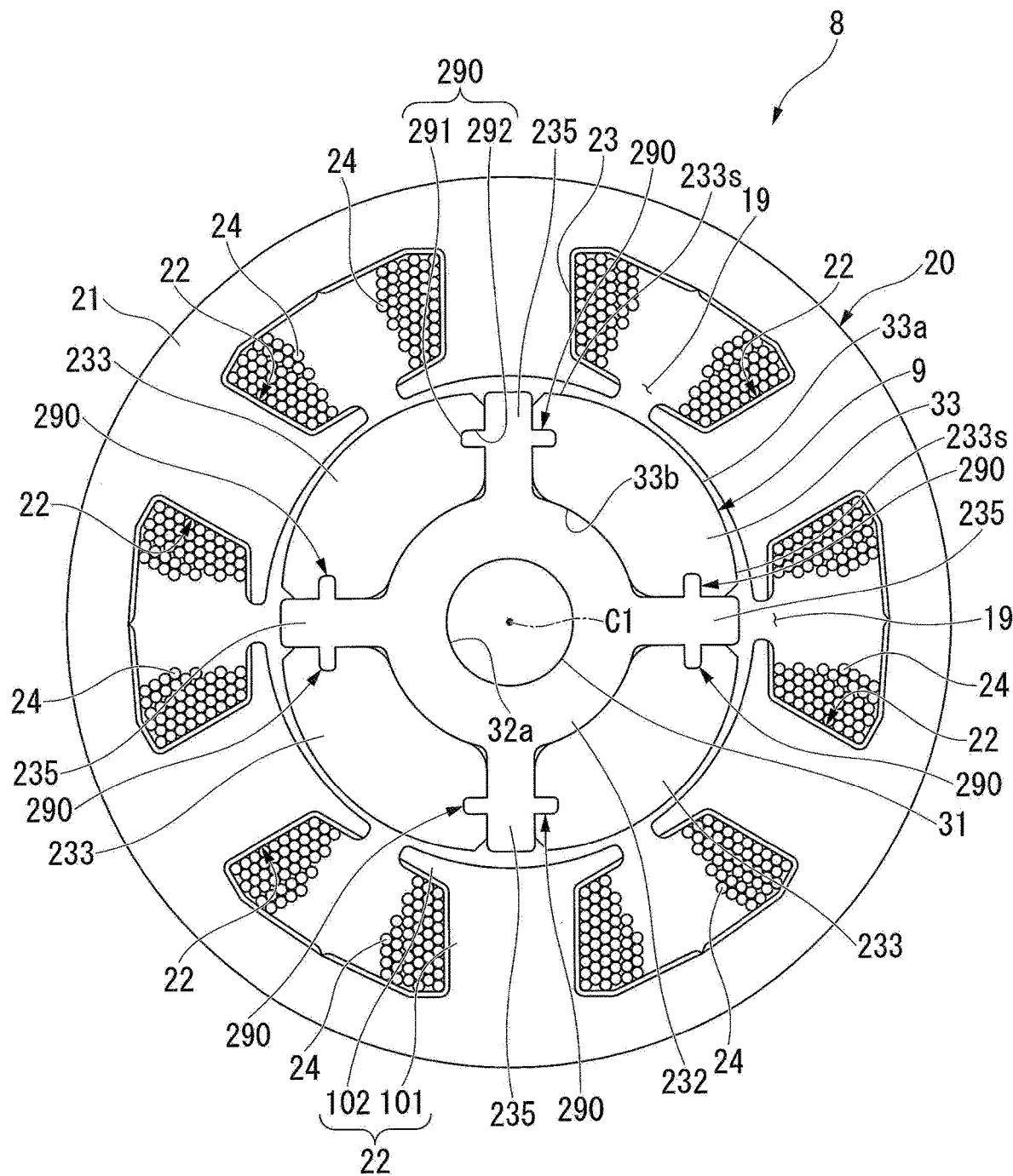
FIG. 19 is a plan view of the stator and the rotor according to a second embodiment of the present invention as viewed from the axial direction.

FIG. 19 is a plan view in which the stator 8 and a rotor 209 in the second embodiment of the present invention are viewed from the axial direction. FIG. 19 corresponds to FIG. 3 of the first embodiment described above.

As shown in FIG. 19, the difference between the first embodiment and the second embodiment is that the magnets 33 of the first embodiment are ferrite saddle magnets, whereas magnets 233 of the second embodiment are bonded magnets. The bonded magnet includes, for example, a neodymium bonded magnet and the like.

In addition, in the second embodiment, concave-convex fitting portions 290 are arranged on salient poles 235 and the magnets 233, respectively, which is different from the first embodiment described above. The concave-convex fitting portions 290 are described below in detail.

Figure 20:
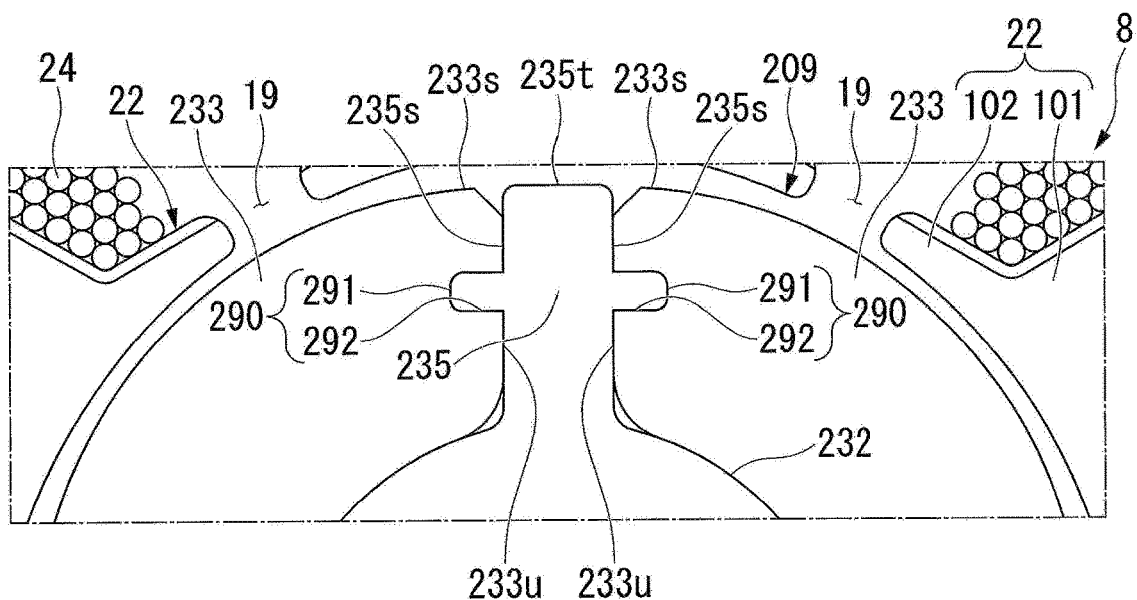
FIG. 20 is an enlarged view of the rotor shown in FIG. 19.

FIG. 20 is an enlarged view of the rotor 209 shown in FIG. 19.

As shown in FIG. 20, one convex portion 291 is formed on each of facing surfaces 235s of the salient poles 235 that faces end portions 233s of the magnets 233 in the circumferential direction so as to protrude toward the magnets 233 (toward the circumferential direction). In addition, the convex portions 291 are formed across the entire axial direction. Further, the convex portion 291 of the salient poles 235 are arranged slightly radially outward from the radial center in a manner avoiding the end portions 235t of the salient poles 235 on the radial outer side.

On the end portions 233s of the magnets 233, concave portions 292 that can be fitted with the convex portions 291 of the salient poles 235 are respectively formed across the entire axial direction on facing surfaces 233u of the magnets 233 facing the salient poles 235 in the circumferential direction. Then, the concave-convex fitting portions 290 are constituted by the convex portions 291 of the salient poles 235 and the concave portions 292 of the magnets 233. The radial movement of the magnets 233 with respect to the salient poles 235 is restricted by the concave-convex fitting portions 290.

When the magnets 233 are assembled to the rotor core 232, first, the magnets 233 are disposed at the axial end portions of the rotor core 232. Then, the convex portions 291 of the salient poles 235 and the concave portions 292 of the magnets 233 are aligned. Thereafter, the magnets 233 are inserted from the axial end portions of the rotor core 232. Accordingly, the assembly of the magnets 233 to the rotor core 232 is completed.

Moreover, it may be that the magnets 233 are not molded in advance, the rotor core 232 is disposed in a mold (not shown), melted magnets 233 are poured into the mold (not shown), and then the magnets 233 are cured and molded (insert molding).

Therefore, according to the second embodiment described above, since the magnets 233 are bonded magnets, the concave portions 292 can be easily formed. Various methods can be selected to form the magnets 233, such as insert molding of the magnets 233 inside the rotor core 232, and productivity can be improved.

Figure 21:
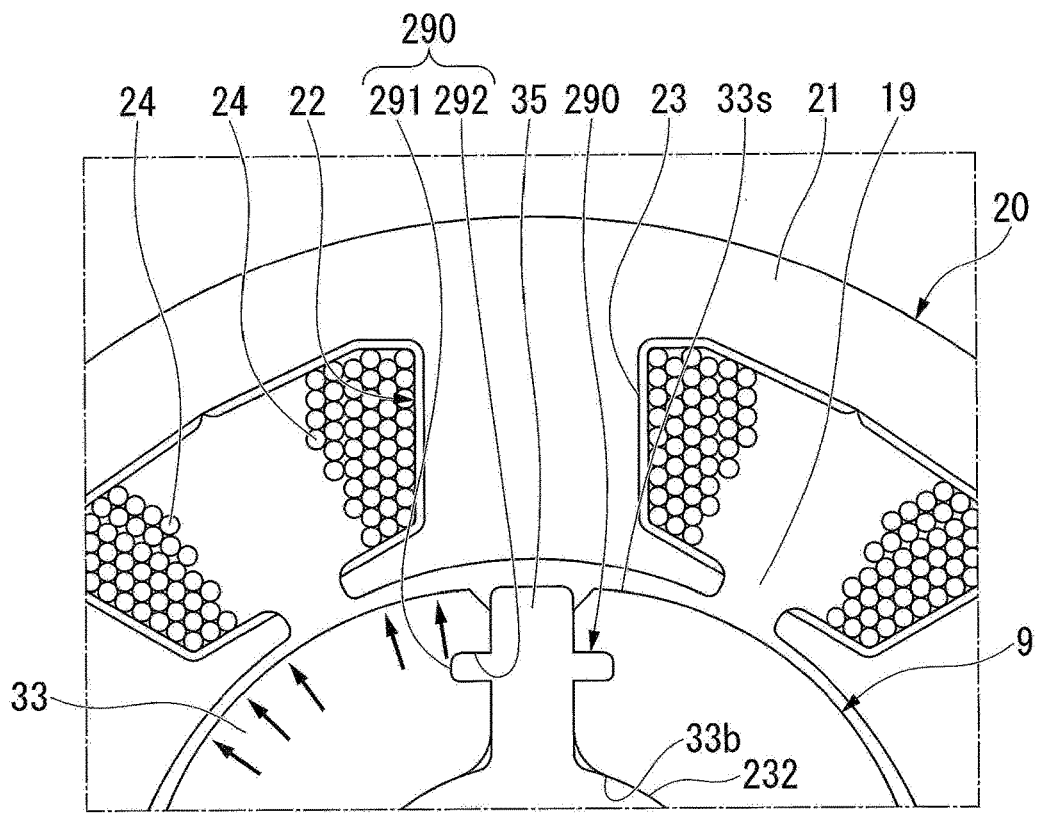
FIG. 21 is an explanatory diagram showing the flow of the magnetic flux of the magnets in the second embodiment of the present invention.

Furthermore, in addition to the same effects as the variation example of the first embodiment described above, leakage of magnetic flux of the magnets 233 to the salient poles 235 (the convex portions 91 in the variation example of the first embodiment) can be prevented as shown by the arrows in FIG. 21. As a result, a decrease in the effective magnetic flux toward the teeth 22 of the magnets 233 can be suppressed and the cogging of the rotor 209 can be prevented from becoming large.

Figure 22:
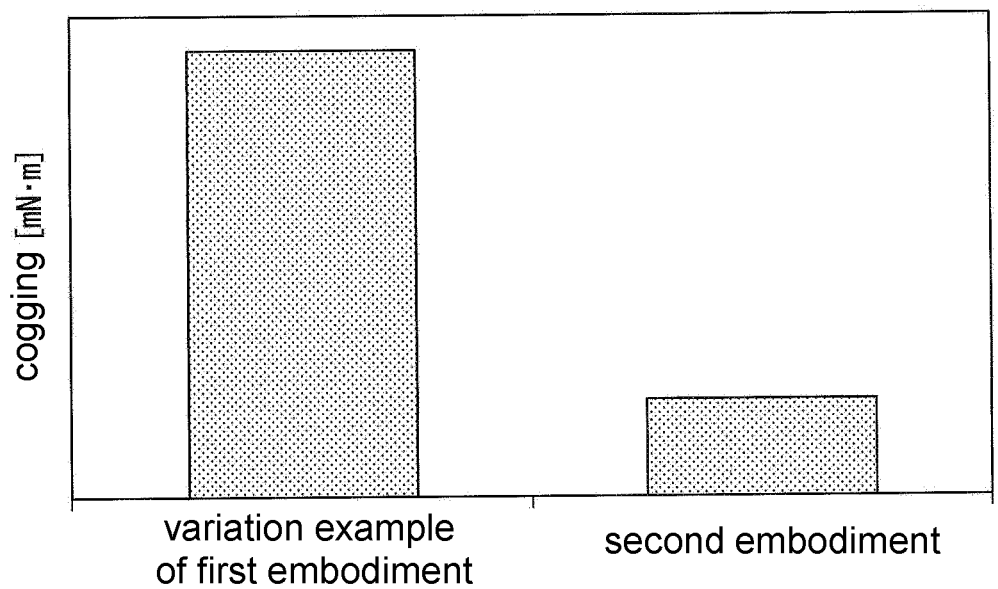
FIG. 22 is a graph in which the difference in cogging between magnets in the variation example of the first embodiment and magnets in the second embodiment of the present invention.
Figure 23:
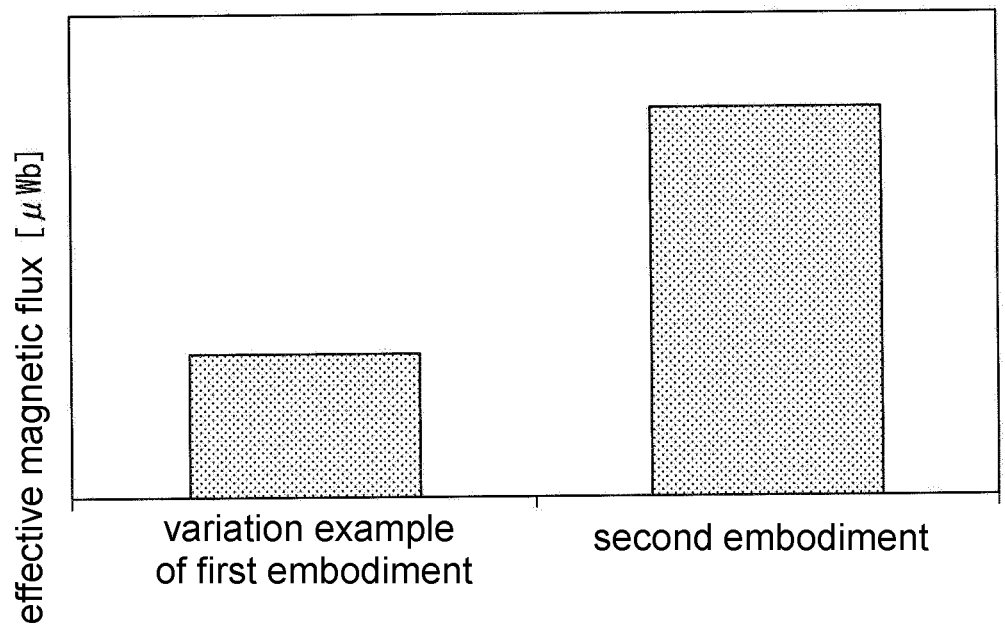
FIG. 23 is a graph comparing the difference in effective magnetic flux between magnets in the variation example of the first embodiment and magnets in the second embodiment of the present invention.

FIG. 22 is a graph in which the difference in cogging [mN·m] is compared between the magnets 33 in the variation example of the first embodiment and the magnets 233 in the second embodiment. FIG. 23 is a graph in which the difference in effective magnetic flux [μWb] is compared between the magnets 33 in the variation example of the first embodiment and the magnets 233 in the second embodiment.

As shown in FIG. 22 and FIG. 23, it can be confirmed that the cogging in the second embodiment is suppressed and the effective magnetic flux is increased as compared with the variation example of the first embodiment.

First Variation Example of the Second Embodiment

Next, a first variation example of the second embodiment is described with reference to FIG. 24.

Figure 24:
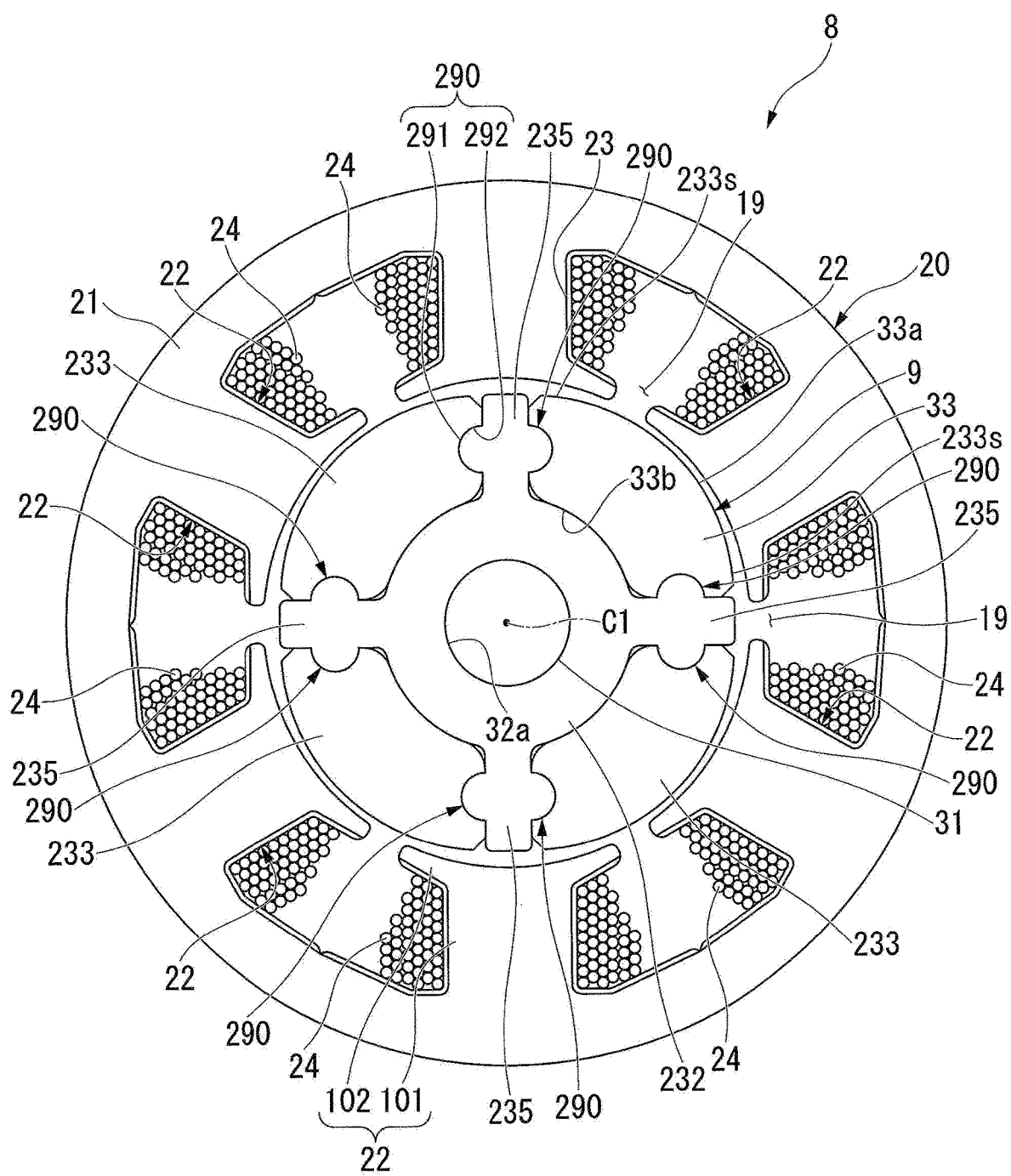
FIG. 24 is a plan view in which a stator and a rotor in a first variation example of the second embodiment of the present invention are viewed from the axial direction.

FIG. 24 is a plan view in which the stator 8 and the rotor 209 according to the first variation example of the second embodiment are viewed from the axial direction. FIG. 24 corresponds to FIG. 19 of the second embodiment described above.

As shown in FIG. 24, the convex portions 291 of the salient poles 235 are formed so as to have a substantially semicircular cross section perpendicular to the axial direction. Corresponding to the shape of the convex portions 291, the concave portions 292 of the magnets 233 are formed so as to have a substantially semicircular cross section perpendicular to the axial direction.

With this configuration, the fitting area of the concave-convex fitting portions 290 (the contact area between the convex portions 291 and the concave portions 292) can be increased as compared with the second embodiment described above. Thus, the bonding strength between the salient poles 235 and the magnets 233 through the concave-convex fitting portions 290 can be enhanced.

In addition, by forming the cross section perpendicular to the axial direction of the convex portions 291 in a substantially semicircular shape, the radial width of the convex portions 291 becomes smaller toward the front end of the convex portions 291 in the circumferential direction. Thus, even when the concave portions 292 are formed, the volume of the magnets 233 can be increased as much as possible, and the effective magnetic flux of the magnets 233 can be increased accordingly.

Second Variation Example of the Second Embodiment

Figure 25:
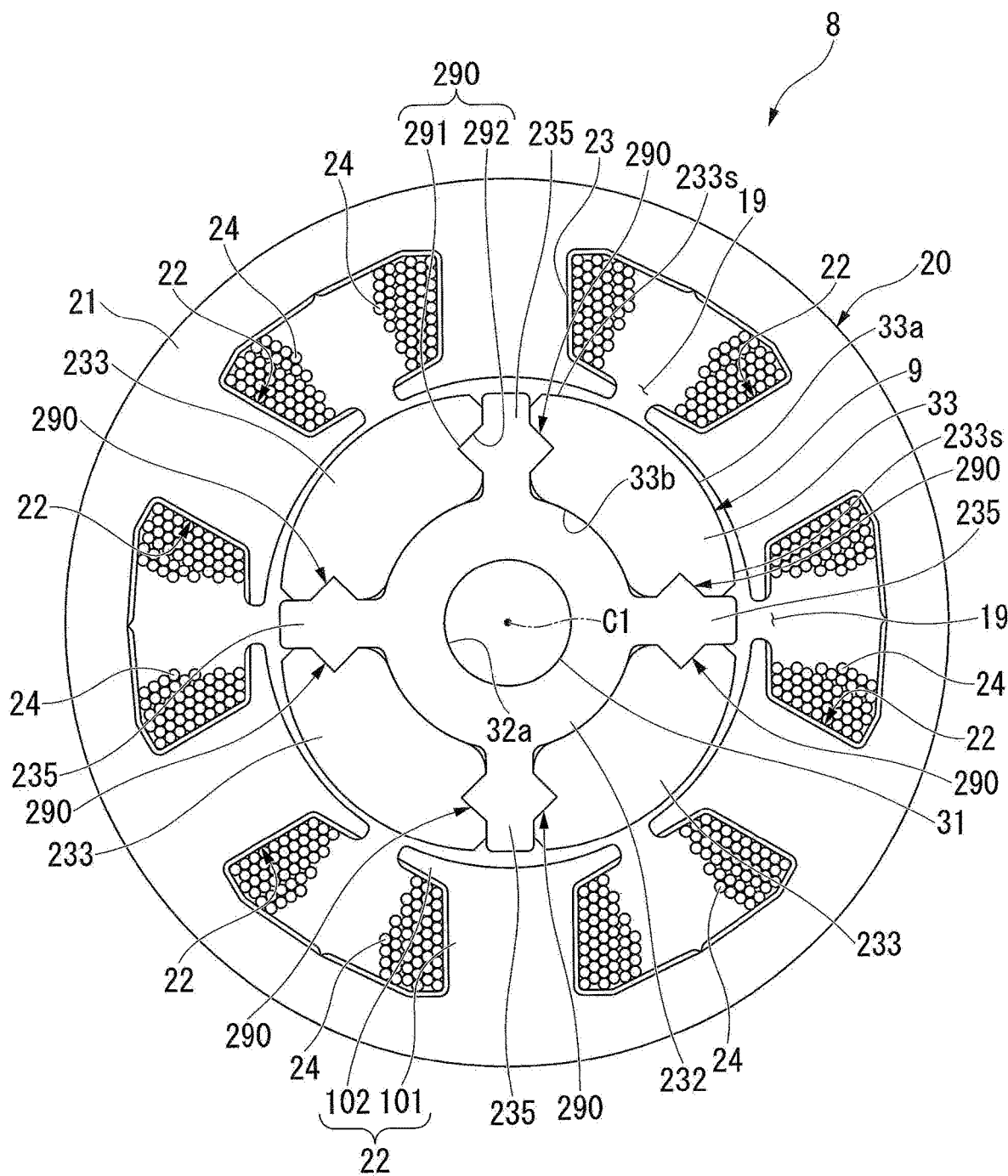
FIG. 25 is a plan view in which a stator and a rotor in a second variation example of the second embodiment of the present invention are viewed from an axial direction.

FIG. 25 is a plan view in which the stator 8 and the rotor 209 according to the second variation example of the second embodiment are viewed from the axial direction. FIG. 25 corresponds to FIG. 19 of the second embodiment described above.

As shown in FIG. 25, the convex portions 291 of the salient poles 235 are formed so as to have a substantially triangular cross section perpendicular to the axial direction. Corresponding to the shape of the convex portions 291, the concave portions 292 of the magnets 233 are formed so as to have a substantially triangular cross section perpendicular to the axial direction.

When the convex portions 291 and the concave portions 292 are formed in this way, the same effects as those of the first variation example of the second embodiment described above can also be obtained.

Third Variation Example of the Second Embodiment

Figure 26:
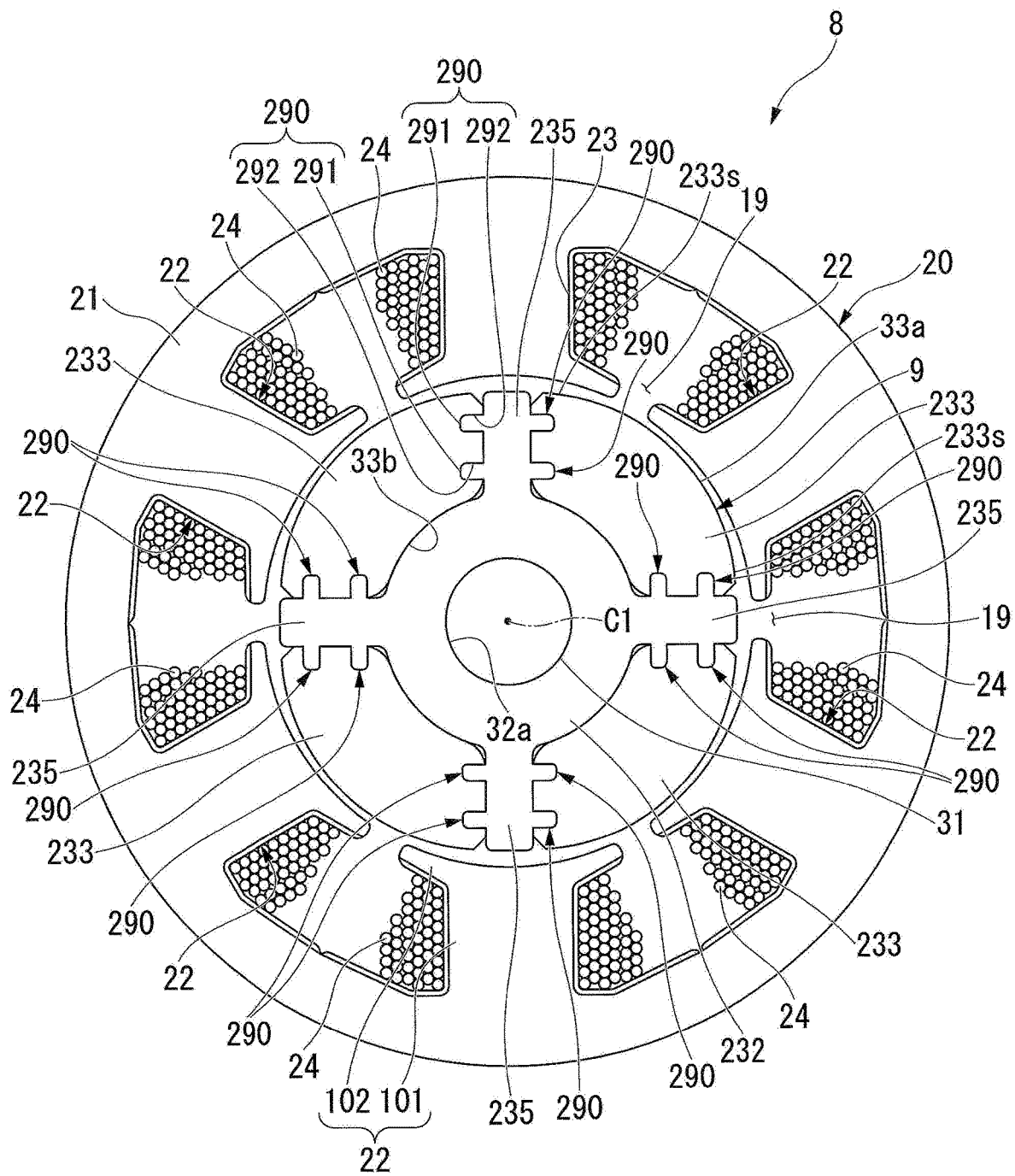
FIG. 26 is a plan view in which a stator and a rotor in a third variation example of the second embodiment of the present invention are viewed from the axial direction.

FIG. 26 is a plan view in which the stator 8 and the rotor 209 according to the third variation example of the second embodiment are viewed from the axial direction. FIG. 26 corresponds to FIG. 19 of the second embodiment described above.

As shown in FIG. 26, the difference between the second embodiment and the third variation example of the second embodiment is that one convex portion 291 and one concave portion 292 of the second embodiment are formed on the two facing surfaces 235s of the salient poles 235 and the facing surfaces 233u of the magnets 233, respectively, whereas two convex portions 291 and two concave portions 292 of the third variation example of the second embodiment are formed on the two facing surfaces 235s of the salient poles 235 and the facing surfaces 233u of the magnets 233, respectively.

The convex portions 291 and the concave portions 292 are respectively arranged side by side in the radial direction. With this configuration, the fitting area of the concave-convex fitting portions 290 (the contact area between the convex portions 291 and the concave portions 292) can be increased as compared with the second embodiment described above. Thus, the bonding strength between the salient poles 235 and the magnets 233 through the concave-convex fitting portions 290 can be enhanced.

Fourth Variation Example of the Second Embodiment

Figure 27:
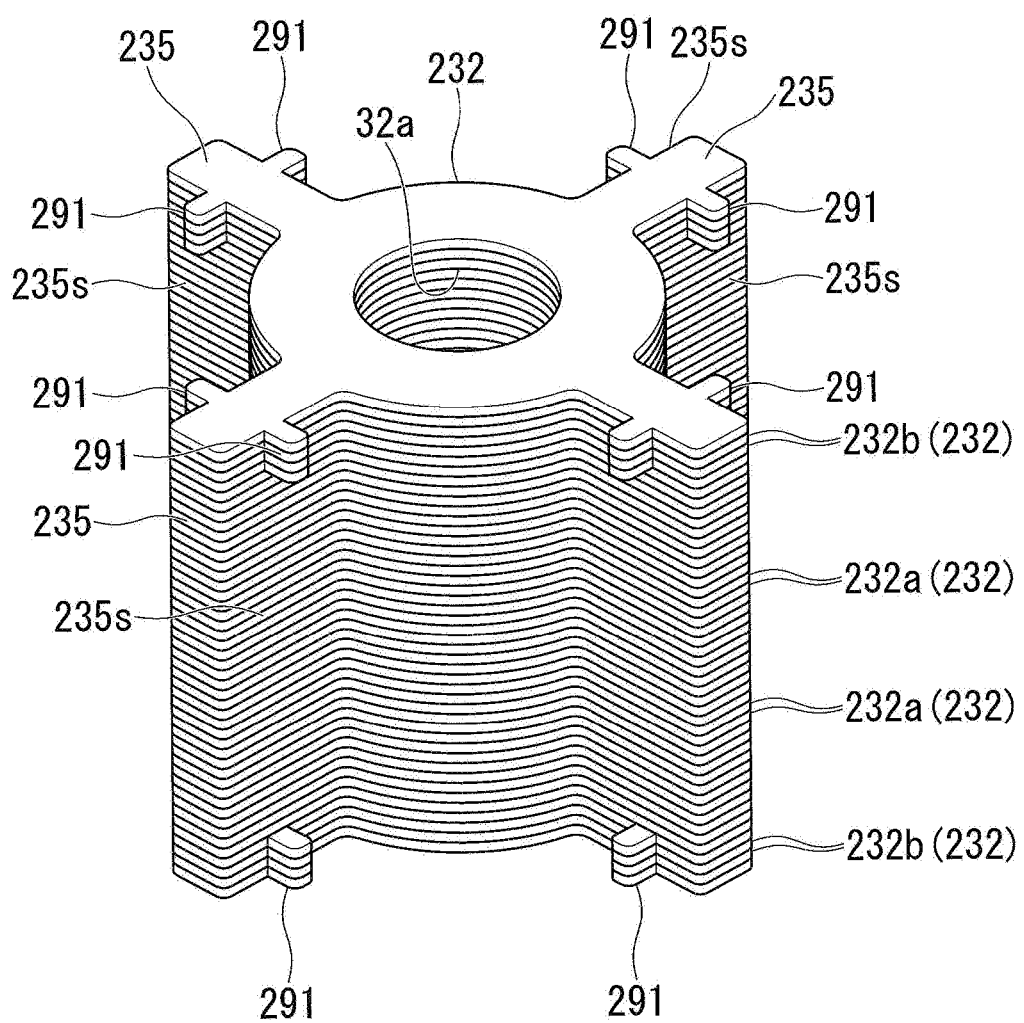
FIG. 27 is a perspective view of a rotor core in a fourth variation example of the second embodiment of the present invention.

FIG. 27 is a perspective view of the rotor core 232 according to the fourth variation example of the second embodiment.

As shown in FIG. 27, in the fourth variation example of the second embodiment, on the facing surface 235s of the salient poles 235 of the rotor core 232, the convex portions 291 are arranged only at both end portions in the axial direction. In other words, the convex portions 291 are not arranged in most of the axial central portion of the facing surfaces 235s of the salient poles 235 of the rotor core 232.

Here, the rotor core 232 is formed by laminating a plurality of metal plates in the axial direction, and thus the convex portions 291 are formed only on desired metal plates laminated at both ends in the axial direction. That is, the plurality of metal plates forming the rotor core 232 is composed of a plurality of first metal plates 232a on which the convex portions 291 are not formed on the salient poles 235, and a plurality of second metal plates 232b arranged on the outermost side in the axial direction of the laminated first metal plates 232a and having the convex portions 291 formed on the salient poles 235.

Therefore, according to the fourth variation example of the second embodiment described above, in addition to the same effects as those of the second embodiment described above, it is possible to minimize the locations where the concave-convex fitting portions 290 are formed and simplify the structure of the rotor core 232.

In addition, since the convex portions 291 are arranged only at both end portions in the axial direction of the salient poles 235, it is not necessary to form the concave portions 292 (not shown in FIG. 27) for fitting with the convex portions 291 at most of the axial central portion of the magnets 233 (not shown in FIG. 27). That is, the volume of the magnets 233 at most of the axial central portion where magnetic flux passes easily can be set large. Consequently, the effective magnetic flux of the magnets 233 can be further increased.

Moreover, in the second embodiment and the first to fourth variation examples of the second embodiment, the rotor core 232 may also be formed, for example, by press-molding soft magnetic powder as in the first embodiment.

In addition, in the second embodiment and the first to fourth variation examples of the second embodiment described above, the cases are described in which the convex portions 291 are arranged on the salient poles 235 of the rotor core 232 and the concave portions 292 that are fitted with the convex portions 291 are arranged on the magnets 233. However, the present invention is not limited hereto, the concave portions 292 may be arranged on the salient poles 235 of the rotor core 232, and the convex portions 291 may be arranged on the magnets 233. Here, the width of the salient poles 235 in the circumferential direction may be set to about 5 mm. Thus, it is desirable to arrange the convex portions 291 on the salient poles 235 when the width of the salient poles 235 in the circumferential direction is small. With the configuration described above, the durability of the salient poles 235 can be enhanced and the pass of the magnetic flux to the salient poles 35 can be improved.

Third Embodiment

Next, the third embodiment of the present invention is described with reference to FIGS. 28 to 31.

Figure 28:
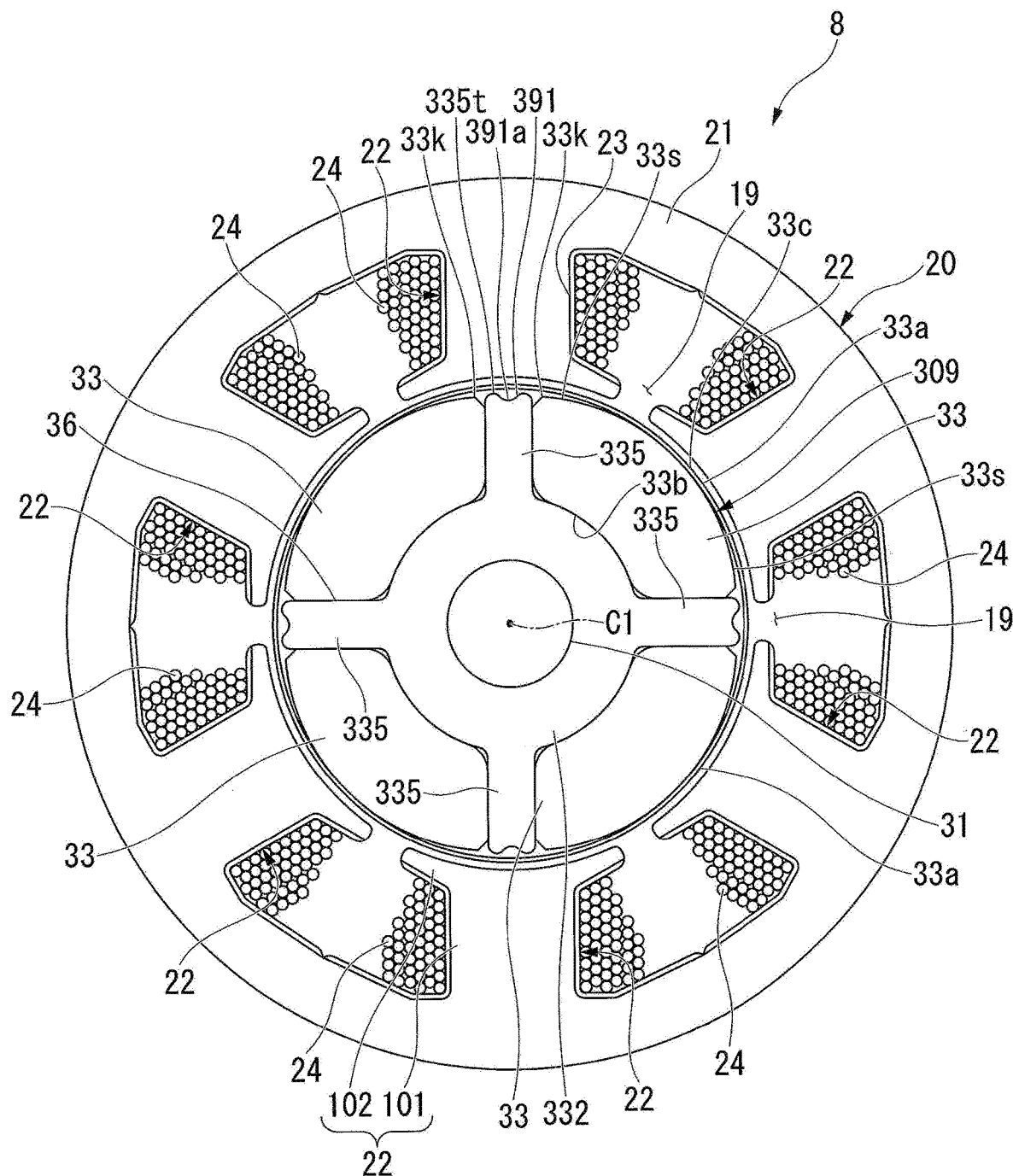
FIG. 28 is a plan view in which a stator and a rotor according to a third embodiment of the present invention are viewed from the axial direction.

FIG. 28 is a plan view in which the stator 8 and a rotor 309 according to the third embodiment of the present invention are viewed from the axial direction. FIG. 28 corresponds to FIG. 3 of the first embodiment described above.

As shown in FIG. 28, the difference between the first embodiment and the third embodiment is that the shape of the radial outer end portions 35t of the salient poles 35 in the rotor core 32 of the first embodiment described above is different from the shape of radial outer end portions 335t of the salient poles 335 in the rotor core 332 of the third embodiment. Details are described below.

Figure 29:
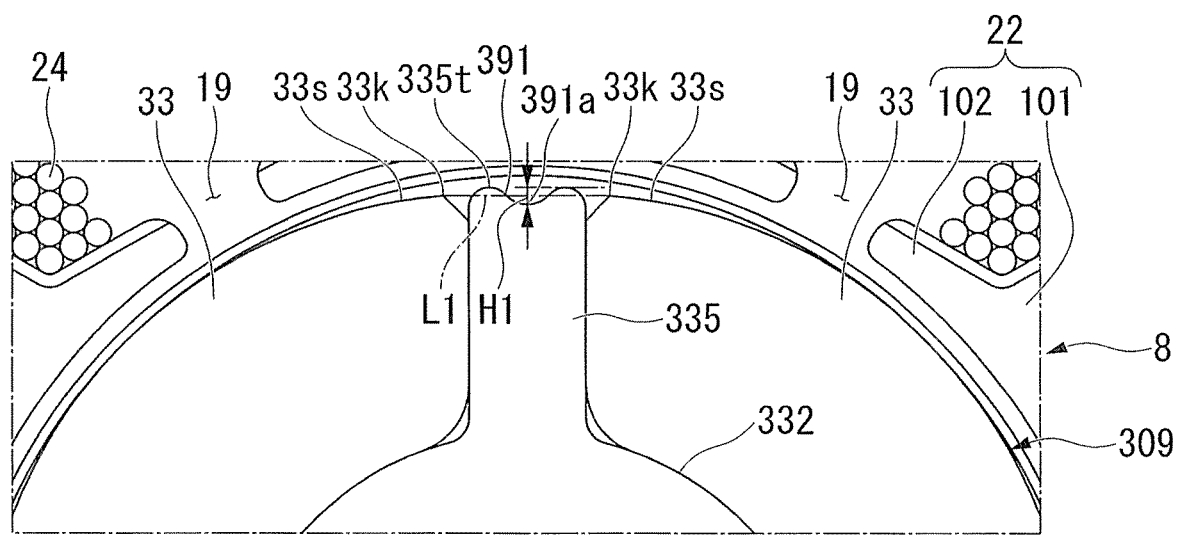
FIG. 29 is an enlarged view of the rotor shown in FIG. 28.

FIG. 29 is an enlarged view of the rotor 309 shown in FIG. 28.

As shown in FIG. 29, at the end portion 335t of the salient pole 335 in the radial outer side, a groove 391 is formed across the entire axial direction at substantially the center in the circumferential direction. In addition, the groove 391 is formed in a substantially V-groove shape so that the groove width in the circumferential direction gradually decreases toward the radial inner side.

By forming the groove 391 at the end portion 335t of the salient pole 335 in this way, the interval between the end portion 335t and the teeth 22 (the collar portions 102) of the stator 8 can be made non-uniform when the end portion 335t of the salient pole 335 is considered as a whole. In other words, the interval between the end portion 335t of the salient pole 335 and the teeth 22 is large at a position where the groove 391 is formed, but the interval is small at a position where the groove 391 is not formed. As a result, it is possible to suppress a rapid increase in magnetic flux density generated in the teeth 22 (the collar portions 102) before and after the salient poles 335 pass between the teeth 22 during rotation of the rotor 309. Therefore, rapid torque fluctuation of the rotor 309 can be reduced, and torque ripple can be reduced.

Figure 30A:
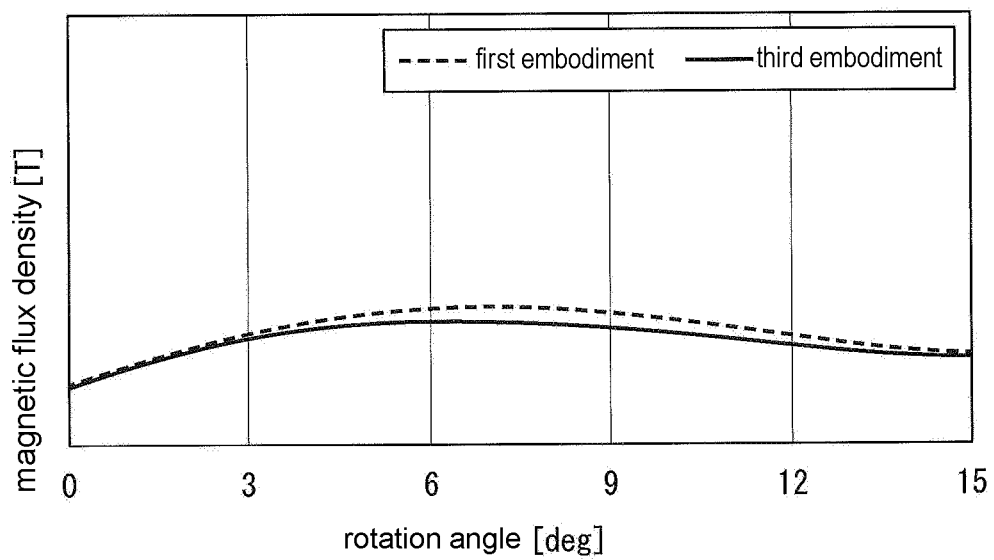
FIG. 30A is a graph showing changes in magnetic flux density in the third embodiment of the present invention, and shows a state immediately before the end portions of the salient poles straddle the space between the teeth adjacent in the circumferential direction.
Figure 30B:
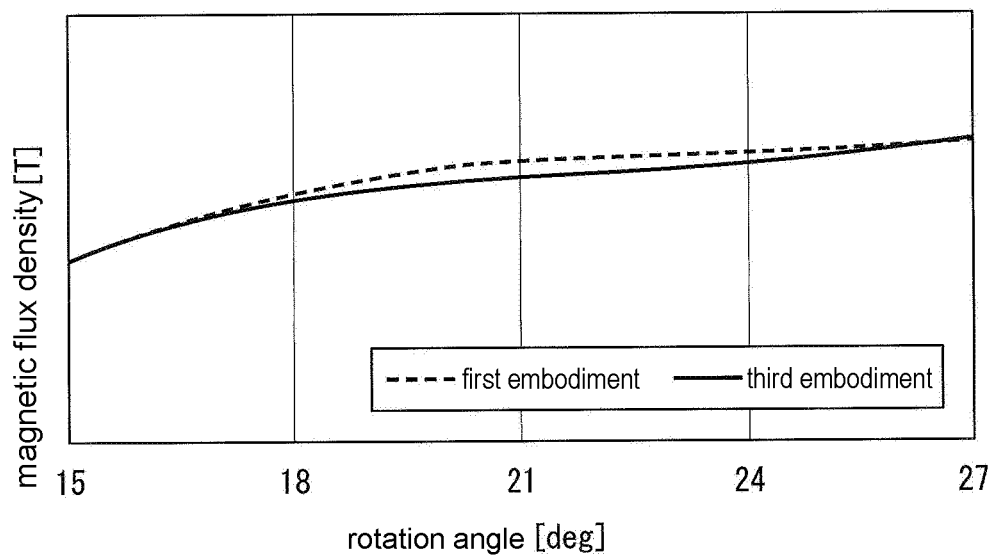
FIG. 30B is a graph showing changes in magnetic flux density in the third embodiment of the present invention, and shows a state after the end portions of the salient poles straddle the space between the teeth adjacent in the circumferential direction.

FIG. 30A is a graph showing a change in magnetic flux density with the vertical axis set as the magnetic flux density [T] of the teeth 22 and the horizontal axis set as the rotation angle [deg] of the rotor 309. FIG. 30A shows a state immediately before the end portions 335t of the salient poles 335 straddle the space (the slot 19) between the teeth 22 adjacent in the circumferential direction. FIG. 30 (B) is a graph showing a change in magnetic flux density with the vertical axis set as the magnetic flux density [T] of the teeth 22 and the horizontal axis set as the rotation angle [deg] of the rotor 309. FIG. 30B shows a state after the end portions 335t of the salient poles 335 straddle the space (the slot 19) between the teeth 22 adjacent in the circumferential direction. Then, the first embodiment described above is compared with the third embodiment.

As shown in FIG. 30A and FIG. 30B, it can be confirmed that compared with the first embodiment described above, in the third embodiment, the rapid increase in the magnetic flux density generated in the teeth 22 (the collar portions 102) along with the rotation of the rotor 309 is suppressed.

Figure 31:
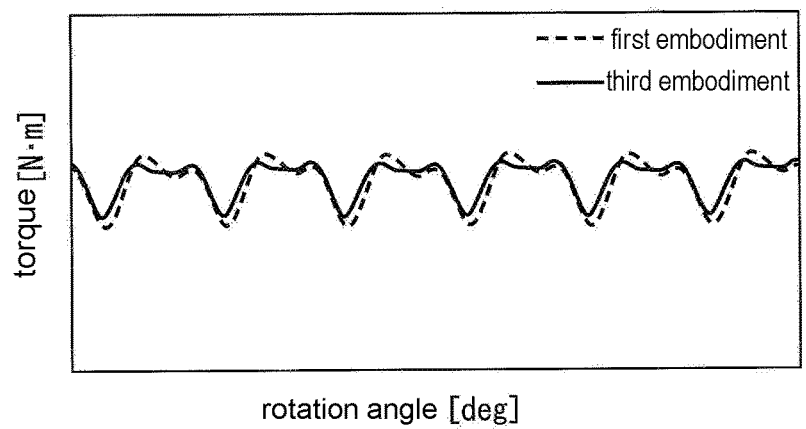
FIG. 31 is a graph showing changes in torque in the first embodiment and the third embodiment of the present invention.

FIG. 31 is a graph showing a change in torque [N·m] with the vertical axis set as the torque [N·m] of the rotor 309 and the horizontal axis set as the rotation angle [deg] of the rotor 309. FIG. 31 compares the rotor 9 of the first embodiment described above with the rotor 309 of the third embodiment.

As shown in FIG. 31, it can be confirmed that the torque fluctuation in the third embodiment can be suppressed as compared with the first embodiment.

Here, by forming the groove 391 in the salient pole 335, the magnetic flux concentrated on the salient pole 335 is slightly reduced. Therefore, by limiting the groove depth H1 of the groove 391, the magnetic flux can be concentrated on the salient poles 335 as much as possible, and a high reluctance torque can be ensured.

Here, in order to more specifically describe actions and effects of the groove 391 of the third embodiment, a detailed description is given with reference to other shapes.

FIGS. 32 to 35 show one example of another shape of the salient pole, respectively. FIGS. 32A to 35A are partially enlarged views of the rotor. FIGS. 32B to 35B are graphs showing changes in torque [N·m] with the vertical axis set as the torque [N·m] of the rotor and the horizontal axis set as the rotation angle [deg] of the rotor.

Figure 32A:
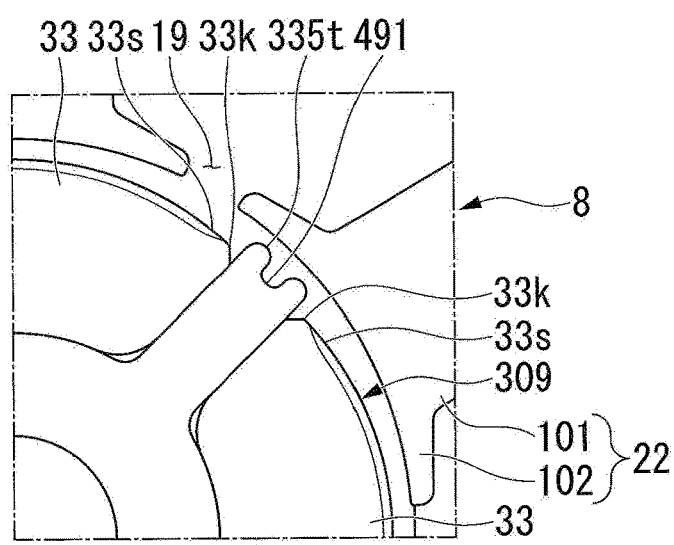
FIG. 32A is a partial enlarged view of the rotor, showing an example of the shape of another salient pole.
Figure 32B:
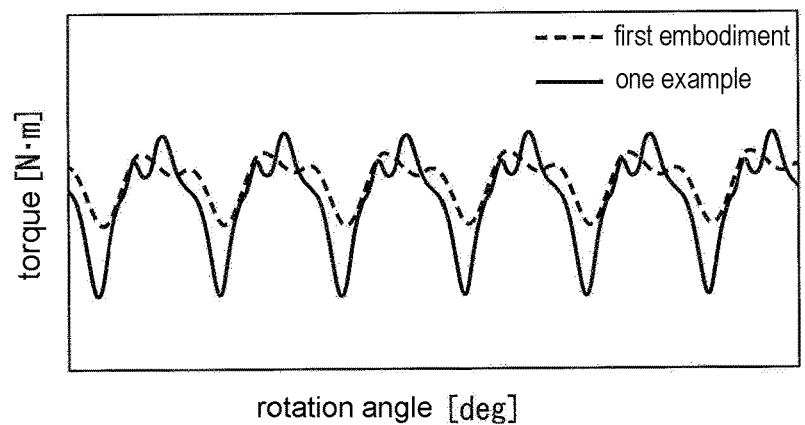
FIG. 32B is a graph showing an example of the shape of another salient pole and a change of torque.

For example, as shown in FIG. 32A, when a substantially U-shaped groove 491 is formed at the end portion 335t of the salient pole 335 as viewed from the axial direction in which the groove widths in the circumferential direction are uniform, it can be confirmed that, as shown in FIG. 32B, the fluctuation in torque is larger than that in the first embodiment.

Figure 33A:
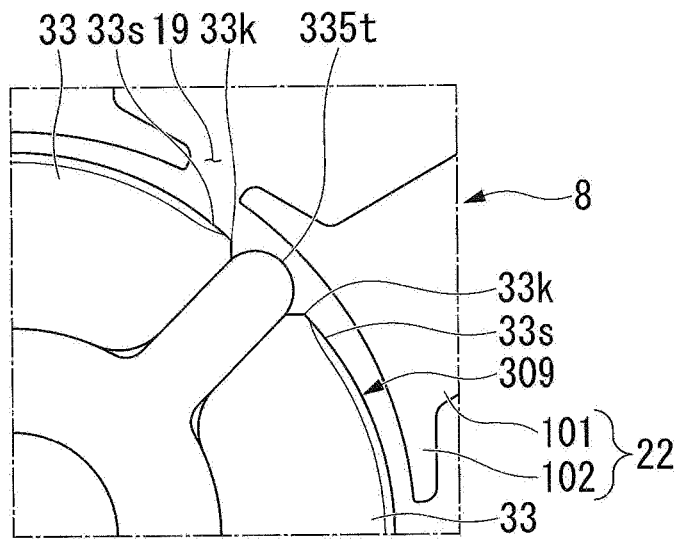
FIG. 33A is a partial enlarged view of the rotor, showing an example of the shape of another salient pole.
Figure 33B:
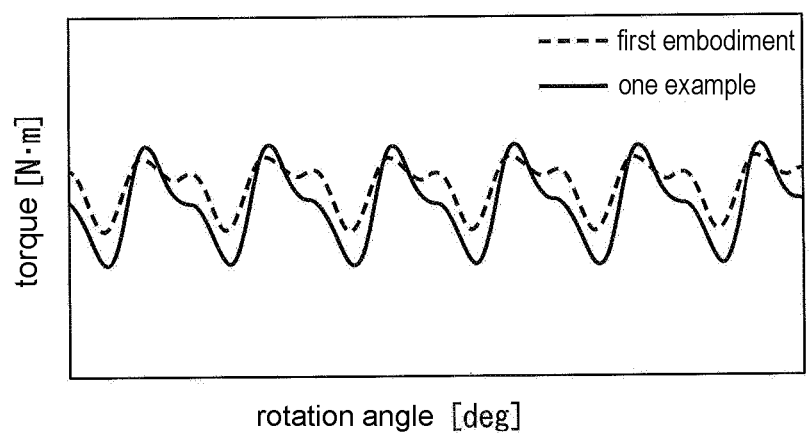
FIG. 33B is a graph showing an example of the shape of another salient pole and a change of torque.

In addition, as shown in FIG. 33A, when the end portion 335t of the salient pole 335 is formed in a substantially circular are shape as viewed from the axial direction so as to protrude radially outward, it can be confirmed that, as shown in FIG. 33B, the fluctuation of the torque is larger than that in the first embodiment.

Figure 34A:
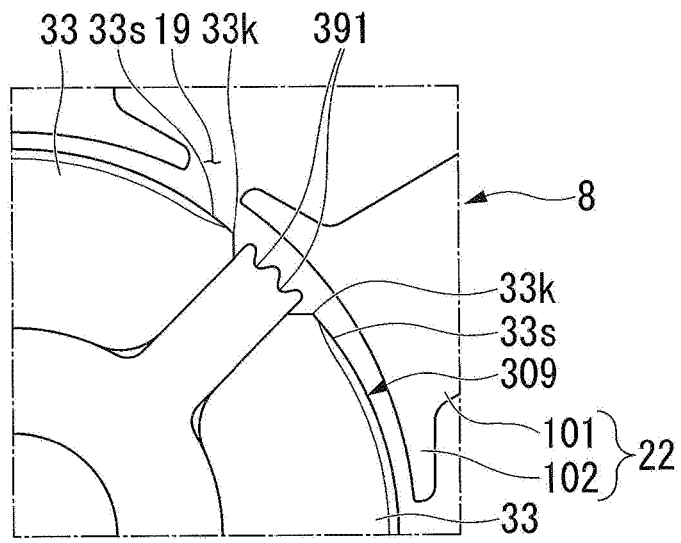
FIG. 34A is a partial enlarged view of the rotor, showing an example of the shape of another salient pole.
Figure 34B:
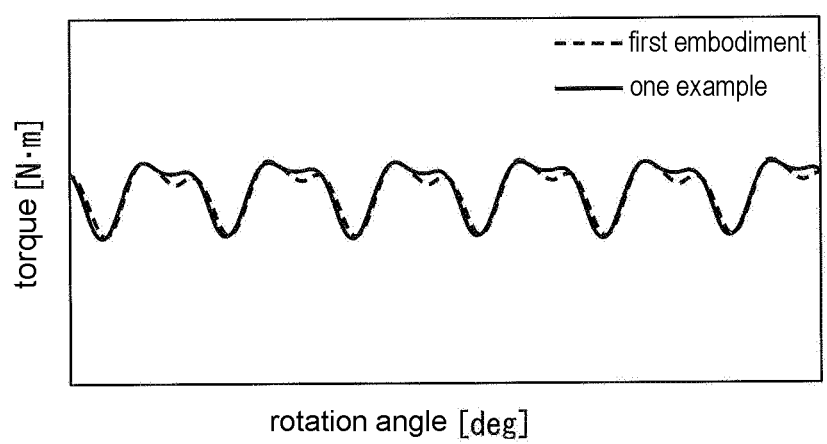
FIG. 34B is a graph showing an example of the shape of another salient pole and a change of torque.

Besides, as shown in FIG. 34A, even when the grooves 391 are formed at the end portions 335t of salient poles 335 so that the groove width in the circumferential direction gradually narrows toward the radial inner side, it can be confirmed that, as shown in FIG. 34B, the fluctuation in torque is larger than that in the first embodiment when two grooves 391 are formed side by side in the circumferential direction.

Figure 35A:
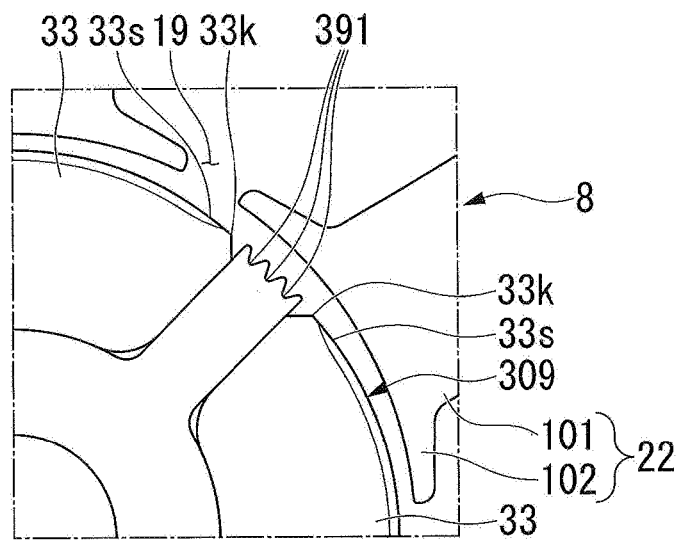
FIG. 35A is a partial enlarged view of the rotor, showing an example of the shape of another salient pole.
Figure 35B:
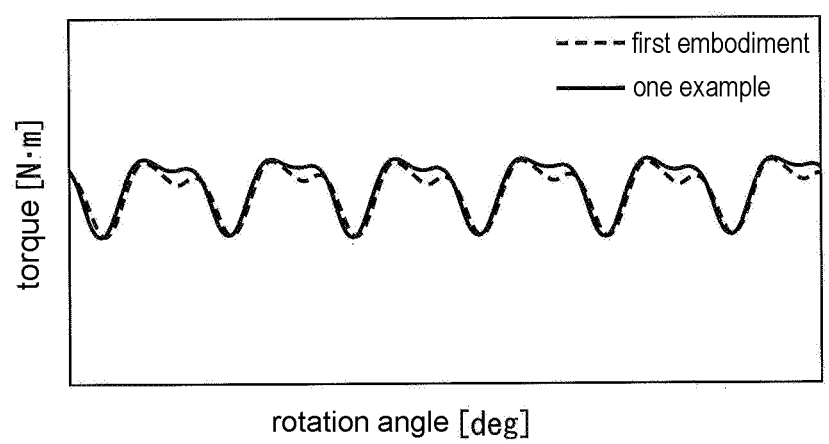
FIG. 35B is a graph showing an example of the shape of another salient pole and a change of torque.

In addition, when three grooves 391 are formed at the end portions 335t of the salient poles 335 as shown in FIG. 35A, it can be confirmed that, as shown in FIG. 35B, the torque fluctuation is larger than that in the first embodiment.

Moreover, the present invention is not limited to the above-described first to third embodiments and the variation examples, and includes various modifications made to the above-described embodiments without departing from the spirit of the present invention.

For example, in the above-described first to third embodiments and the variation examples, the wiper motor 1 is described as an example of the motor. However, besides the wiper motor 1, the motor according to the present invention can also be used for a drive source for electrical components (for example, a power window, a sunroof, an electric chassis and the like) mounted on a vehicle, and for various other purposes.

Fourth Embodiment (Wiper Motor)

Figure 36:
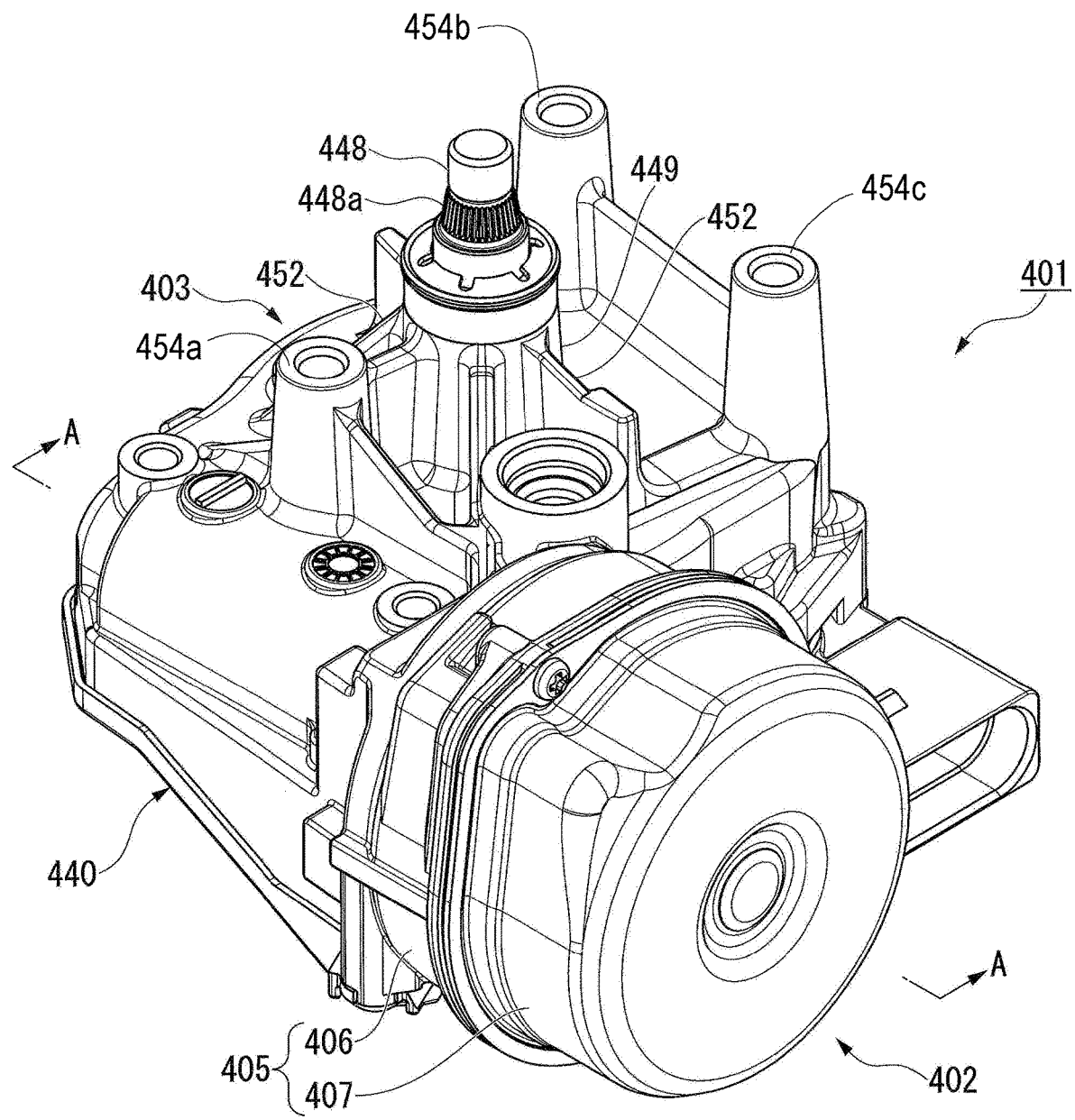
FIG. 36 is a perspective view of a wiper motor according to a fourth embodiment of the present invention.
Figure 37:
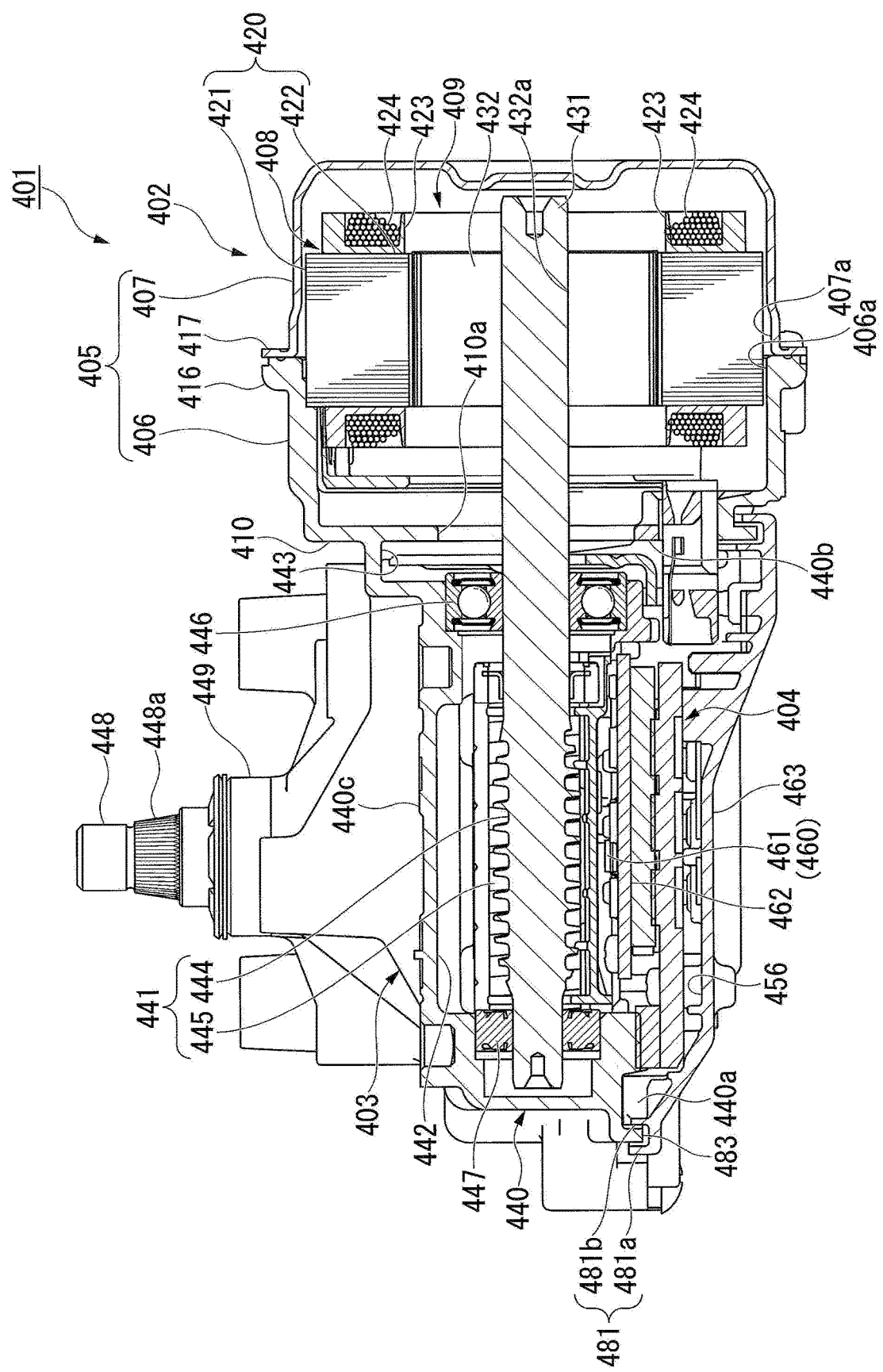
FIG. 37 is a cross-sectional view of the wiper motor according to the fourth embodiment of the present invention, the cross-sectional view taken along the line A-A of FIG. 1.

FIG. 36 is a perspective view of a wiper motor 401. FIG. 37 is a cross-sectional view taken along the line A-A of FIG. 36.

As shown in FIG. 36 and FIG. 37, a wiper motor (brushless wiper motor) 401 serves as, for example, a drive source for a wiper mounted on a vehicle. The wiper motor 401 includes a motor unit (motor) 402, a deceleration unit 403 for decelerating and outputting the rotation of the motor unit 402, and a controller unit 404 for performing drive control of the motor unit 402.

Moreover, in the following description, when simply referring to an axial direction, this indicates the rotary axis direction of a shaft 431 of the motor unit 402, when simply referring to circumferential direction, this indicates the circumferential direction of the shaft 431, and when simply referring to radial direction, this indicates the radial direction of the shaft 431.

(Motor Unit)

The motor unit 402 includes a motor case 405, a stator 408 being substantially cylindrical and accommodated in the motor case 405, and a rotor 409 disposed on the radial inner side of the stator 408 so as to be rotatable with respect to the stator 408. The motor unit 402 is a so-called brushless motor that does not require a brush when supplying electric power to the stator 408.

(Motor Case)

The motor case 405 is made of a material with excellent heat dissipation properties, such as an aluminum die cast. The motor case 405 consists of a first motor case 406 and a second motor case 407 that are configured to be dividable in the axial direction. The first motor case 406 and the second motor case 407 are each formed in a bottomed tubular shape.

The first motor case 406 is molded integrally with a gear case 440 in a manner that a bottom 410 is joined to the gear case 440 of the deceleration unit 403. A through hole 410a that allows the shaft 431 of the rotor 409 to be inserted therethrough is formed at substantially the center in the radial direction of the bottom 410.

In addition, an outer flange portion 416 is formed at an opening 406a of the first motor case 406 so as to protrude radially outward. An outer flange portion 417 protruding radially outward is formed at an opening 407a of the second motor case 407. The motor case 405 having an internal space is formed by abutting the outer flange portions 16 and 17 together. Besides, in the inner space of the motor case 405, the stator 408 is arranged in a manner of being fitted into the first motor case 406 and the second motor case 407.

(Stator)

Figure 38:
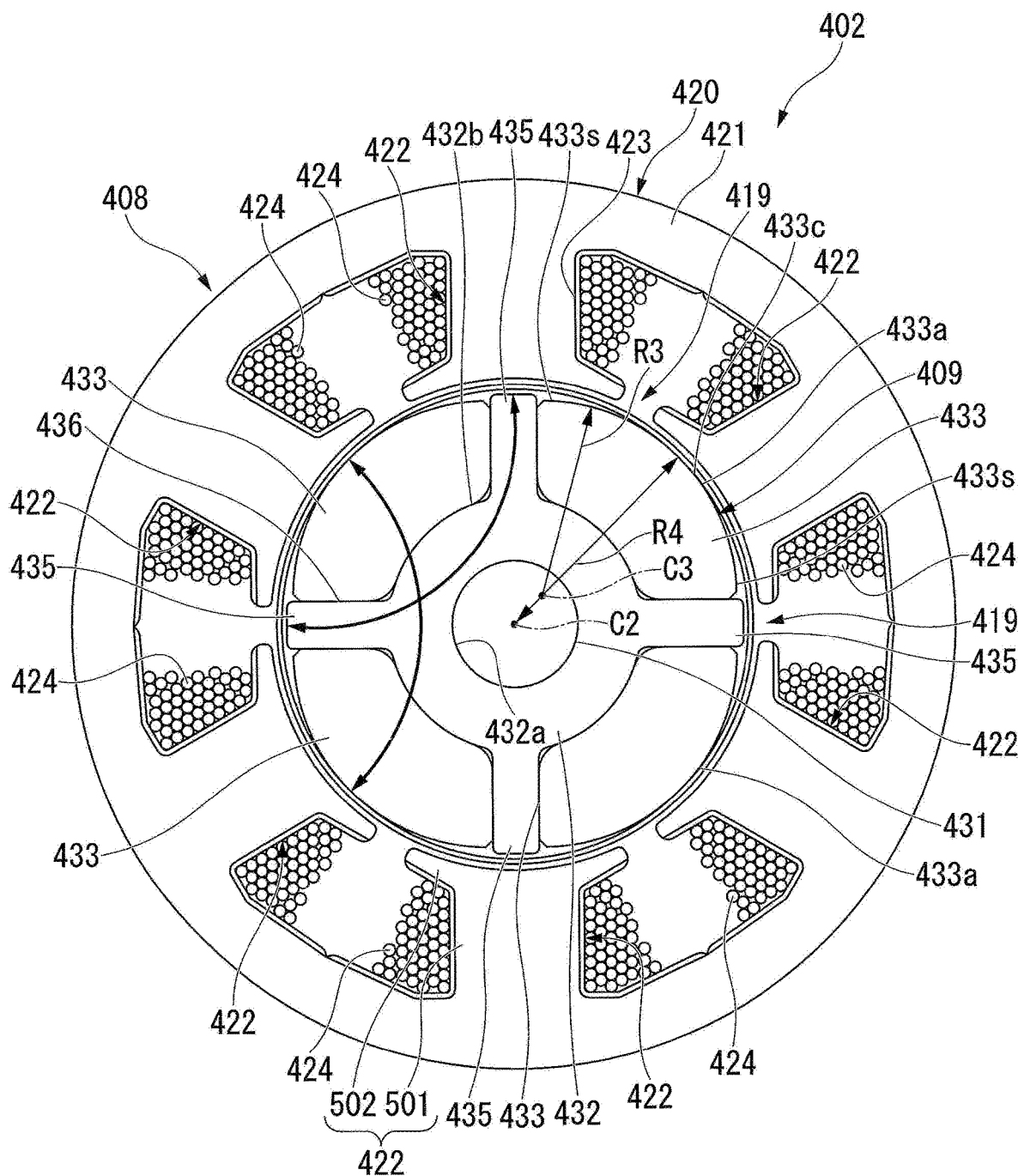
FIG. 38 is a plan view in which the stator and the rotor according to the fourth embodiment of the present invention are viewed from the axial direction.

FIG. 38 is a plan view of the stator 408 and the rotor 409 as viewed from the axial direction.

As shown in FIG. 37 and FIG. 38, the stator 408 has a stator core 420 in which a core portion 421 being tubular and having a substantially circular cross-sectional shape along the radial direction and a plurality (for example, six in the fourth embodiment) of teeth 422 protruding radially inward from the core portion 421 are integrally molded.

The stator core 420 is formed by laminating a plurality of metal plates in the axial direction. Moreover, the stator core 420 is not limited to being formed by laminating a plurality of metal plates in the axial direction, and may also be formed, for example, by press molding soft magnetic powder.

In a tooth 422, a tooth body 501 protruding along the radial direction from the inner peripheral surface of the core portion 421 and collar portions 502 extending along the circumferential direction from the radial inner side end of the tooth body 501. The collar portions 502 are formed so as to extend from the tooth body 501 toward both sides in the circumferential direction. Besides, slots 419 are formed between the collar portions 502 adjacent in the circumferential direction.

In addition, the inner peripheral surface of the core portion 421 and the teeth 422 are covered with an insulator 423 made of resin. Coils 424 are wound around the teeth 422 from above the insulator 423. Each coil 424 generates a magnetic field for rotating the rotor 409 by power supply from the controller unit 404.

(Rotor)

The rotor 409 is rotatably arranged on the radial inner side of the stator 408 through a minute gap. The rotor 409 includes the shaft 431 formed integrally with a worm shaft 444 (see FIG. 37) constituting the deceleration unit 403, a rotor core 432 that is externally fixed to the shaft 431 and has a substantially cylindrical shape taking the shaft 431 as a shaft center (rotary shaft) C2, and four magnets 433 arranged on the outer peripheral surface of the rotor core 432. Thus, in the motor unit 402, the ratio between the number of magnetic poles of the magnets 433 and the number of the slots 19 (teeth 422) is 4:6.

The rotor core 432 is formed by laminating a plurality of metal plates in the axial direction. Moreover, the rotor core 432 is not limited to being formed by laminating a plurality of metal plates in the axial direction, and may also be formed, for example, by press molding soft magnetic powder.

Besides, a through hole 432a penetrating in the axial direction is formed at substantially the center in the radial direction of the rotor core 432. The shaft 431 is press-fitted into the through hole 432a. Moreover, the shaft 431 may be inserted into the through hole 432a, and the rotor core 432 may be externally fixed to the shaft 431 using an adhesive or the like.

Furthermore, four salient poles 435 are arranged at equal intervals in the circumferential direction on an outer peripheral surface 432b of the rotor core 432. The salient poles 435 are formed so as to protrude radially outward and extend in the entire axial direction of the rotor core 432. Additionally, round chamfered portions 435a are formed on the radial outer side of the salient poles 435 and at the corners on both sides in the circumferential direction.

At the outer peripheral surface 432b of the rotor core 432 formed in this way, magnet storage portions 436 are respectively formed between two salient poles 435 adjacent in the circumferential direction. The magnets 433 are respectively disposed in the magnet storage portions 36 and are fixed to the rotor core 432 by, for example, an adhesive or the like.

Figure 39:
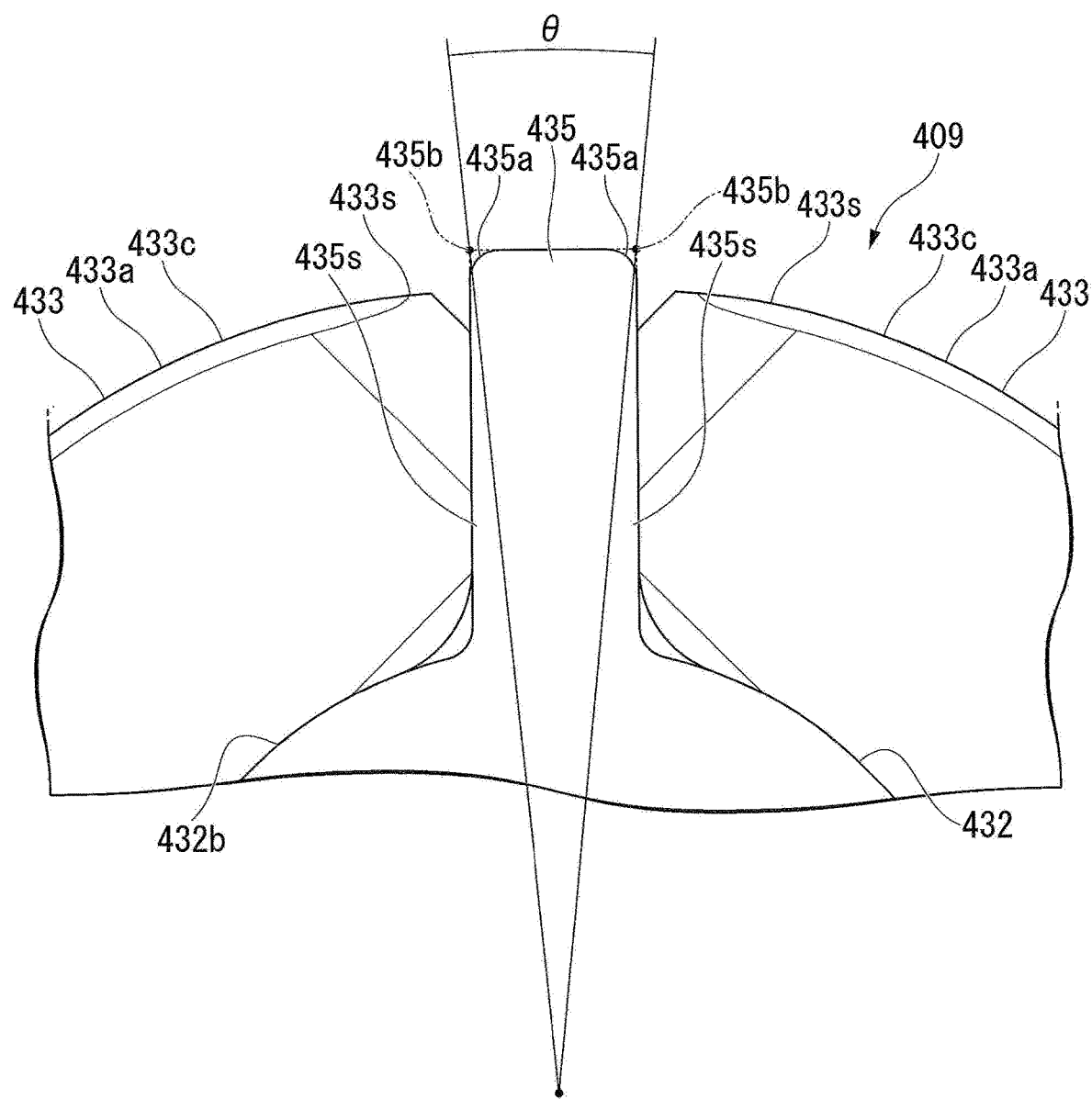
FIG. 39 is an enlarged view of the rotor according to the fourth embodiment of the present invention.

FIG. 39 is an enlarged view of the rotor 409 shown in FIG. 38.

As shown in FIG. 39, the magnets 433 are formed in a manner that the radial thickness at end portions 433s on both sides in the circumferential direction around the shaft center C2 of the shaft 431 is smaller than the radial thickness at circumferential intermediate portions 433c. Here, the magnets 433 are ferrite magnets.

Thus, the minute gap between the outer peripheral surface 433a of the magnets 433 on the radial outer side and the inner peripheral surface of the teeth 422 is the smallest in the circumferential central portion of the magnets 433, and gradually increases when getting away from the circumferential central portion in the circumferential direction.

In addition, as shown in FIG. 38, in the magnets 433, a center C3 of the outer peripheral surface 433a is offset radially outward with respect to the shaft center C2 of the shaft 431. Furthermore, in the magnets 433, a radius of curvature R3 of the outer peripheral surface 433a is set smaller than a radius (distance) R4 from the shaft center C2 of the shaft 431 at the circumferential intermediate portion 433c located at the outermost side in the radial direction on the outer peripheral surface 433a of the magnets 433.

Figure 40:
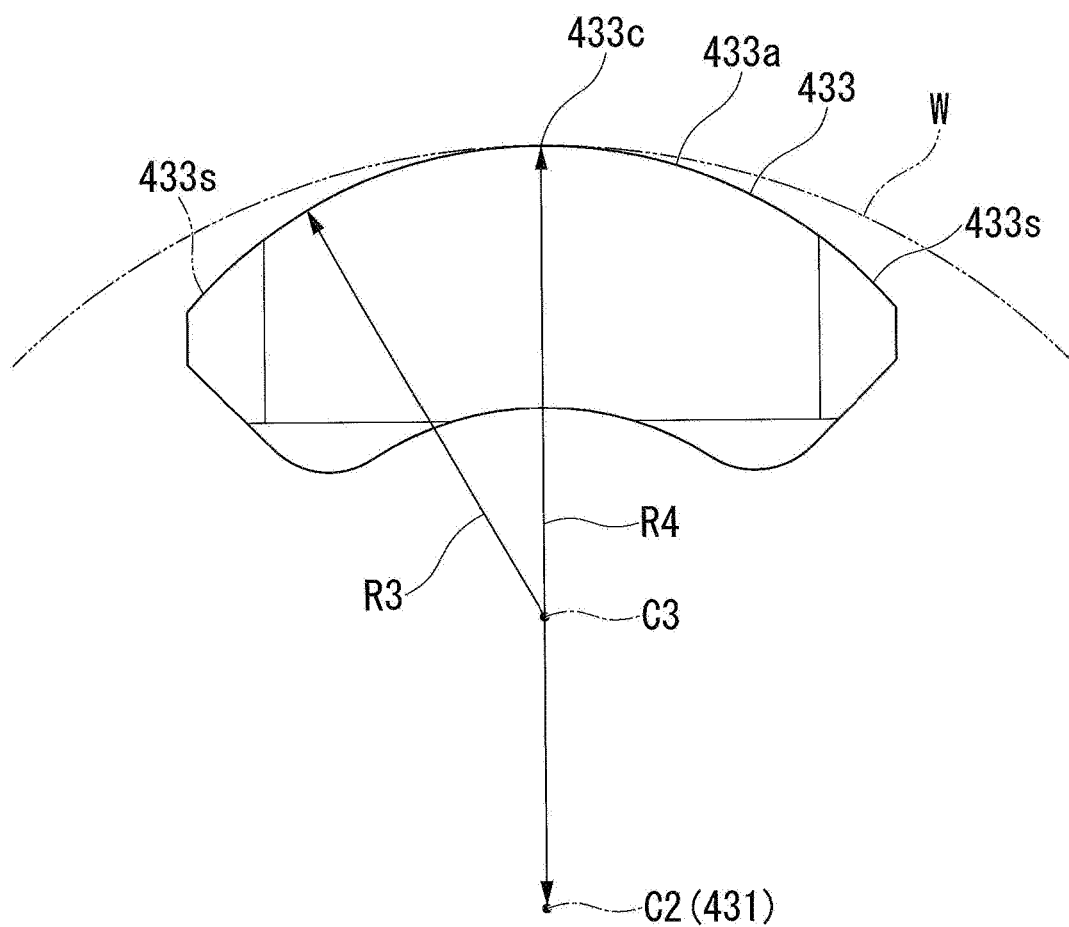
FIG. 40 is an enlarged view of the magnets according to the fourth embodiment of the present invention.

More specifically, as shown in FIG. 40, a circular arc surface W, which takes the shaft center C2 of the shaft 431 as the center and passes through the circumferential intermediate portion 433c located at the outermost side in the radial direction on the outer circumferential surface 433a of the magnets 433, takes the distance from the shaft center C2 of the shaft 431 at the circumferential intermediate portion 433c of the outer peripheral surface 433a as a radius R4. The radius of curvature R3 of the outer peripheral surface 433a of the magnets 433 is set to 0.8 time or less (R3≤0.8×R4) of the radius R4 of the circular arc surface W. Accordingly, as shown in FIG. 39, the end portions 433s of the magnets 433 on both sides in the circumferential direction are disposed further radially inward than the salient poles 435.

The magnets 433 are magnetized so that the magnetic field is oriented in parallel along the thickness direction. Besides, the magnets 433 are positioned so that the magnetic poles are alternately arranged in the circumferential direction. Further, the salient poles 435 of the rotor core 432 is located between the magnets 433 adjacent in the circumferential direction, that is, at the boundary (pole boundary) of the magnetic poles.

The width dimension in the circumferential direction of the salient poles 435 at the radial outer end portions 35t is set, in the form of an electrical angle θ, to 20° or more and 40° or less.

Moreover, the width dimension in the circumferential direction of the salient poles 435 at the radial outer end portions 435t refers to the width dimension between both corners 435b in the circumferential direction when the round chamfered portions 435a are not formed on the salient poles 35. In the following description, the width dimension in the circumferential direction of the salient poles 435 at the radial outer end portions is simply referred to as the width dimension of the salient poles 435 in the radial direction.

Furthermore, it is preferable that facing surfaces 435s of the salient poles 435, which faces the end portions 433s of the magnets 433 in the circumferential direction, are formed parallel to each other on both sides of the salient poles 435 in the circumferential direction.

In addition, by forming the magnets 433 as described above, the maximum outer diameter of the magnets 433 and the maximum outer diameter of the salient poles 435 are the same dimension, and the salient poles 435 protrude radially outward from the end portions 433s of the magnets 433 in the circumferential direction.

(Deceleration Unit)

Returning to FIG. 36 and FIG. 37, the deceleration unit 403 includes the gear case 440 to which the motor case 405 is attached, and a worm deceleration mechanism 441 accommodated in the gear case 440. The gear case 440 is made of a material with excellent heat dissipation properties, such as an aluminum die cast, and is formed in a box shape having an opening 440a on one surface. The gear case 440 has a gear housing portion 442 for housing the worm deceleration mechanism 441 therein. In addition, on a side wall 440b of the gear case 440, an opening 443 for communicating the through hole 410a of the first motor case 406 and the gear housing portion 442 is formed at a position where the first motor case 406 is integrally molded.

In addition, three fixing brackets 454a, 454b, 454c are integrally molded on the side wall 440b of the gear case 440. These fixing brackets 454a, 454b, 454c are configured to fix the wiper motor 401 to a vehicle body (not shown) or the like. These three fixing brackets 454a, 454b, 454c are arranged at substantially equal intervals in the circumferential direction so as to avoid the motor unit 402. An anti-vibration rubber 455 is attached to each of the fixing brackets 454a, 454b, 454c, and is configured to prevent vibration during driving of the wiper motor 401 from being transmitted to the vehicle body (not shown).

Besides, a bearing boss 449 being substantially cylindrical is mounted on a bottom wall 440c of the gear case 440 so as to project therefrom. The bearing boss 449 rotatably supports an output shaft 448 of the worm deceleration mechanism 441, and a sliding bearing (not shown) is arranged on the inner peripheral surface of the bearing boss 449. Further, an O-ring (not shown) is mounted on the inner peripheral edge at the front end of the bearing boss 449. Accordingly, dust or water is prevented from entering the inside from the outside via the bearing boss 449. In addition, a plurality of ribs 452 is disposed on the outer peripheral surface of the bearing boss 449, and thereby the rigidity of the bearing boss 449 is secured.

The worm deceleration mechanism 441 accommodated in the gear accommodating portion 442 is composed of the worm shaft 444 and a worm wheel 445 engaged with the worm shaft 444. The worm shaft 444 is arranged coaxially with the shaft 431 of the motor unit 402. Besides, two end portions of the worm shaft 444 are rotatably supported by bearings 446 and 447 arranged at the gear case 440. The end portion of the worm shaft 444 at the motor unit 402 side protrudes to the opening 443 of the gear case 440 through the bearing 446. The protruding end portion of the worm shaft 444 and the end portion of the shaft 431 of the motor unit 402 are joined with each other. Accordingly, the worm shaft 444 is integrated with the shaft 431. Moreover, the worm shaft 444 and the shaft 431 may be integrally formed by molding a worm shaft portion and a rotary shaft portion from one base material.

In the worm wheel 445 engaged with the worm shaft 444, the output shaft 448 is disposed at the radial center of the worm wheel 445. The output shaft 448 is arranged coaxially with the rotary shaft direction of the worm wheel 445. Besides, the output shaft 448 protrudes to the outside of the gear case 440 through the bearing boss 449 of the gear case 440. A spline 448a that can be connected to an electrical component (not shown) is formed at the protruding front end of the output shaft 448.

In addition, at the radial center of the warm wheel 445, a sensor magnet (not shown) is disposed on the side opposite to the side where the output shaft 448 protrudes. The sensor magnet constitutes one of a rotation position detector 460 for detecting the rotation position of the worm wheel 445. A magnetic detection element 461 that constitutes the other of the rotation position detector 460 is disposed in the controller unit 404 disposed facing the worm wheel 445 on the sensor magnet side (the opening 440a side of the gear case 440) of the worm wheel 445.

(Controller Unit)

The controller unit 404 for controlling the drive of the motor unit 402 includes a controller board (drive circuit unit) 462 on which the magnetic detection element 461 is mounted, and a cover 463 arranged to close the opening 440a of the gear case 440. Besides, the controller board 462 is disposed facing the sensor magnet side (the opening 440a side of the gear case 440) of the worm wheel 445.

The controller board 462 is obtained by forming a plurality of conductive patterns (not shown) on a so-called epoxy board. Terminal portions of the coils 424 drawn from the stator core 420 of the motor unit 402 is connected to the controller board 462. Besides, terminals (not shown) of a connector arranged on the cover 463 are electrically connected to the controller board 462. Besides, a power module (not shown) composed of, in addition to the magnetic detection element 461, switching elements such as an FET (Field Effect Transistor) for controlling the current supplied to the coils 424 is mounted on the controller board 462. Furthermore, a capacitor (not shown) for smoothing the voltage applied to the controller board 462 is mounted on the controller board 462.

The cover 463 for covering the controller board 462 configured as above is formed of resin. Additionally, the cover 463 is formed protruding slightly outward. The inner surface side of the cover 463 is set as a controller housing portion 56 for housing the controller board 462 and the like.

In addition, the connector (not shown) is integrally molded on the outer periphery of the cover 463. The connector is formed to be capable of being fitted with a connector extending from an external power source (not shown). The controller board 462 is electrically connected to a terminal of the connector (not shown). Accordingly, the power from the external power source is supplied to the controller board 462.

Here, the controller board 462 performs advance angle energization and wide angle energization with an electrical angle θ of 121° to 180° on the coils 424. In addition, the controller board 462 applies a drive current having fifth-order harmonic superimposed thereon to the coils 424.

Besides, a fitting portion 481 fitted with the end portion of the side wall 440b of the gear case 440 is formed in a protruding manner at the opening edge of the cover 463. The fitting portion 481 is composed of two walls 481a and 481b along the opening edge of the cover 463. The end portion of the side wall 440b of the gear case 440 is inserted (fitted) between the two walls 481a and 481b. As a result, a labyrinth portion 483 is formed between the gear case 440 and the cover 463. Dust or water is prevented by the labyrinth 483 from entering from the space between the gear case 440 and the cover 463. Moreover, the gear case 440 and the cover 463 are fixed by fastening a bolt (not shown).

(Operation of the Wiper Motor)

Next, the operation of the wiper motor 401 is described.

In the wiper motor 401, the power supplied to the controller board 462 via the connector (not shown) is selectively supplied to each coil 424 of the motor unit 402 via a power module (not shown).

Then, a predetermined interlinkage magnetic flux is formed in the stator 408 (teeth 422), and a magnetic attractive force or repulsive force is generated between the interlinkage magnetic flux and the effective magnetic flux formed by the magnets 433 of the rotor 409, which causes the rotor 4099 to rotate continuously.

When the rotor 409 is rotated, the worm shaft 444 integrated with the shaft 431 is rotated, and the worm wheel 445 engaged with the worm shaft 444 is further rotated. Then, the output shaft 448 connected to the worm wheel 445 rotates to drive a desired electrical component.

In addition, the rotation position detection result of the worm wheel 445 detected by the magnetic detection element 461 mounted on the controller board 462 is output as a signal to an external device (not shown). The external device (not shown) controls the switching timing of the switching elements or the like of the power module (not shown) and the drive of the motor unit 402 based on the rotation position detection signal of the worm wheel 445. Moreover, the drive signal output of the power module and the drive control of the motor unit 402 may also be performed by the controller unit 404.

(Actions and Effects of the Rotor)

Next, actions and effects of the rotor 409 are described with reference to FIGS. 41 to 52.

The motor unit 402 is a so-called SPM (Surface Permanent Magnet) motor in which the magnets 433 are arranged on the outer peripheral surface 432b of the rotor core 432. Therefore, the inductance value in the d-axis direction can be reduced. Here, in the rotor 409, in order to further reduce the inductance value in the d-axis direction, it is necessary to increase the radial dimension of the magnets 433. In the fourth embodiment, the magnets 433 are made of ferrite magnets. Accordingly, even if the radial dimension of the magnets 433 is increased and the amount of magnets used is increased, the increase in cost can be significantly suppressed as compared with the case of rare earth magnet.

Here, the four salient poles 435 disposed on the outer peripheral surface 432b of the rotor core 432 have a width dimension in the circumferential direction set, in the form of an electrical angle θ, to 20° or more and 40° or less. Thus, the inductance value in the q-axis direction can be reduced by setting the width dimension of the salient poles 35 in the circumferential direction to 40° or less in the form of an electrical angle θ. Accordingly, the demagnetizing field can be suppressed and a high reluctance torque can be obtained. More specific description is given below.

Figure 41:
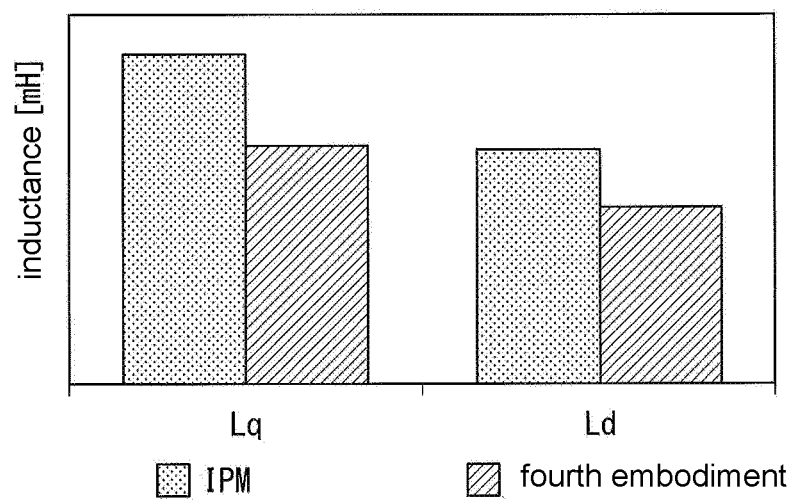
FIG. 41 is a graph showing the inductance of the q-axis and d-axis of the rotor according to the fourth embodiment of the present invention.

FIG. 41 is a graph showing the inductances Lq and Ld [mH] of the q-axis and the d-axis of the rotor 409. FIG. 41 compares the rotor 409 of the fourth embodiment with a rotor having a conventional structure. Moreover, the conventional structure herein is a structure of a rotor for a so-called IPM (Interior Permanent Magnet) motor in which permanent magnets are arranged in a plurality of slits formed on the rotor core.

As shown in FIG. 41, it can be confirmed that the rotor 409 of the fourth embodiment has a smaller inductance value on both the q-axis and the d-axis than the conventional structure.

Figure 42:
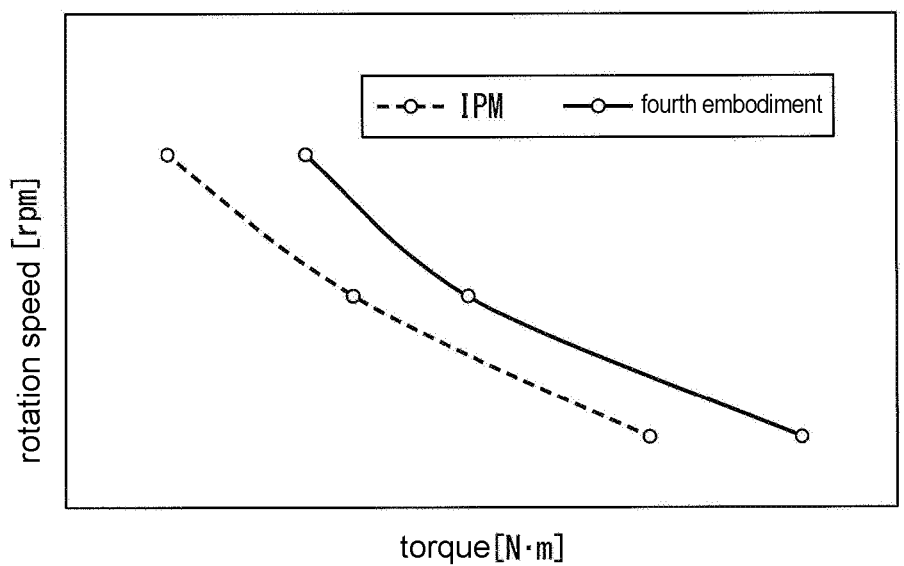
FIG. 42 is a graph showing the relationship between the torque and the rotation speed when the advance angle energization and the wide angle energization are performed on the rotor according to the fourth embodiment of the present invention.

FIG. 42 is a graph showing a change in the rotation speed of the rotor 409 with the vertical axis set as the rotation speed [rpm] of the rotor 409 and the horizontal axis set as the torque [N·m] of the rotor 409. More specifically, FIG. 42 is a graph showing the relationship between the torque [N·m] and the rotation speed [rpm] when the rotor 409 is subjected to advance energization and wide angle energization. FIG. 42 compares the rotor 409 of the fourth embodiment with a conventional rotor having the IPM structure.

As shown in FIG. 42, it can be confirmed that the rotor 409 of the fourth embodiment generates higher torque and higher rotation speed than the conventional structure.

Figure 43:
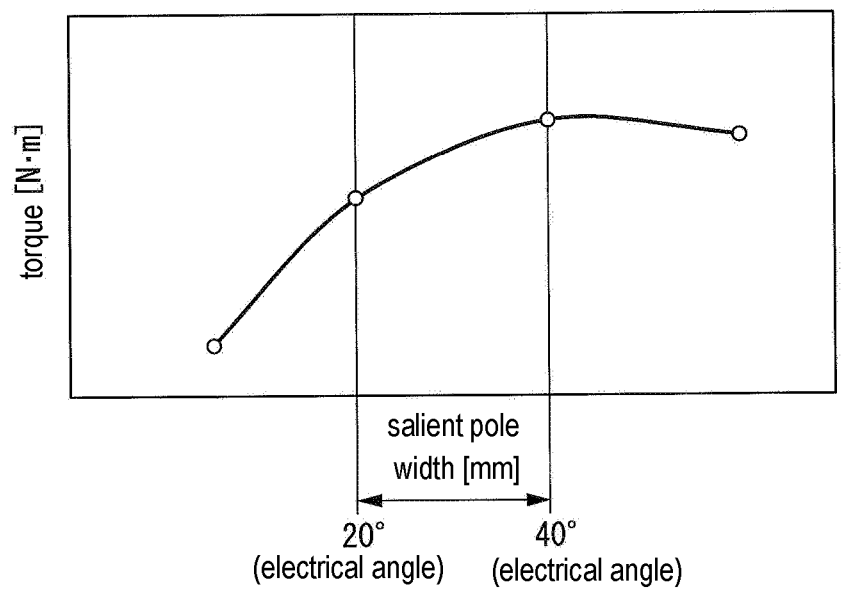
FIG. 43 is a graph showing torque generated in the rotor when the width dimensions of the salient poles according to the fourth embodiment of the present invention are varied.

FIG. 43 is a graph showing a change in the torque of the rotor 409 with the vertical axis set as the torque [N·m] of the rotor 409 and the horizontal axis set as the salient pole width [mm] of the salient poles 435 arranged in the rotor core 432. More specifically, FIG. 43 is a graph showing the torque generated in the rotor 409 of the fourth embodiment when the width dimensions (electrical angle θ) of the salient poles 435 in the circumferential direction are varied.

Figure 44:
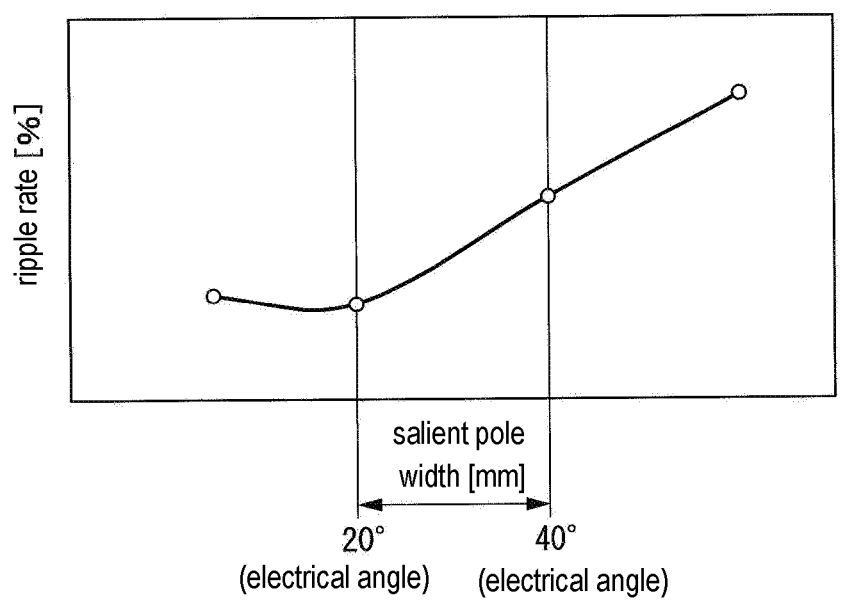
FIG. 44 is a graph showing the ripple rate generated in the rotor when the width dimensions of the salient poles according to the fourth embodiment of the present invention are varied.

FIG. 44 is a graph showing a change in the ripple rate of the rotor 409 with the vertical axis set as the ripple rate [%] of the rotor 409 and the horizontal axis set as the salient pole width [mm] of the salient poles 435 in the rotor core 432. More specifically, FIG. 44 is a graph showing a ripple rate generated in the rotor 409 of the fourth embodiment when the width dimensions of the salient poles 435 are varied.

Figure 45:
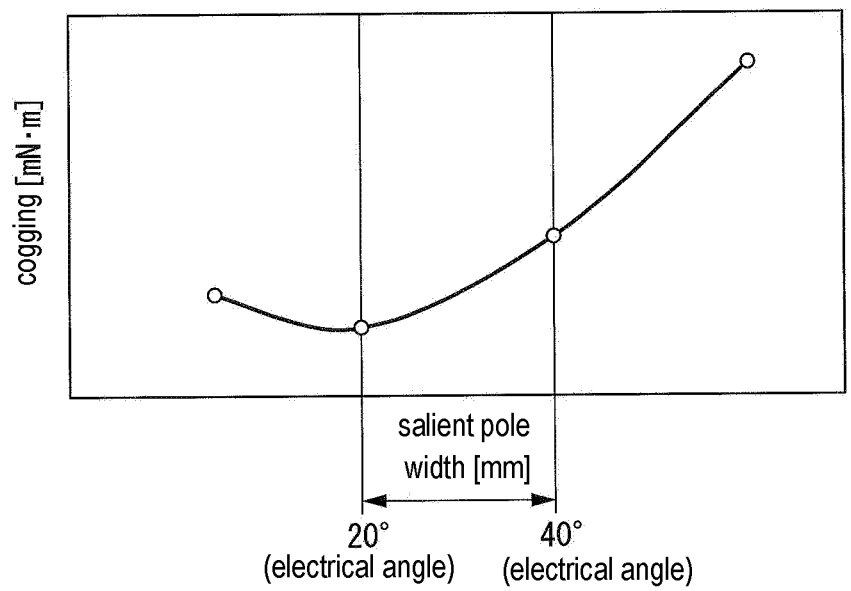
FIG. 45 is a graph showing the cogging generated in the rotor when the width dimensions of the salient poles according to the fourth embodiment of the present invention are varied.

FIG. 45 is a graph showing a change in cogging of the rotor 409 with the vertical axis set as the cogging [mN·m] of the rotor 409 and the horizontal axis set as the salient pole width [mm] of the salient poles 435 in the rotor core 432. More specifically, FIG. 45 is a graph showing cogging generated in the rotor 409 of the fourth embodiment when the width dimensions of the salient poles 435 are varied.

As shown in FIGS. 43 to 45, in the rotor 409 of the fourth embodiment, it can be confirmed that a high reluctance torque is obtained when the width dimension of the salient poles 435 in the circumferential direction is 3 mm (electrical angle θ=20°) to 5 mm (electrical angle θ=40°). In addition, it can be confirmed that the ripple rate and the cogging can be suppressed in the above case.

In addition, by making the salient poles 435 protrude radially outward from the end portions 433s of the magnets 433 in the circumferential direction, the magnetic fluxes are concentrated on the salient poles 435. In this way, the demagnetizing field is not prone to act on the end portions 433s of the magnets 433.

Figure 46:
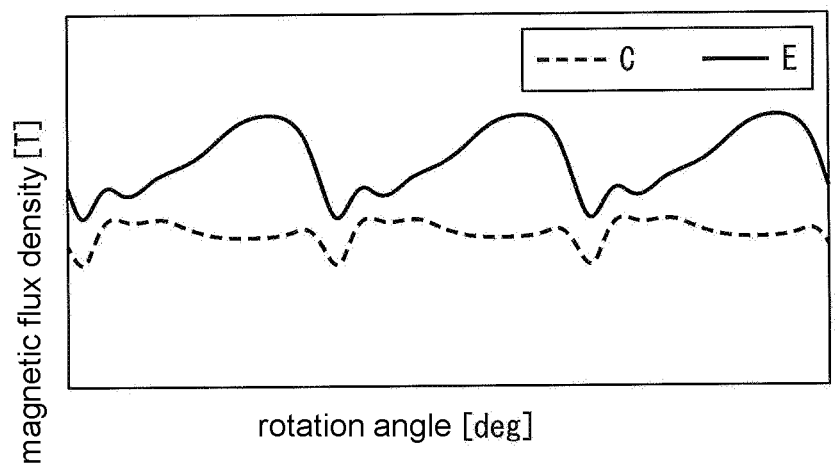
FIG. 46 is a graph showing the magnetic flux density at circumferential end portions in the magnets of the rotor according to the fourth embodiment of the present invention.

FIG. 46 is a graph showing a change in the magnetic flux density at the end portions 433s of the magnets 433 in the circumferential direction with the vertical axis set as the magnetic flux density [T] at the circumferential end portions 433s of the magnets 433 in the rotor 409, and the horizontal axis set as the rotation angle [deg] of the rotor 409. More specifically, FIG. 46 is a graph showing the magnetic flux density [T] at the circumferential end portions 433s of the magnets 433 in the rotor 409. FIG. 46 compares the case in which the salient poles 435 protrude radially outward from the circumferential end portions 433s of the magnets 433 (indicated by reference numeral E in FIG. 46) and the case in which the salient poles 435 do not protrude radially outward from the circumferential end portions 433s of the magnets 433 (indicated by reference numeral C in FIG. 46).

As shown in FIG. 46, it can be confirmed that compared with the case in which the salient poles 435 do not protrude radially outward from the circumferential end portions 433s of the magnets 433, when the salient poles 435 protrude radially outward from the circumferential end portions 433s of the magnets 433, the magnetic flux density is high and demagnetization is not prone to occur.

Figure 47:
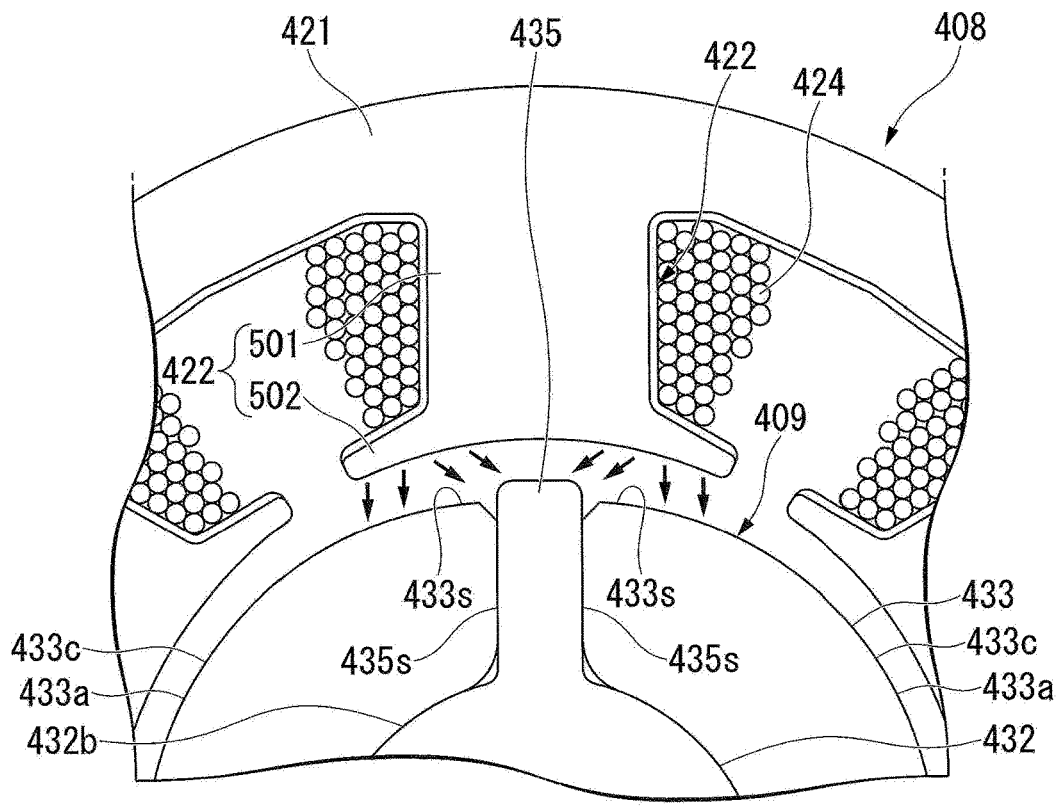
FIG. 47 is a diagram showing the direction of the magnetic flux around the salient poles when the salient poles according to the fourth embodiment of the present invention protrude radially outward from circumferential end portions of the magnets.
Figure 48:
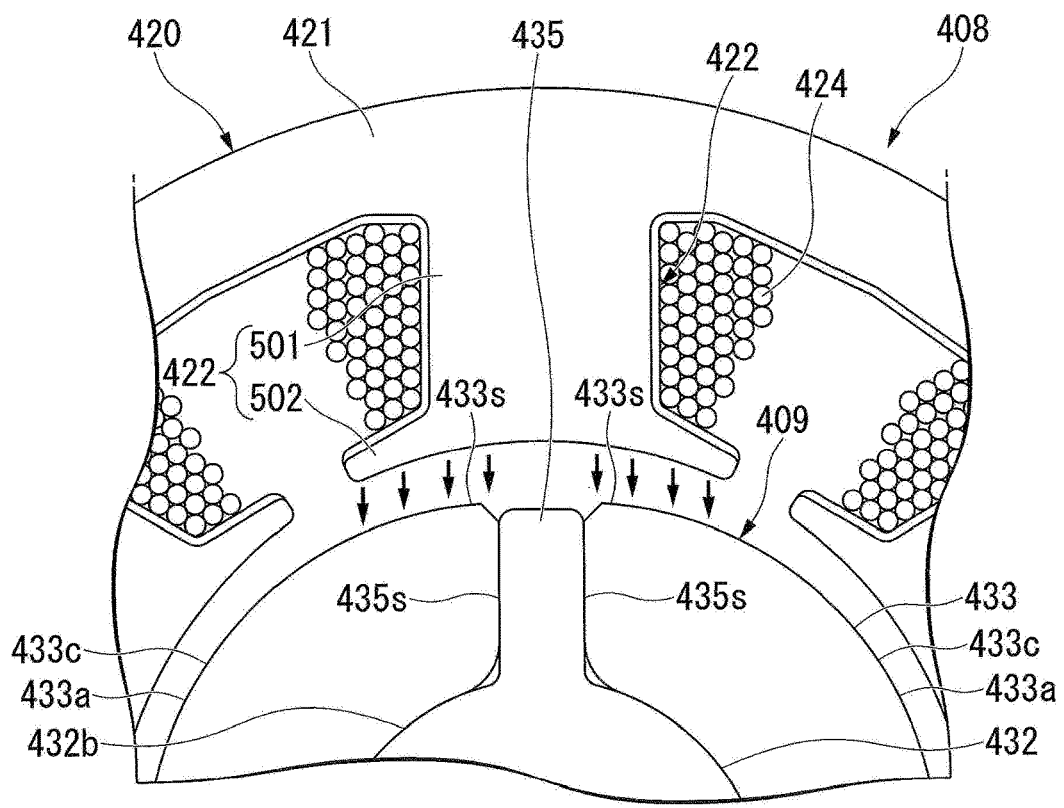
FIG. 48 is a diagram showing the direction of the magnetic flux around the salient poles when the salient poles according to the fourth embodiment of the present invention do not protrude radially outward from circumferential end portions of the magnets.

FIG. 47 and FIG. 48 are diagrams showing the directions of the magnetic fluxes around the salient poles 435. The case in which the salient poles 435 protrude radially outward from the circumferential end portions 433s of the magnetics 33 as shown in FIG. 47 is compared with the case in which the salient poles 435 do not protrude radially outward from the circumferential end portions 433s of the magnetics 33 as shown in FIG. 48.

Compared with the case in which the salient poles 435 do not protrude radially outward from the circumferential end portions 433s of the magnets 433 as shown in FIG. 48, it can be confirmed that concentration of the magnetic flux on the end portions 433s of the magnets 433 is suppressed and the magnetic flux is concentrated on the salient poles 435 when the salient poles 435 protrude radially outward from the circumferential end portions 433s of the magnets 433 as shown in FIG. 47.

In addition, the facing surfaces 435s of the salient poles 435 that faces the circumferential end portions 433s of the magnets 33, are formed parallel to each other on both sides in the circumferential direction. Here, if the salient pole 435 has a trapezoid shape in which a base portion of the salient pole 435 on the radial inner side has a large width dimension and a front end portion on the radial outer side has a small width dimension, the end portions 433s on both sides in the circumferential direction of the magnets 433 disposed between the salient poles 435 adjacent in the circumferential direction become thinner. As a result, demagnetization of the magnets 433 is prone to occur. Additionally, if the salient pole 435 has a trapezoid shape in which the base portion of the salient pole 435 has a small width dimension and the front end portion has a large width dimension, the magnetic flux density is prone to saturate at the salient poles 435. In contrast, by forming the facing surfaces 435s of the salient poles 435 parallel to each other on both sides of the salient poles 435 in the circumferential direction, demagnetization is not prone to occur and the saturation of magnetic flux density can be suppressed.

Besides, the magnets 433 are magnetized in parallel orientation. Thereby, cogging can be suppressed and high magnetic flux density can be obtained.

Figure 49:
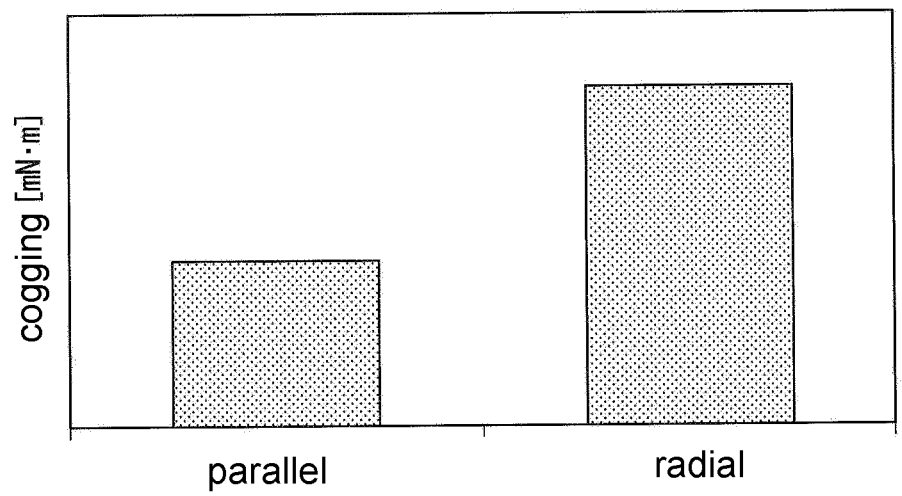
FIG. 49 is a graph showing cogging generated in the rotor when the orientation of the magnets according to the fourth embodiment of the present invention is set to parallel orientation and radial orientation, respectively.
Figure 50:
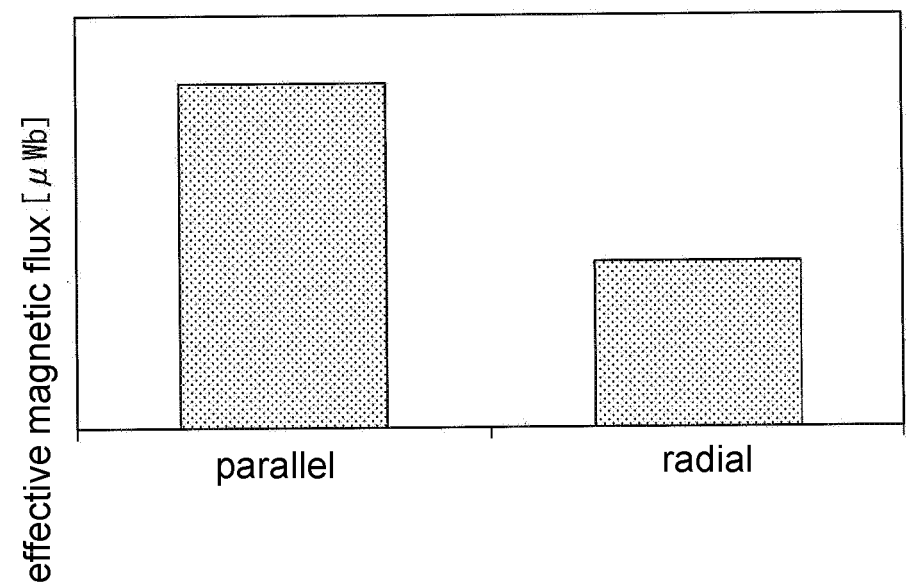
FIG. 50 is a graph showing effective magnetic flux generated in the rotor when the orientation of the magnets according to the fourth embodiment of the present invention is set to parallel orientation and radial orientation, respectively.

FIG. 49 is a graph showing the cogging [mN·m] generated in the rotor 409 of the fourth embodiment when the magnetization orientation of the magnets 433 is set to parallel orientation and radial orientation, respectively. FIG. 50 is a graph showing the effective magnetic flux [μWb] generated in the rotor 409 of the fourth embodiment when the magnetization orientation of the magnets 433 is set to parallel orientation and radial orientation, respectively.

As shown in FIG. 49 and FIG. 50, it can be confirmed that the cogging is suppressed and the effective magnetic flux is increased by setting the magnetization orientation of the magnets 433 to parallel orientation.

Figure 51:
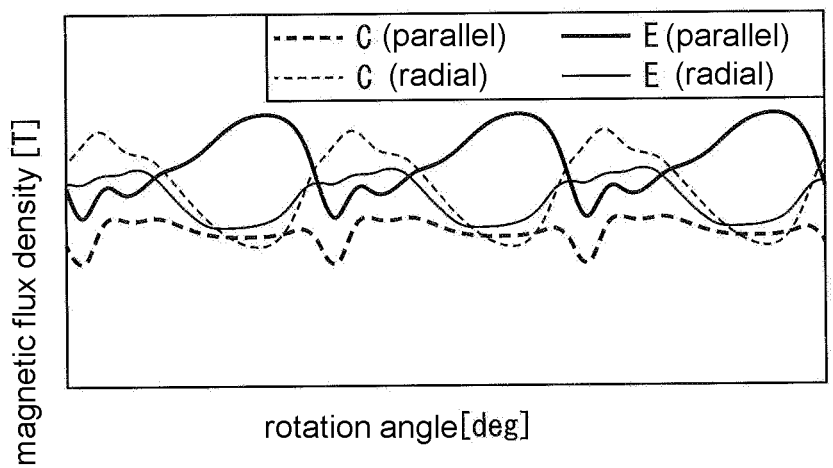
FIG. 51 is a graph showing the magnetic flux density at circumferential end portions in the magnets of the rotor according to the fourth embodiment of the present invention.

Furthermore, FIG. 51 is a graph showing a change in the magnetic flux density at the circumferential end portions 433s of the magnets 433 with the vertical axis set as the magnetic flux density [T] at the circumferential end portions 433s of the magnets 433 in the rotor 409 and the horizontal axis set as the rotation angle [deg] of the rotor 409. More specifically, FIG. 50 is a graph showing the magnetic flux density [T] at the circumferential end portions 433s of the magnets 433 in the rotor 409. FIG. 50 compares the cases in which the magnetization orientation of the magnets 433 is set to parallel orientation and radial orientation respectively when the salient poles 435 protrude radially outward from the circumferential end portions 433s of the magnets 433 (indicated by reference numeral E in FIG. 51) and when the salient poles 435 do not protrude radially outward from the circumferential end portions 433s of the magnets 433 (indicated by reference numeral C in FIG. 51).

Figure 52:
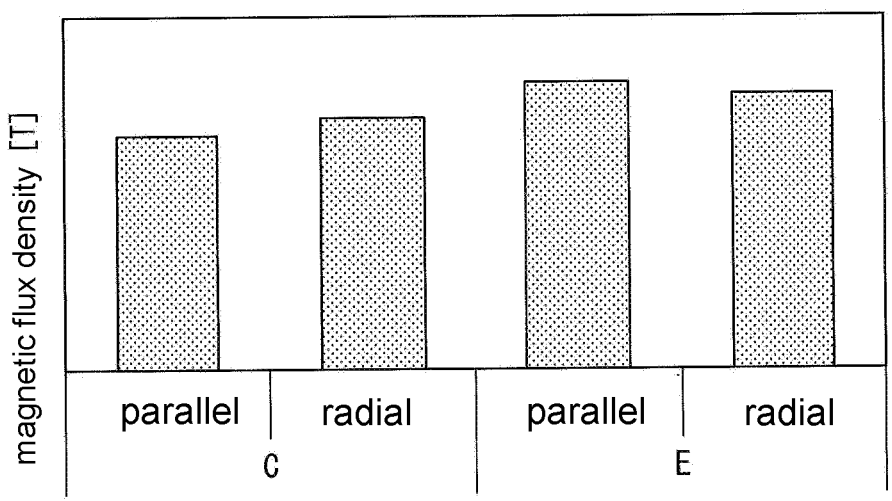
FIG. 52 is a graph showing the minimum value of magnetic flux density when the orientation of the magnets according to the fourth embodiment of the present invention is set to parallel orientation and radial orientation, respectively.

FIG. 52 compares the minimum value (MIN) of the magnetic flux density in the cases that the magnetization orientation of the magnets 433 is set to parallel orientation and radial orientation respectively when the salient poles 435 protrude radially outward from the circumferential end portions 433s of the magnets 433 (indicated by reference numeral E in FIG. 52) and when the salient poles 435 do not protrude radially outward from the circumferential end portions 433s of the magnets 433 (indicated by reference numeral C in FIG. 52).

As shown in FIG. 51 and FIG. 52, the demagnetizing field can be effectively suppressed by making the salient poles 435 protrude radially outward from the circumferential end portions 433s of the magnets 433 and setting the magnetizing orientation of the magnets 433 to parallel orientation.

In addition, the radius of curvature R3 of the outer peripheral surface 433a in the magnets 433 is set to 0.8 time or less of the radius R4 from the shaft center C2 of the shaft 431 at the circumferential intermediate portion 433c located at the outmost side in the radial direction in the outer peripheral surface 433a of the magnets 433. Accordingly, the end portions 433s of the magnets 433 on both sides in the circumferential direction are disposed further radially inward than the salient poles 435. Thus, magnetic fluxes are concentrated on the salient poles 435, and demagnetizing field is not prone to act on the end portions 433s of the magnets 433. Besides, higher-order harmonic components contained in the induced voltage when a current is supplied to the coils 424 can be suppressed, and torque ripple in the motor unit 402 can be suppressed.

Figure 53:
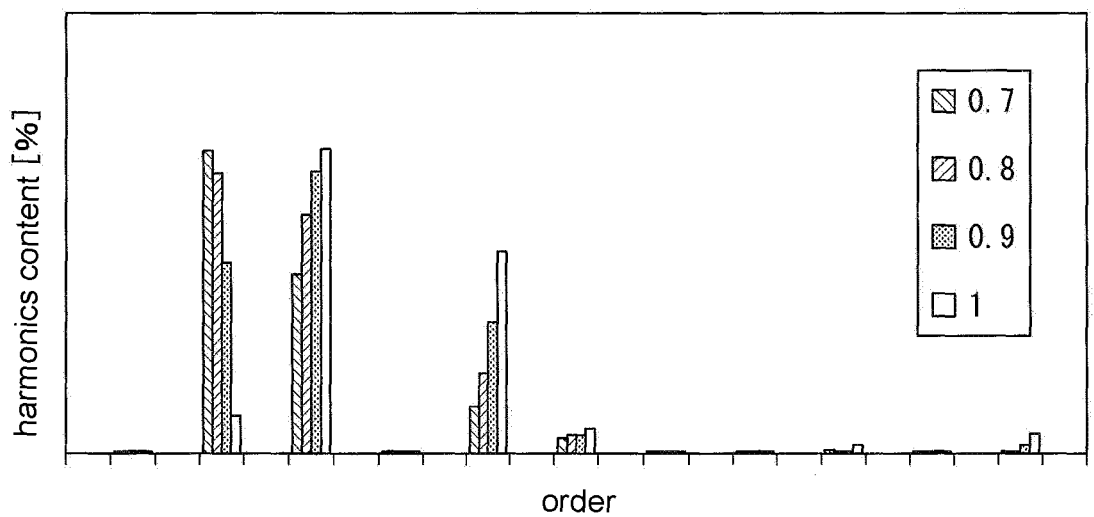
FIG. 53 is a graph showing the content of harmonics contained in the induced voltage when the radius of curvature of the outer peripheral surface of the magnets according to the fourth embodiment of the present invention is changed.

FIG. 53 is a graph showing the content of harmonics contained in the induced voltage when the radius of curvature R3 of the outer peripheral surface 433a of the magnets 433 is changed and the ratio to the radius R4 is varied.

As shown in FIG. 53, it can be confirmed that the eleventh-order harmonic components are reduced to less than 1% by setting the radius of curvature R3 of the outer peripheral surface 433a of the magnets 433 to 0.8 time or less of the radius R4 of the circumferential intermediate portion 433c.

Figure 54:
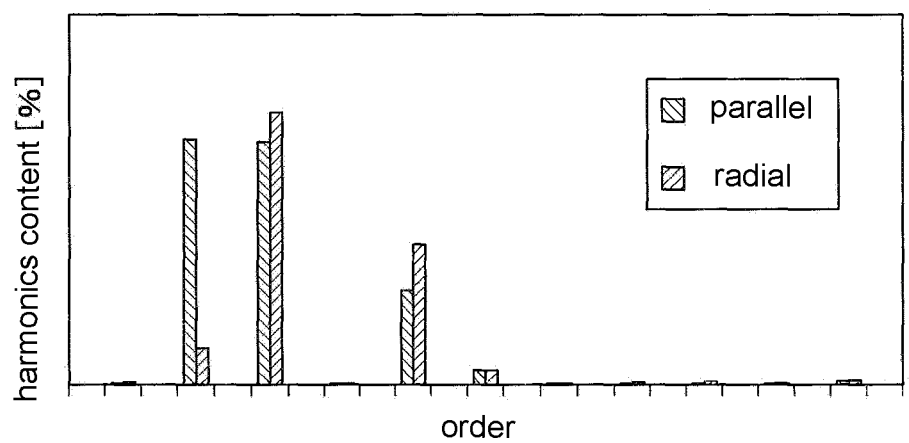
FIG. 54 is a graph showing the content of harmonics contained in the induced voltage when the orientation of the magnets according to the fourth embodiment of the present invention is set to parallel orientation and radial orientation, respectively.

Further, FIG. 54 is a graph showing the content of harmonic contained in the induced voltage when the orientation of the magnets 433 is set to parallel orientation and radial orientation, respectively.

As shown in FIG. 54, it can be confirmed that the eleventh-order harmonic components are reduced when the orientation of the magnets 433 is parallel.

In addition, the controller board 462 is configured to apply a drive current having the fifth-order harmonic superimposed thereon to the coils 424. Thereby, torque ripple in the motor unit 402 can be suppressed.

Figure 55:
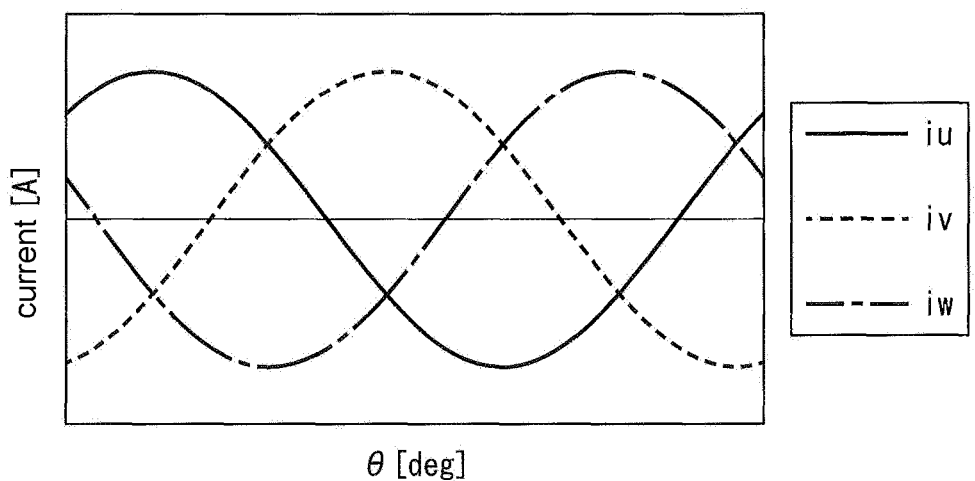
FIG. 55 is a diagram showing waveforms of a three-phase drive current having no fifth-order harmonic superimposed thereon in the fourth embodiment of the present invention.
Figure 56:
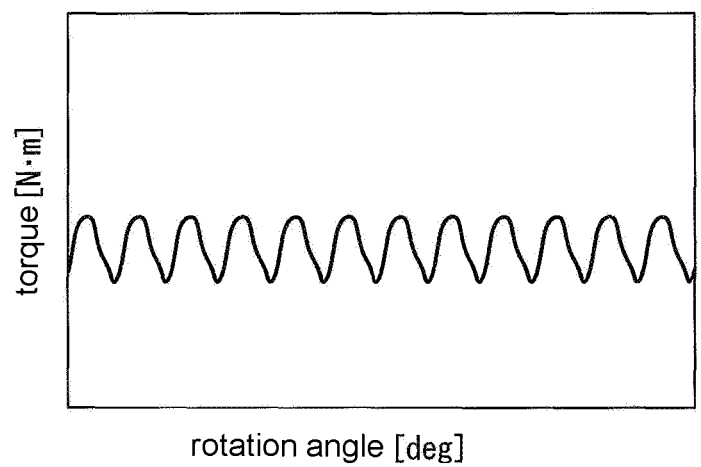
FIG. 56 is a diagram showing a torque waveform when the three-phase drive current having no fifth-order harmonic superimposed thereon is applied in the fourth embodiment of the present invention.
Figure 57:
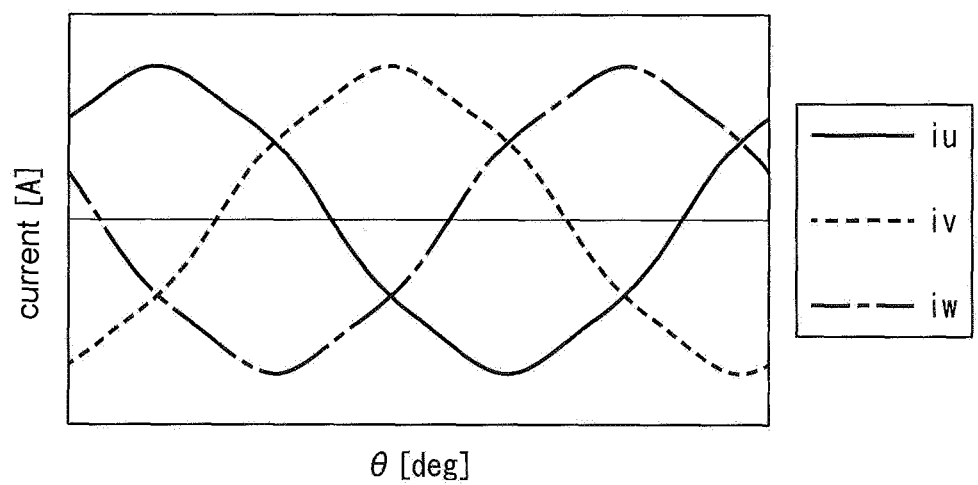
FIG. 57 is a diagram showing a waveform of the three-phase drive current having the fifth-order harmonic superimposed thereon in the fourth embodiment of the present invention.
Figure 58:
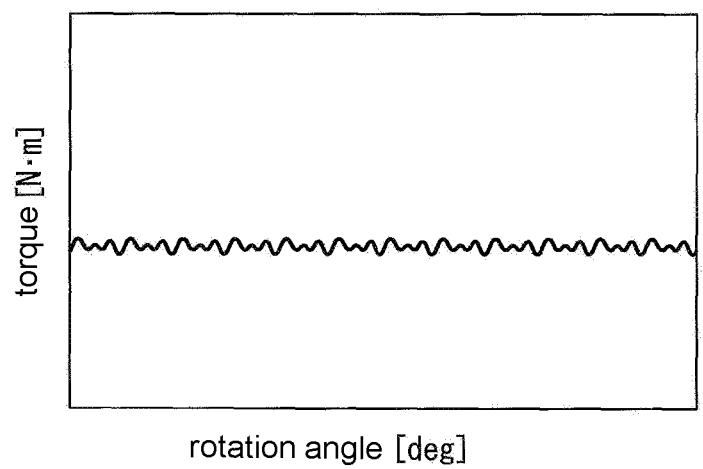
FIG. 58 is a diagram showing a torque waveform when the three-phase drive current having the fifth-order harmonic superimposed thereon is applied in the fourth embodiment of the present invention.
Figure 59:
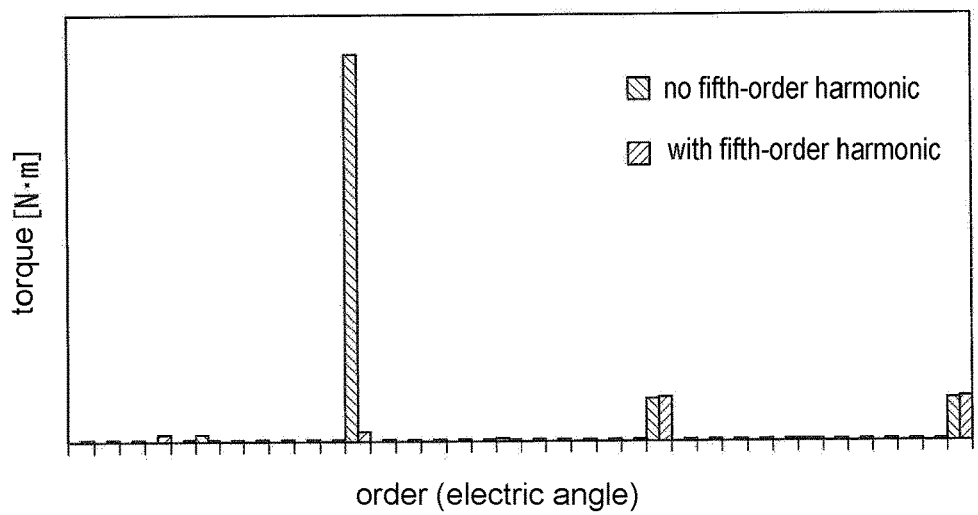
FIG. 59 is a graph comparing the generated torque in each order by performing an FFT analysis on the torque waveforms of FIG. 56 and FIG. 58 in the fourth embodiment of the present invention.

FIG. 55 is a diagram showing waveforms of a three-phase drive current having no fifth-order harmonic superimposed thereon with the vertical axis set as the drive current [A] and the horizontal axis set as the angle [θ]. FIG. 56 is a diagram showing a torque waveform when the three-phase drive current having no fifth-order harmonic superimposed thereon is applied with the vertical axis set as the torque [N·m] of the rotor 409, and the horizontal axis set as the rotation angle [deg] of the rotor 409. FIG. 57 is a diagram showing a three-phase drive current waveform in which the fifth-order harmonic is superimposed with the vertical axis set as the drive current [A] and the horizontal axis set as the angle [θ]. FIG. 58 is a diagram showing a torque waveform when the three-phase drive current having the fifth-order harmonic superimposed thereon is applied with the vertical axis set as the torque [N·m] of the rotor 409 and the horizontal axis set as the rotation angle [deg] of the mouth 409. FIG. 59 is a graph comparing the generated torque in each order by performing an FFT analysis on the torque waveforms of FIG. 56 and FIG. 58.

It can be confirmed that, when the three-phase drive current having no fifth-order harmonic superimposed thereon is applied as shown in FIG. 55, a torque ripple having periodic torque fluctuations is generated in the motor unit 402 as shown in FIG. 56. In contrast, when the three-phase drive current having the fifth-order harmonic superimposed thereon is applied as shown in FIG. 57, the torque ripple is significantly reduced in the motor unit 402 as shown in FIG. 58.

Besides, as shown in FIG. 59, it can be confirmed that the sixth-order torque ripple is significantly reduced in the form of an electrical angle by superimposing the fifth-order harmonic on the drive current.

As described above, the motor unit 402 and the wiper motor 401 according to the fourth embodiment described above include the stator 408 that has the stator core 420 being ring-shaped and a plurality of teeth 422 that protrudes radially inward from the inner peripheral surface of the stator core 420, and the coils 424 wound around the teeth 422. Additionally, the motor unit 402 and the wiper motor 401 include the shaft 431 that rotates around the shaft center C2 on the radial inner side of the stator core 420, the rotor core 432 that is fixed to the shaft 431 and has the shaft center C2 as a radial center, and the magnets 433 which are disposed on the outer peripheral surface 432b of the rotor core 432. The radial thickness of the magnets 433 at end portions 433s on both sides in the circumferential direction around the shaft center C2 is smaller than the radial thickness at the circumferential intermediate portions. The motor unit 402 and the wiper motor 401 further include the salient poles 435 that are formed between the magnets 433 adjacent in the circumferential direction of the outer peripheral surface 432b of the rotor core 432 and protrude radially outward from the end portions 433s of the magnets 433 in the circumferential direction. The ratio of the number of magnetic poles of the magnets 433 to the number of teeth 422 is 2n:3n (wherein, n is a natural number). In the magnets 433, the radius of curvature R3 on the outer peripheral surface 433a is set to 0.8 time or less with respect to the radius R4 from the shaft center C2 of the shaft 431 at the circumferential intermediate portion 433c located at the outmost side in the radial direction in the outer peripheral surface 433a of the magnets 433.

In this way, the salient poles 435 protrude radially outward from the end portions 433s of the magnets 433 in the circumferential direction. In addition, the radius of curvature R3 of the outer peripheral surface 433a of the magnets 433 is made smaller than the radius R4 of the outer peripheral surface 433a of the magnets 433 at the circumferential intermediate portion 433c. Accordingly, the end portions 433s of the magnets 433 on both sides in the circumferential direction are arranged further radially inward than the salient poles 435. Therefore, the magnetic fluxes are concentrated on the salient poles 435, and the demagnetizing field is not prone to act on the end portions 433s of the magnets 433. Besides, the higher-order harmonic components contained in the induced voltage when a current is supplied to the coils 424 can be suppressed. Therefore, torque ripple in the motor unit 402 can be suppressed. Thus, the effect of suppressing torque ripple can be obtained when the radius of curvature of the outer peripheral surface 433a of the magnets 433 is reduced. Therefore, the need to calculate and generate high-order harmonics with a microcomputer on the controller board 462 that supplies current to the coils 424 is reduced. Thus, the need to arrange a microcomputer with a high processing load on the controller board 462 is reduced, and an increase in cost can be suppressed. As a result, ripple can be effectively reduced with low cost.

In addition, with the configuration as described above, the torque of the motor unit 402 can be increased and the cogging can be suppressed. Furthermore, in such a motor unit 402, high-speed rotation can be achieved by performing advance angle energization and wide angle energization. Therefore, it is possible to increase the rotation speed and torque while suppressing an increase in cost.

Besides, the width dimension of the salient poles 435 in the radial direction is set to 40° or less in the form of an electrical angle. According to such a configuration, the inductance value in the q-axis direction can be reduced by setting the electrical angle of the salient poles 435 to 40° or less and reducing the width dimension of the salient poles 435 in the circumferential direction. Accordingly, demagnetizing field can be suppressed.

Furthermore, the width dimension of the salient poles 435 in the radial direction is set to 20° or more in the form of an electrical angle. According to such a configuration, the width dimension of the salient poles 435 in the radial direction can be secured by setting the electrical angle of the salient poles 435 to 20° or more. Therefore, by concentrating the magnetic fluxes on the salient poles 435, an effect that the demagnetizing field is not prone to act on the end 433s of the magnets 433 can be obtained. In addition, a high electrical reluctance torque can be obtained by setting the electrical angle θ of the salient poles 435 to 20° or more and 40° or less.

In addition, the magnets 433 are ferrite magnets, and the magnetization orientation is parallel orientation. According to such a configuration, the cogging of the motor unit 402 can be suppressed and a high magnetic flux density can be obtained. In addition, by using ferrite magnets instead of rare earth magnets, an increase in cost due to an increase in the magnet usage can be suppressed even if the radial dimensions of the magnets are increased.

In addition, the controller board 462 is configured to apply a drive current having the fifth-order harmonic superimposed thereon to the coils 424. According to such a configuration, torque ripple in the motor unit 402 can be suppressed.

A Variation Example of the Fourth Embodiment

The magnets 433 in the fourth embodiment have, but not limited to, a shape in which the outer peripheral surface 433a has a constant curvature radius R3.

Figure 60:
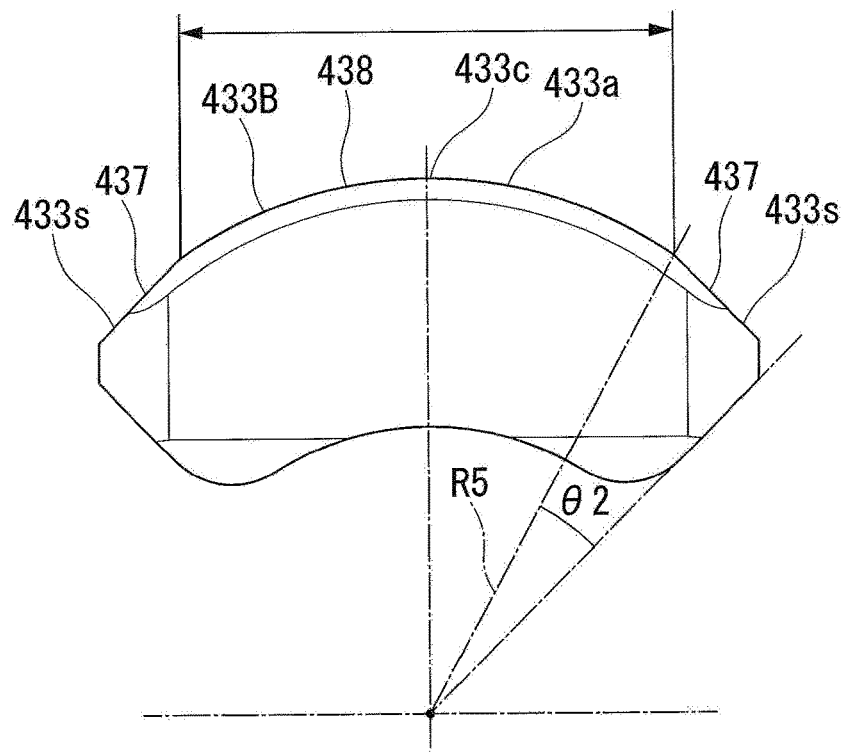
FIG. 60 is a diagram showing the shape of the magnets in a variation example of an embodiment of the present invention in the fourth embodiment of the present invention.

FIG. 60 is a diagram showing the shape of magnets in the variation example of the fourth embodiment of the present invention.

As shown in FIG. 60, a magnet 433B has flat portions 437 in a range where an electrical angle θ2 is 10° or more and 18° or less in the end portions 433s on both sides of the outer peripheral surface 433a in the circumferential direction. The flat portions 437 are obtained by flatly forming the outer peripheral surface 433a of the magnets 433B.

Furthermore, the outer peripheral surface 433a of the magnets 433B is formed as a curved surface 438 having a constant radius of curvature R5 between the flat portions 437 on both sides in the circumferential direction (the range of the arrow in FIG. 60).

The radius of curvature R5 of the curved surface 438 is set to be larger than 0.8 time and less than 0.9 time (0.8× R4<R5≤0.9×R4) of the radius R4 (see FIG. 40) from the shaft center C2 of the shaft 431 at the circumferential intermediate portion 433c located at the outermost side in the radial direction on the outer peripheral surface 433a of the magnets 433.

In the motor unit 402 and the wiper motor 401 having such magnets 433B, it is also possible to suppress higher-order harmonic components contained in the induced voltage when a current is supplied to the coils 424. As a result, torque ripple in the motor unit 402 can be suppressed.

In this way, the radius of curvature of the outer peripheral surface 433a of the magnets 433B is reduced, and the flat portions 437 are formed at the end portions 433s on both sides in the circumferential direction. Accordingly, if the salient poles 435 protrude radially outward from the end portions 433s of the magnets 433B in the circumferential direction, an effect of suppressing torque ripple can be obtained. Therefore, the need to calculate and generate high-order harmonics with a microcomputer on the controller board 462 that supplies current to the coils 424 is reduced. Thus, the need to arrange a microcomputer with a high processing load on the controller board 462 is reduced, and the increase in cost can be suppressed. Accordingly, the ripple can be effectively reduced with low cost.

Figure 61:
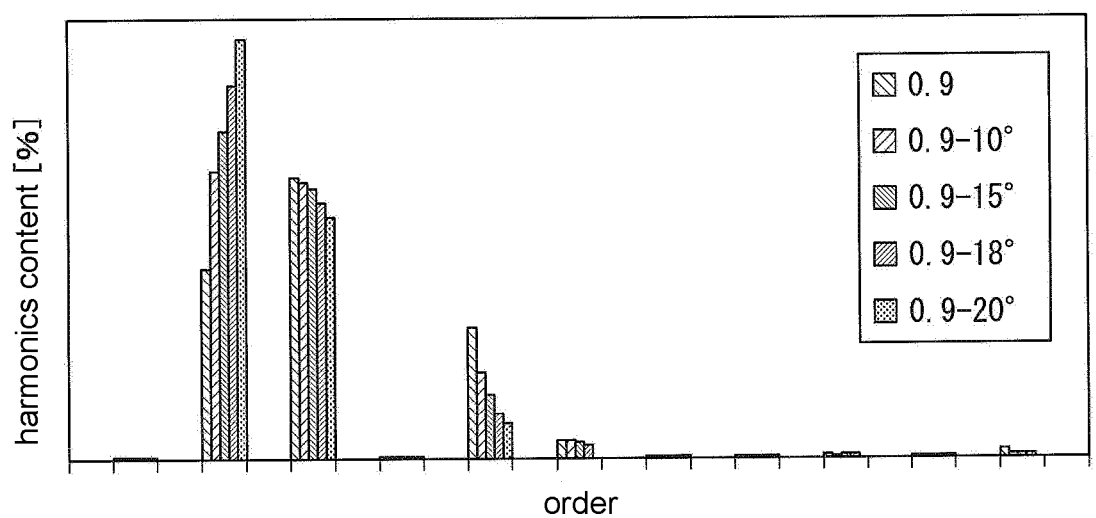
FIG. 61 is a graph showing a content rate of harmonics contained in the induced voltage when a range (electrical angle) for forming flat portions of the magnets is changed in the fourth embodiment of the present invention.

FIG. 61 is a graph showing the content rate of harmonics contained in the induced voltage when the range (electrical angle θ2) for forming the flat portions 437 of the magnets 433B is changed.

As shown in FIG. 61, the radius of curvature R5 of the outer peripheral surface 433a (the curved surface 438) of the magnets 433 is set to be larger than 0.8 time and less than 0.9 time with respect to the radius R4 of the circumferential intermediate portions 433c, and the flat portions 437 are set to 10° or more and 18° or less in the form of an electrical angle θ2. By configuring in this way, it can be confirmed that the eleventh-order harmonic components are reduced to less than 1%.

Other Embodiments

Moreover, the present invention is not limited to the above-described fourth embodiment, and includes various modifications made to the above-described fourth embodiment without departing from the spirit of the present invention.

For example, in the above-described fourth embodiment, the wiper motor 401 is taken as an example of the motor. However, besides the wiper motor 1, the motor according to the present invention can also be used for a drive source for electrical components (for example, a power window, a sunroof, an electric chassis and the like) mounted on a vehicle, and for various other purposes.

In addition, the configuration described in each of the above embodiments can be selected or deleted, and appropriate changes into other configurations are possible without departing from the spirit of the present invention.

INDUSTRIAL APPLICABILITY

According to the motor described above, it is possible to increase the rotation speed and torque while suppressing an increase in cost.

What is claimed is:

1. A motor, comprising:
   a stator that comprises a stator core being ring-shaped and a plurality of teeth that protrudes radially inward from an inner peripheral surface of the stator core;
   coils wound around the teeth;
   a shaft that rotates around a rotation axis on a radial inner side of the stator core;
   a rotor core that is fixed to the shaft and takes the rotation axis as a radial center;
   magnets which are disposed on an outer peripheral surface of the rotor core and a radial thickness of which at end portions on both sides in a circumferential direction around the rotation axis is smaller than a radial thickness in a circumferential intermediate portion; and
   salient poles that are formed between magnets adjacent in the circumferential direction of the outer peripheral surface of the rotor core and protrude radially outward from the circumferential end portions of the magnets,
   wherein circumferential widths at end portions of the salient poles in a radial outer side is set to 40° or less in a form of an electrical angle, and
   a ratio between a number of magnetic poles of the magnets and a number of the teeth is set to 2:3,
   wherein one groove is formed on an end surface of the salient poles on the radial outer side along the rotation axis direction, and
   the groove is formed in a manner that a groove width in the circumferential direction gradually decreases toward the radial inner side, and
   wherein the salient pole side facing surfaces of the salient poles, which face end portions of the magnets in the circumferential direction, are formed parallel to each other on both side in the circumferential direction.

2. The motor according to claim 1, wherein a width dimension of the salient poles in the circumferential direction at end portions on the radial outer side is set to 20° or more in a form of an electrical angle $\theta$.

3. The motor according to claim 1, wherein magnetization orientation of the magnets is parallel orientation.

4. A brushless motor comprising the motor according to claim 1.

* * * * *